(12) United States Patent
Martyn

(10) Patent No.: US 10,234,003 B2
(45) Date of Patent: Mar. 19, 2019

(54) APPARATUS FOR CONVERTING MOTION

(71) Applicant: Ten Fold Engineering Limited, Buckinghamshire (GB)

(72) Inventor: David Martyn, Bath (GB)

(73) Assignee: Ten Fold Engineering Limited (GB)

( * ) Notice: Subject to any disclaimer, the term of this patent is extended or adjusted under 35 U.S.C. 154(b) by 0 days.

(21) Appl. No.: 14/916,872

(22) PCT Filed: Aug. 29, 2014

(86) PCT No.: PCT/GB2014/052639
§ 371 (c)(1),
(2) Date: Mar. 4, 2016

(87) PCT Pub. No.: WO2015/033116
PCT Pub. Date: Mar. 12, 2015

(65) Prior Publication Data
US 2016/0195174 A1 Jul. 7, 2016

(30) Foreign Application Priority Data

Sep. 4, 2013 (GB) .................................. 1315702.9
Aug. 29, 2014 (GB) .................................. 1415354.8

(51) Int. Cl.
*F16H 21/44* (2006.01)
*F16H 21/02* (2006.01)
(Continued)

(52) U.S. Cl.
CPC ............. *F16H 21/44* (2013.01); *E01D 15/00* (2013.01); *E04H 3/126* (2013.01); *F16H 21/02* (2013.01);
(Continued)

(58) Field of Classification Search
CPC .......... F16H 21/44; F16H 21/02; F16H 21/04; F16H 21/10; E01D 15/00; E04H 3/126; Y02B 10/20; B43L 13/002
(Continued)

(56) References Cited

U.S. PATENT DOCUMENTS 822,842 A * 6/1906 Holm ...................... B66F 11/04
182/62.5
2,445,004 A * 7/1948 Reynolds .................. B66F 3/22
182/141
(Continued)

FOREIGN PATENT DOCUMENTS

DE 19542229 A1 5/1997
FR 2243375 A1 4/1975
(Continued)

OTHER PUBLICATIONS

Patents Act 1977: Search Report under Section 17, application No. GB1415354.8, dated Mar. 4, 2015, 2 pages.
(Continued)

*Primary Examiner* — Theodore V Adamos
(74) *Attorney, Agent, or Firm* — Jason Saunders; Christopher McKeon; Arnold & Saunders, LLP

(57) ABSTRACT

An assembly for converting motion comprises a first arm rotatable about a first fixed pivot; a second arm rotatable about a second fixed pivot, the second fixed pivot spaced apart from the first fixed pivot; a third arm pivotably connected to the second arm; a fourth arm pivotably connected at a first position thereon to the first arm and pivotably connected at a second position thereon spaced apart from the first position thereon to the third arm; a connecting arm extending between the first arm and the second arm, the connecting arm pivotably connected to the
(Continued)

first arm and pivotably connected to the second arm; and a support arm pivotably connected to the fourth arm.

16 Claims, 48 Drawing Sheets

(51) Int. Cl.
  *F16H 21/04* (2006.01)
  *F16H 21/10* (2006.01)
  *E01D 15/00* (2006.01)
  *E04H 3/12* (2006.01)

(52) U.S. Cl.
  CPC ............. *F16H 21/04* (2013.01); *F16H 21/10* (2013.01); *Y02B 10/20* (2013.01)

(58) Field of Classification Search
  USPC .................................. 52/69, 645, 71, 109, 9
  See application file for complete search history.

(56) References Cited

U.S. PATENT DOCUMENTS

| | | | |
|---|---|---|---|
| 2,506,151 A | | 5/1950 | Hoven et al. |
| 2,697,845 A | * | 12/1954 | Broner .................. E01D 15/124 |
| | | | 14/45 |
| 3,253,473 A | | 5/1966 | Chisholm |
| 3,375,624 A | * | 4/1968 | Mikulin .................... E04B 1/19 |
| | | | 52/109 |
| 3,968,991 A | | 7/1976 | Maclaren |
| 4,130,178 A | * | 12/1978 | Smith, Jr. ................. B66F 3/22 |
| | | | 182/141 |
| 4,248,103 A | | 2/1981 | Halsall |
| 4,400,985 A | * | 8/1983 | Bond .................... B65G 47/904 |
| | | | 414/744.5 |
| 4,747,353 A | | 5/1988 | Watt |
| 5,102,290 A | | 4/1992 | Cipolla |
| 5,121,765 A | * | 6/1992 | MacMorris, Jr. ..... E04H 15/505 |
| | | | 135/143 |
| 5,219,410 A | | 6/1993 | Garrec |
| 5,237,887 A | | 8/1993 | Appleberry |
| 5,485,763 A | | 1/1996 | Pincus |
| 6,141,934 A | * | 11/2000 | Zeigler ................... E04H 15/50 |
| | | | 135/121 |
| 7,537,189 B2 | * | 5/2009 | Jung ...................... F16M 11/10 |
| | | | 248/281.11 |
| 8,813,455 B2 | * | 8/2014 | Merrifield ................. E04C 3/02 |
| | | | 135/144 |
| 2005/0204681 A1 | | 9/2005 | Zeigler |
| 2018/0201050 A1 | * | 7/2018 | Rosenfield ............ B43L 13/002 |

FOREIGN PATENT DOCUMENTS

| | | |
|---|---|---|
| FR | 2557003 A1 | 6/1985 |
| GB | 2437494 A | 10/2007 |
| GB | 2502788 A | 12/2013 |
| GB | 2505206 A | 2/2014 |
| GB | 2505676 A | 3/2014 |
| GB | 2514175 A | 11/2014 |
| JP | 2003065415 A | 3/2003 |
| SU | 1044871 A1 | 9/1983 |
| WO | 199733725 A1 | 9/1997 |
| WO | 199914018 A1 | 3/1999 |
| WO | 2013182834 A1 | 12/2013 |

OTHER PUBLICATIONS

Patents Act 1977: Search Report under Section 17, application No. GB1315702.9, dated Mar. 28, 2014, 2 pages.
International Search Report, PCT/GB2014/052639, dated Nov. 18, 2014, 5 pages.
Dijksman, E.A., "The Straight-line Linkages Having a Rectilinear Translating Bar," Precision Engineering, Faculty of Mechanical Engineering, Eindhoven University of Technology, The Netherlands, Advances in Robot Kinematics and Computationed Geometry, 1994, Kluwer Academic Publishers, pp. 411-420.
International Search Report, PCT/GB2014/052609, dated Nov. 18, 2014, 4 pages.
Straight line mechanism of James Watt: Wattt's linkage https://en.wikipedia.org/wiki/Watt%27s_linkage 4 pages, Dec. 19, 2015.
Linkage of Tchebicheff: Chebyshev linkage https://en.wikipedia.org/wiki/Chebyshev_linkage 3 pages, Jan. 9, 2016.
Peaucellier-Lipkin inversor: Peaucellier-Lipkin linkage https://en.wikipedia.org/wiki/Peaucellier%E2%80%93Lipkin_linkage 4 pages, Jan. 28, 2016.
Mechanism of Hart: Hart's inversor https://en.wikipedia.org/wiki/Hart%27s_inversor 1 page, Feb. 5, 2016.
Scott Russell linear converter: Scott Russell linkage https://en.wikipedia.org/wiki/Scott_Russell_linkage 1 page, Oct. 14, 2015.

* cited by examiner

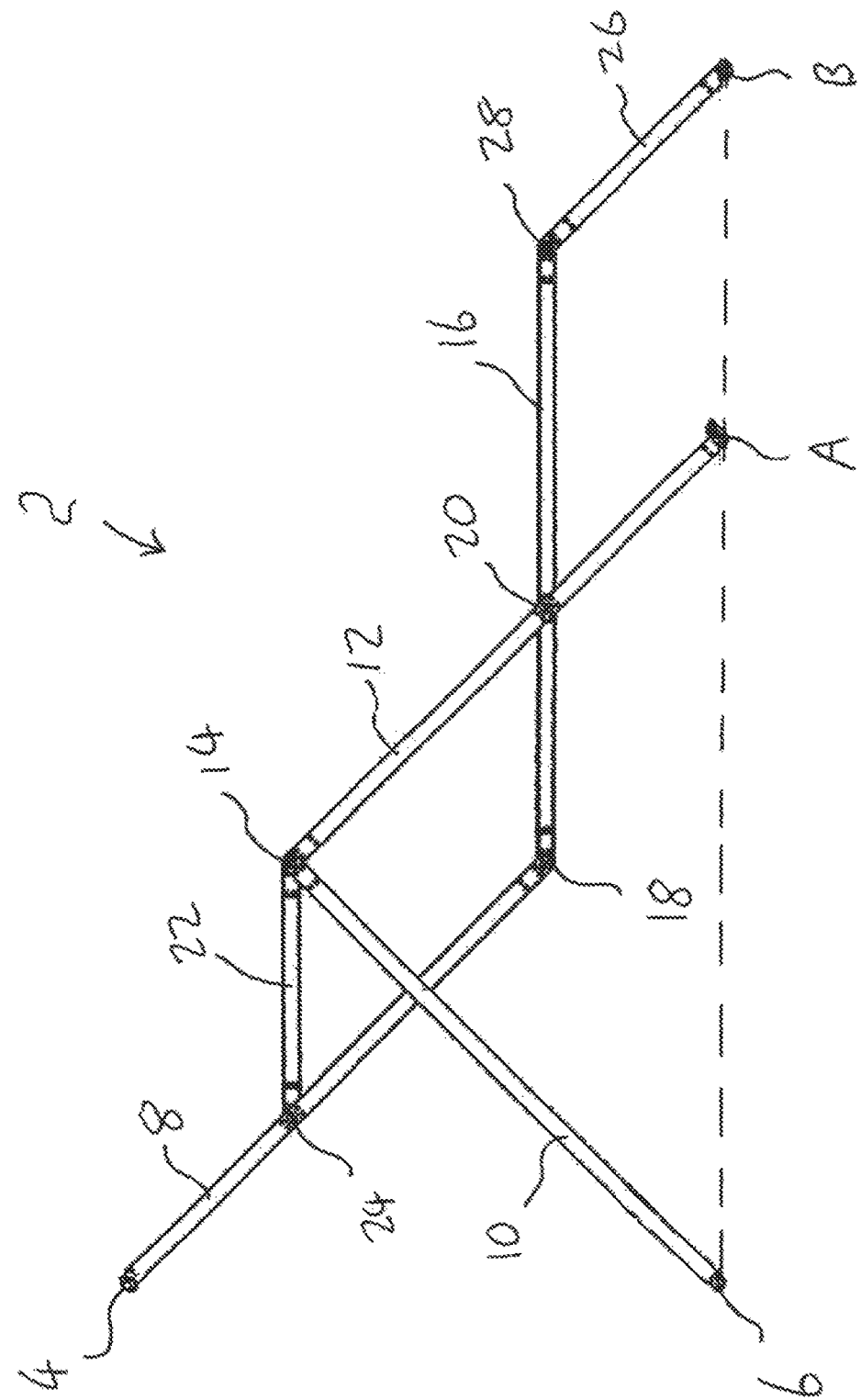

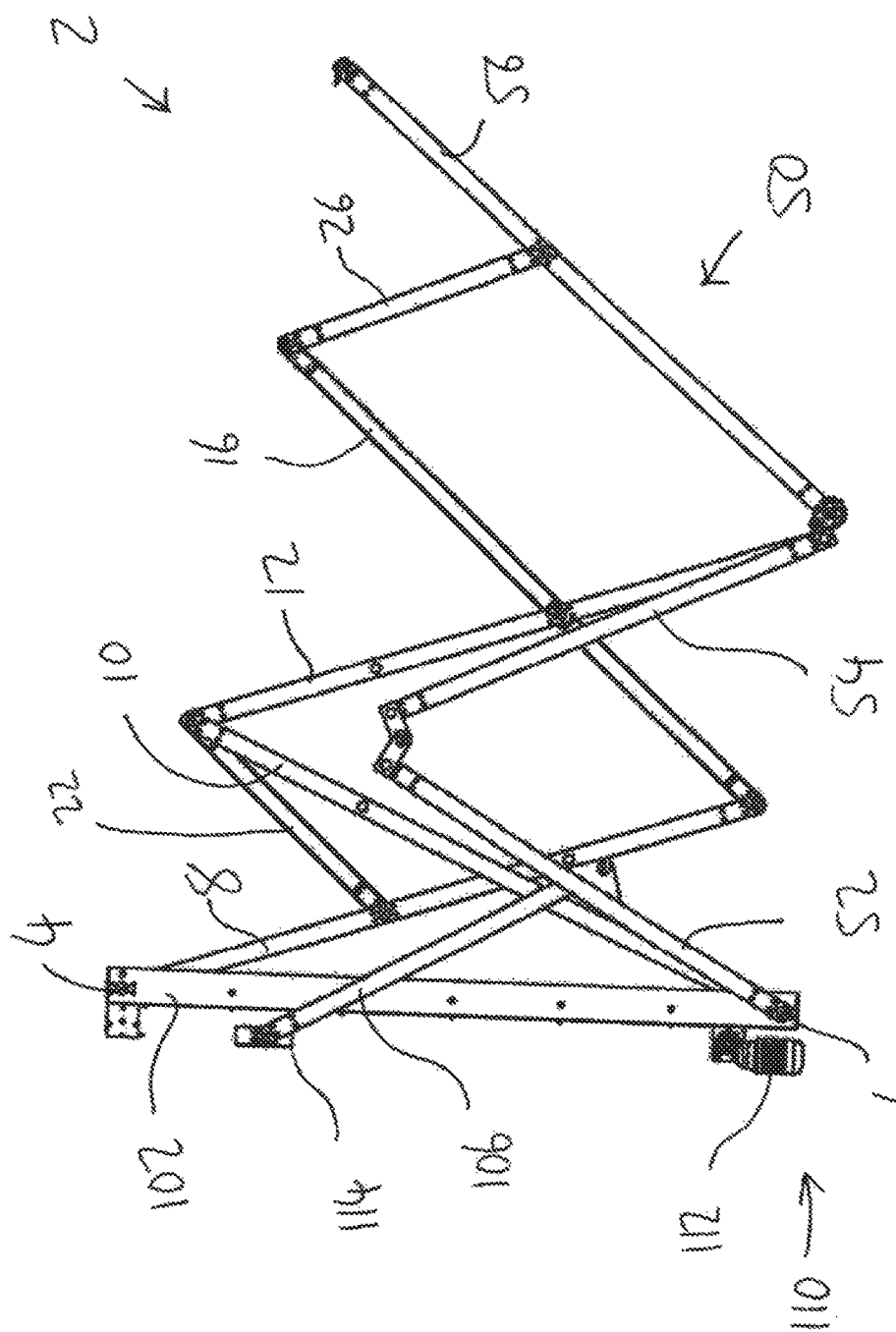

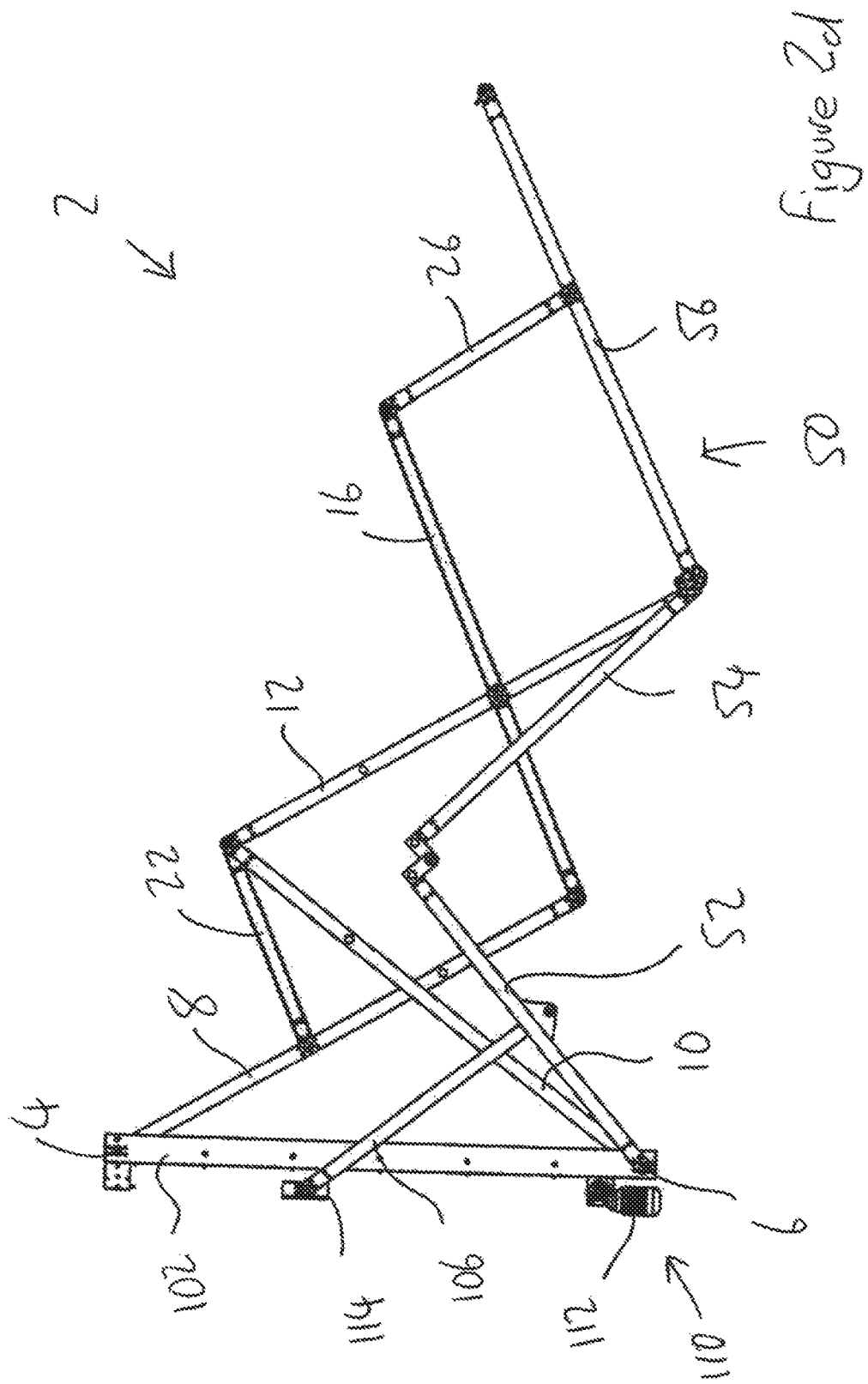

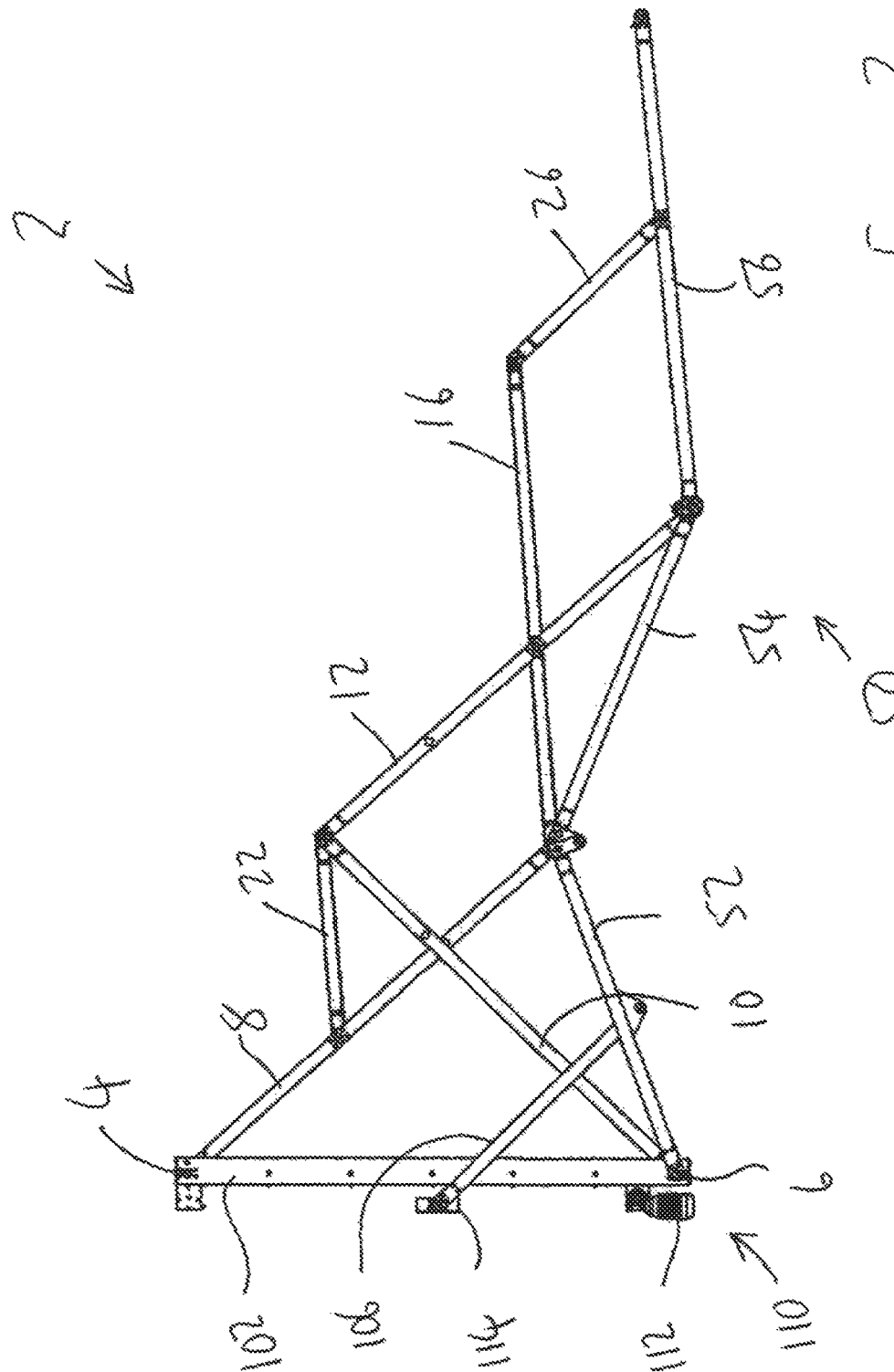

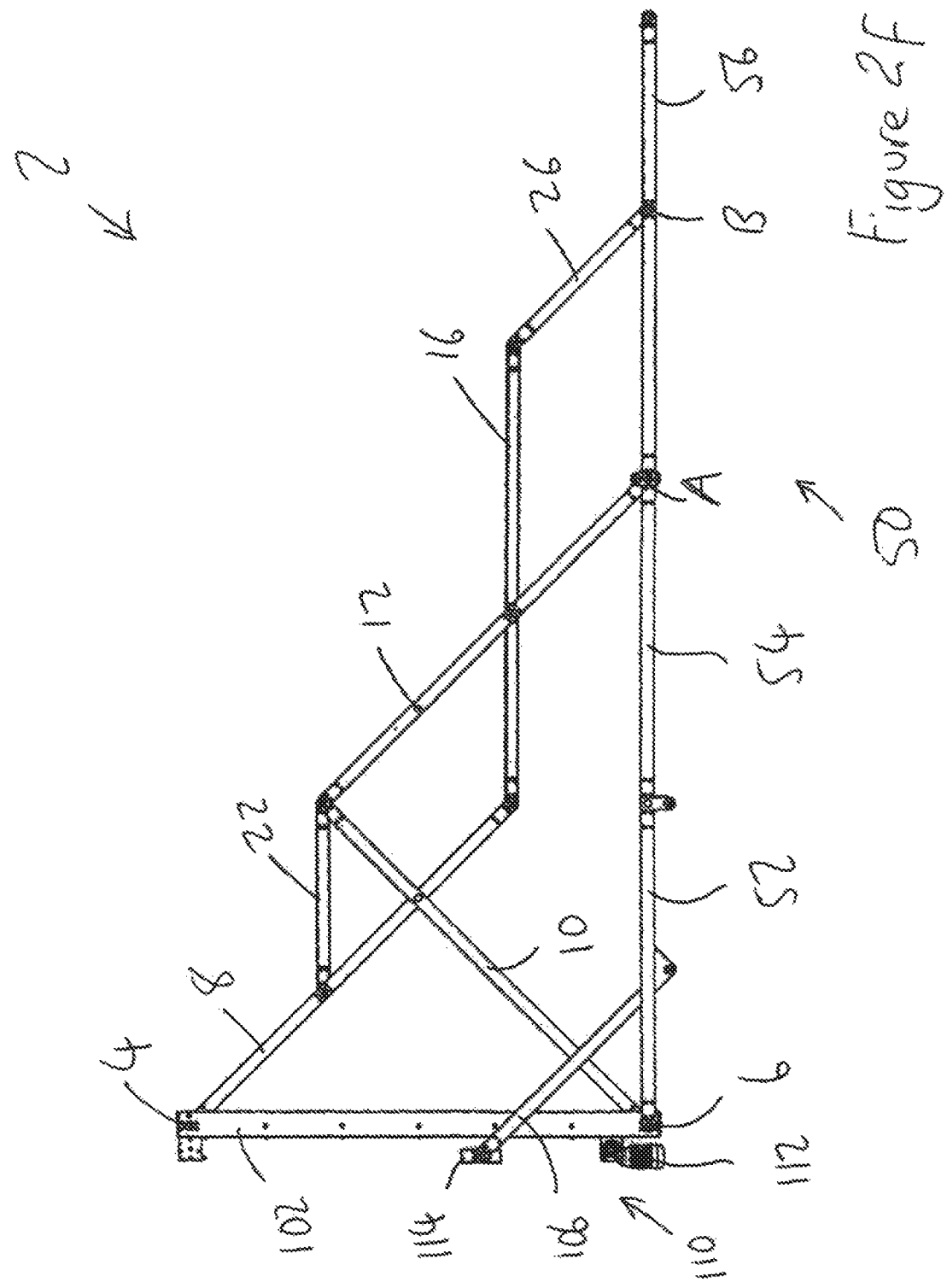

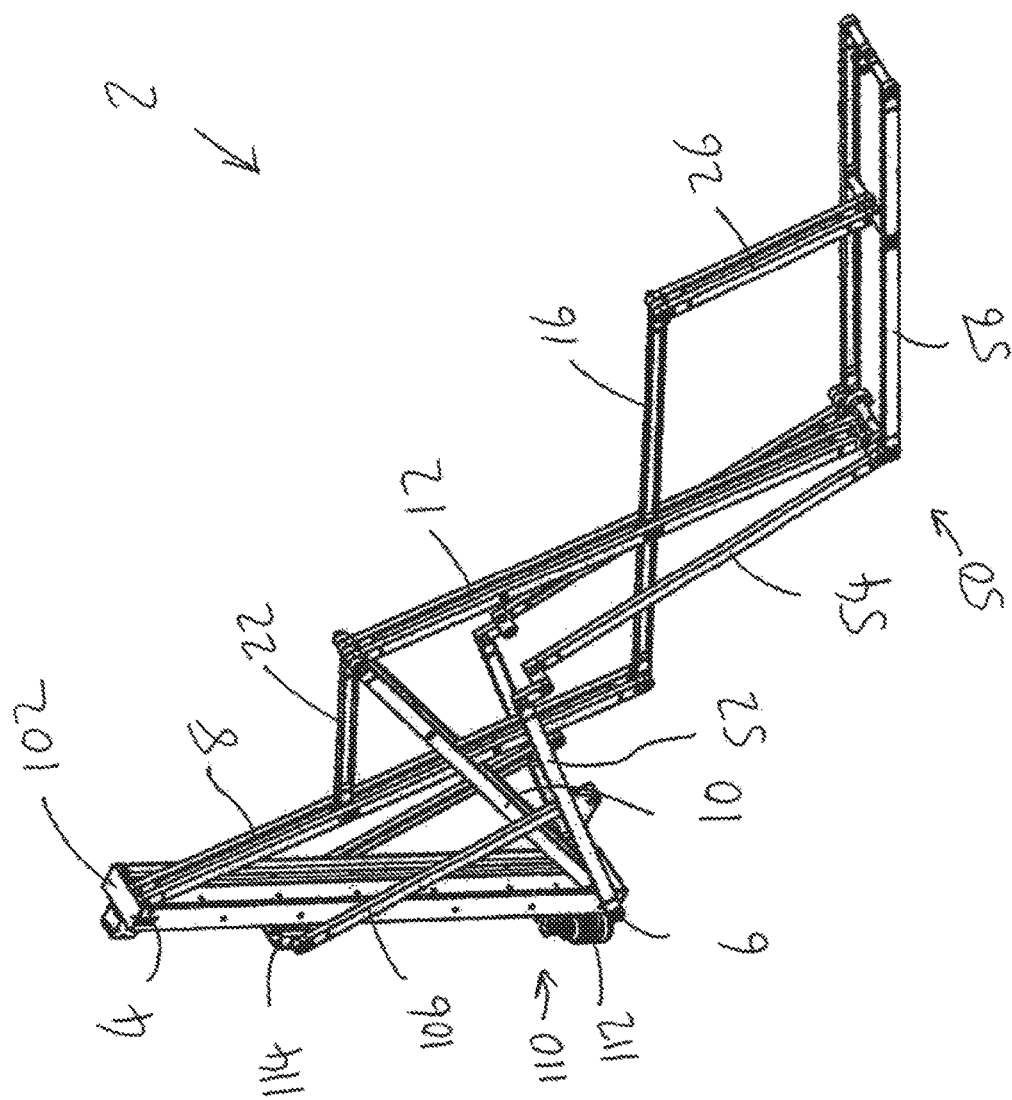

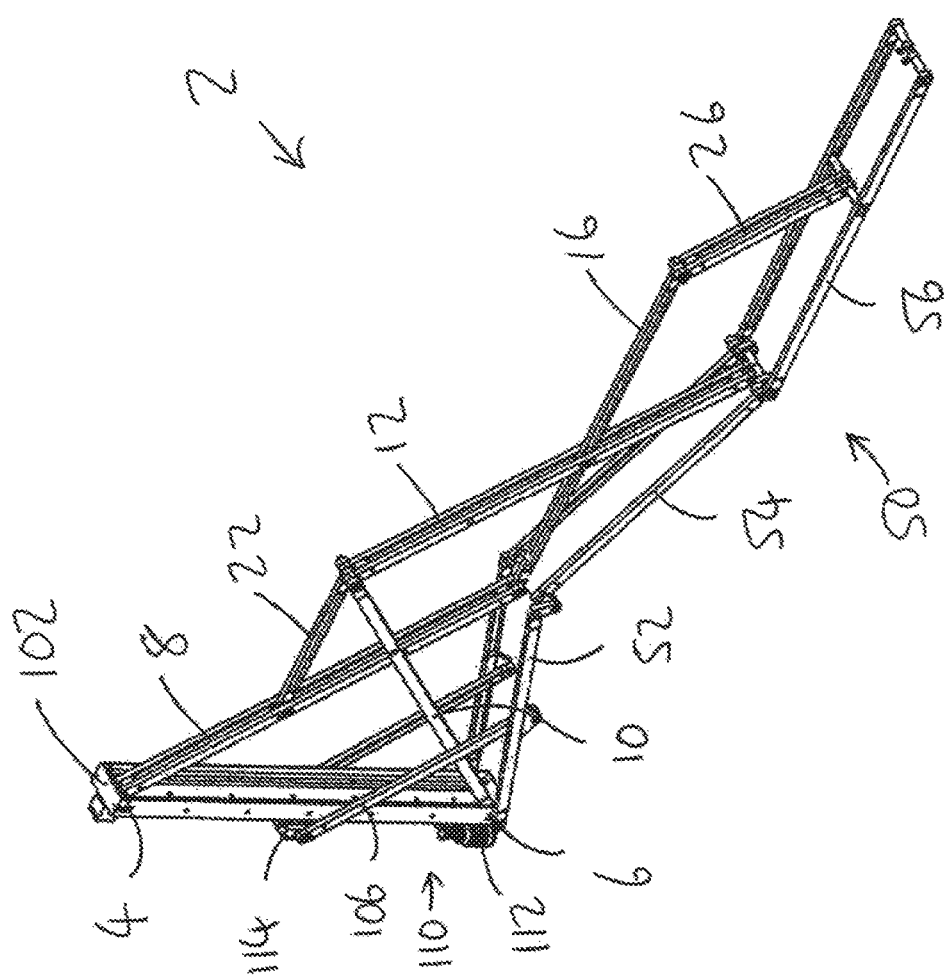

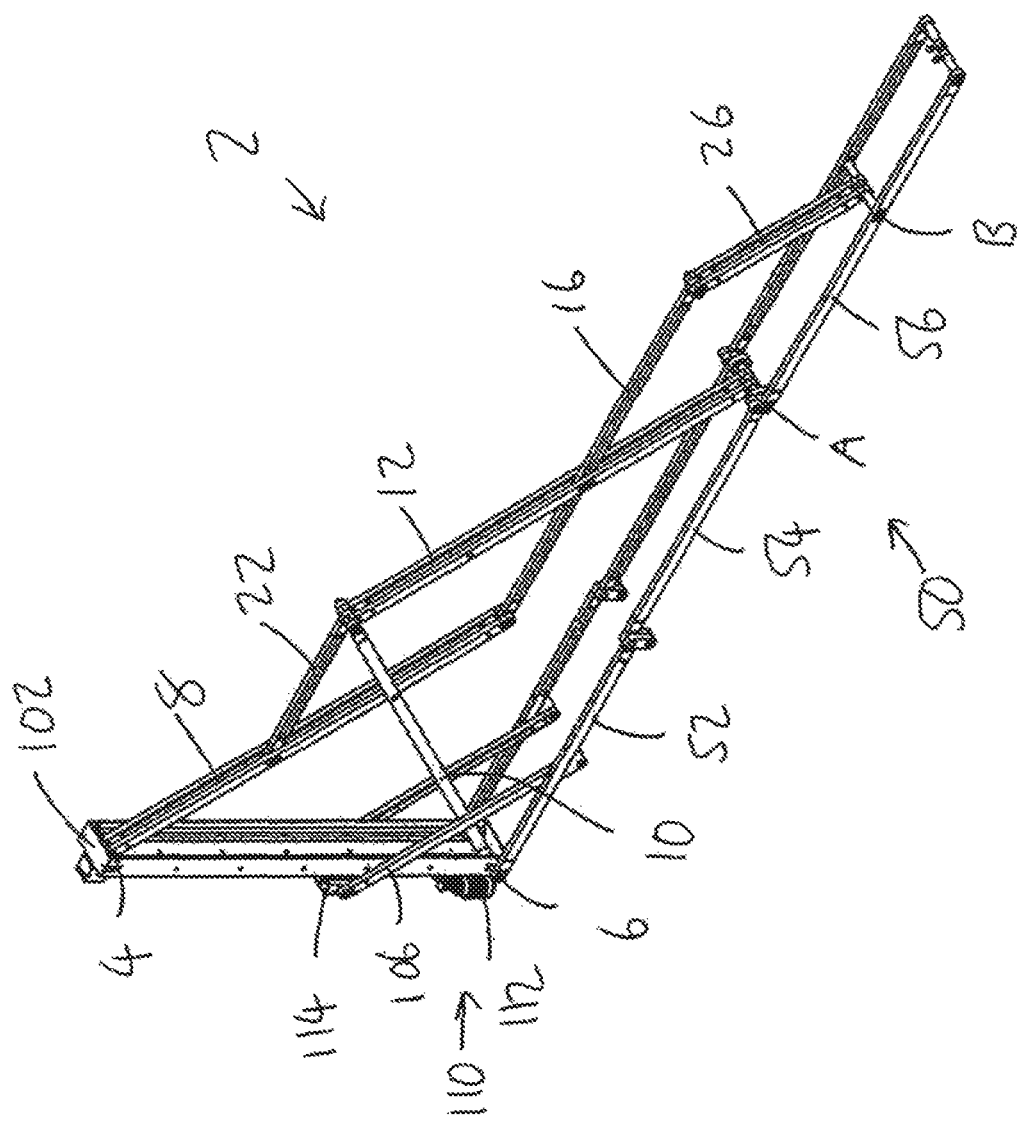

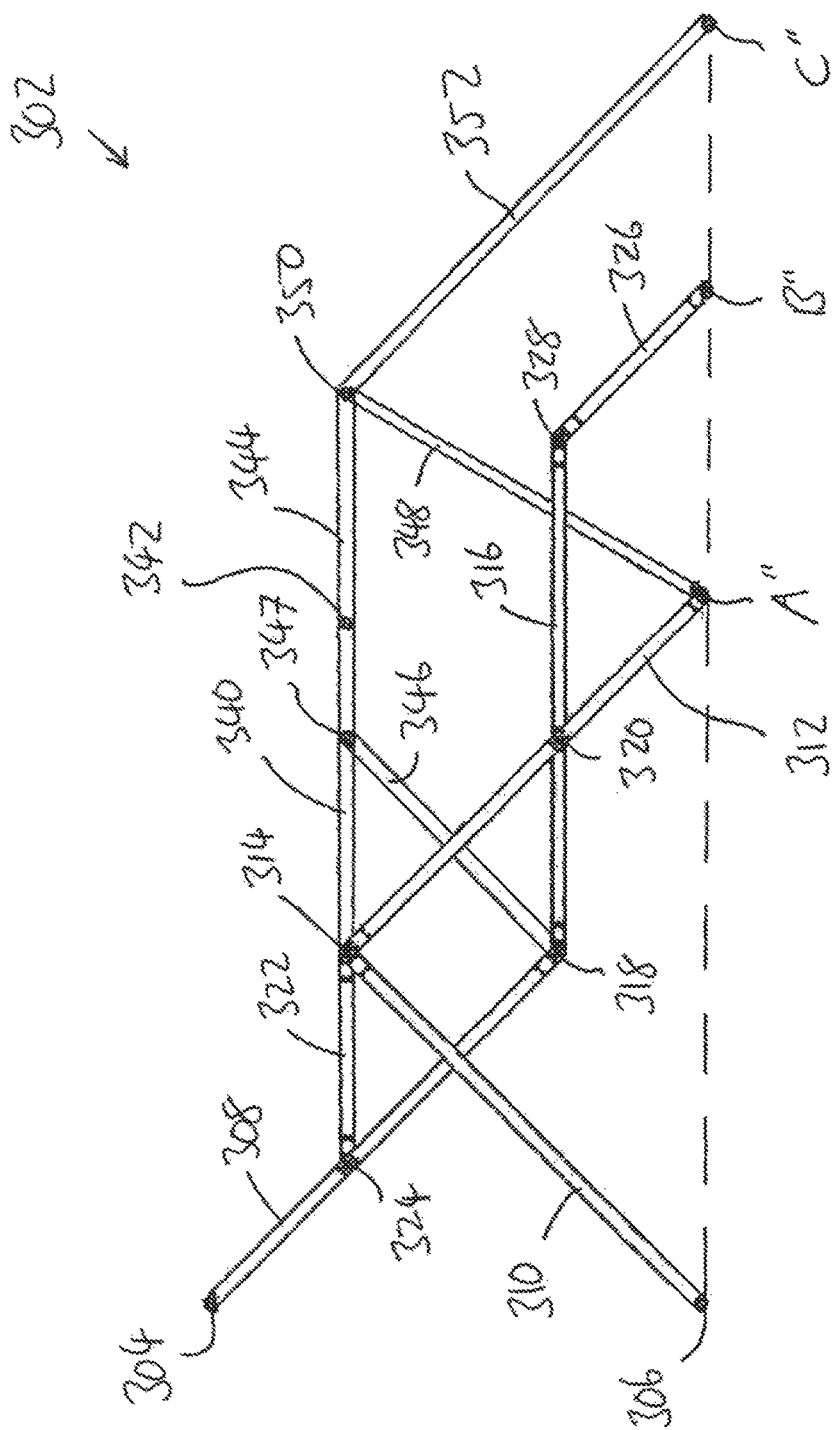

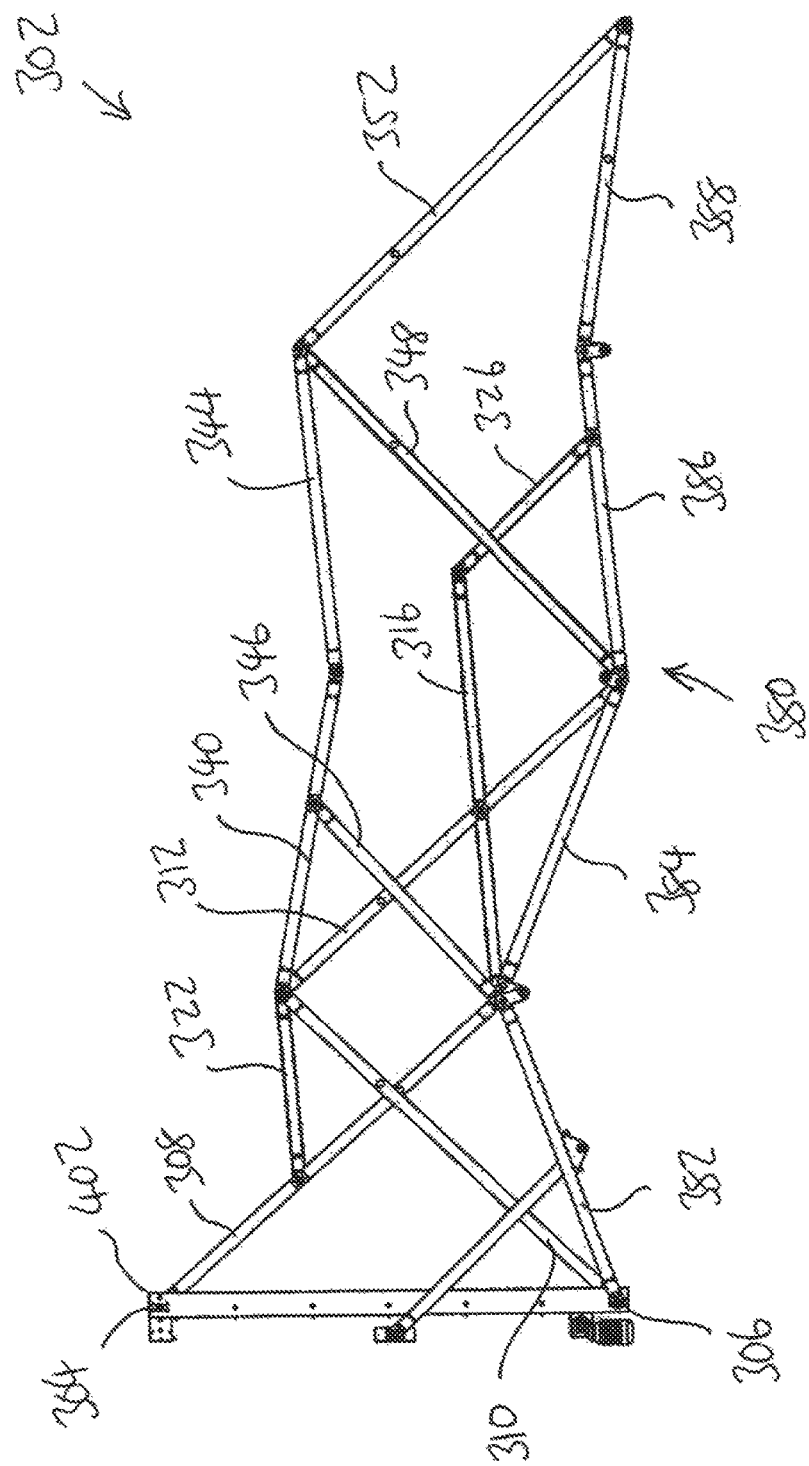

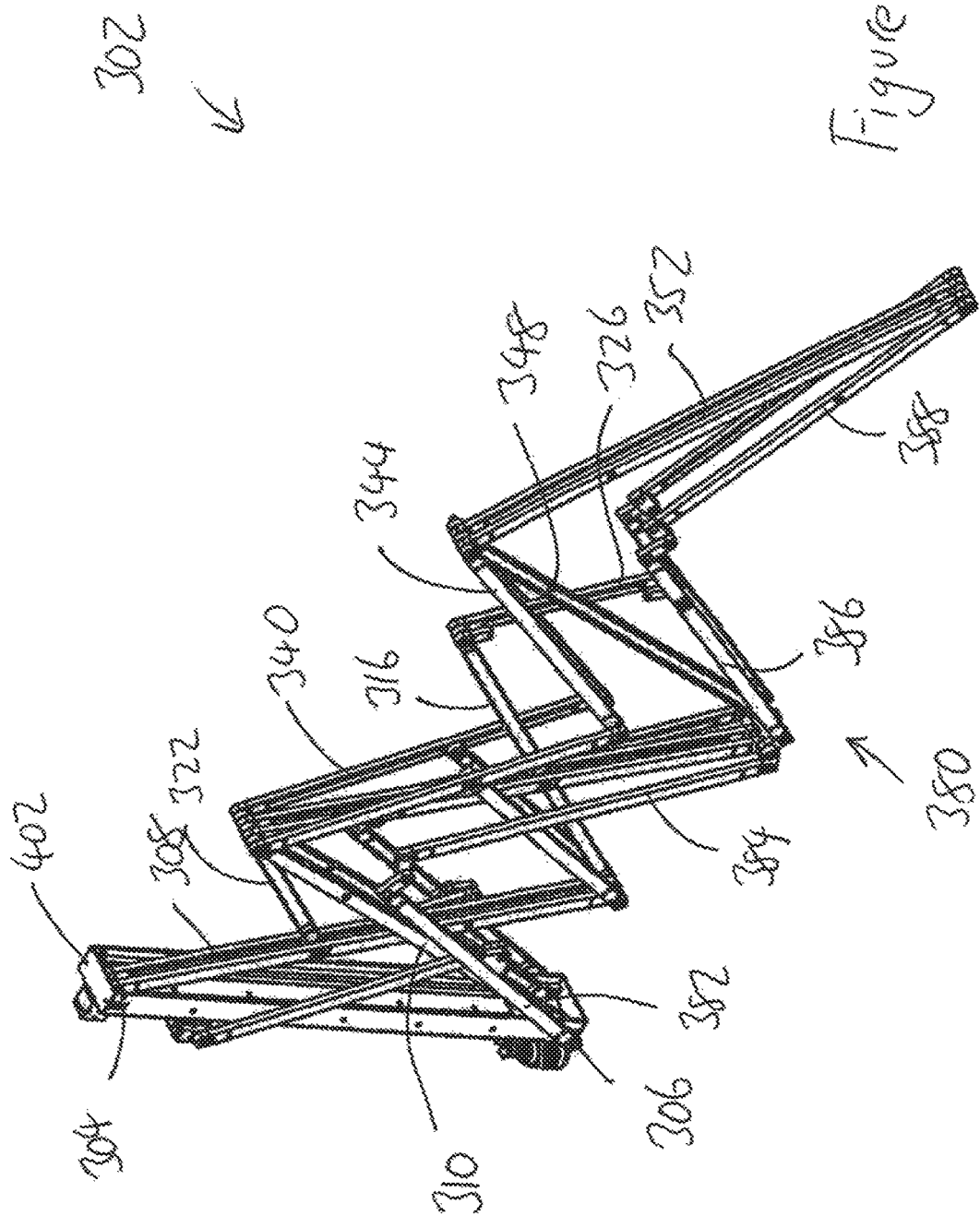

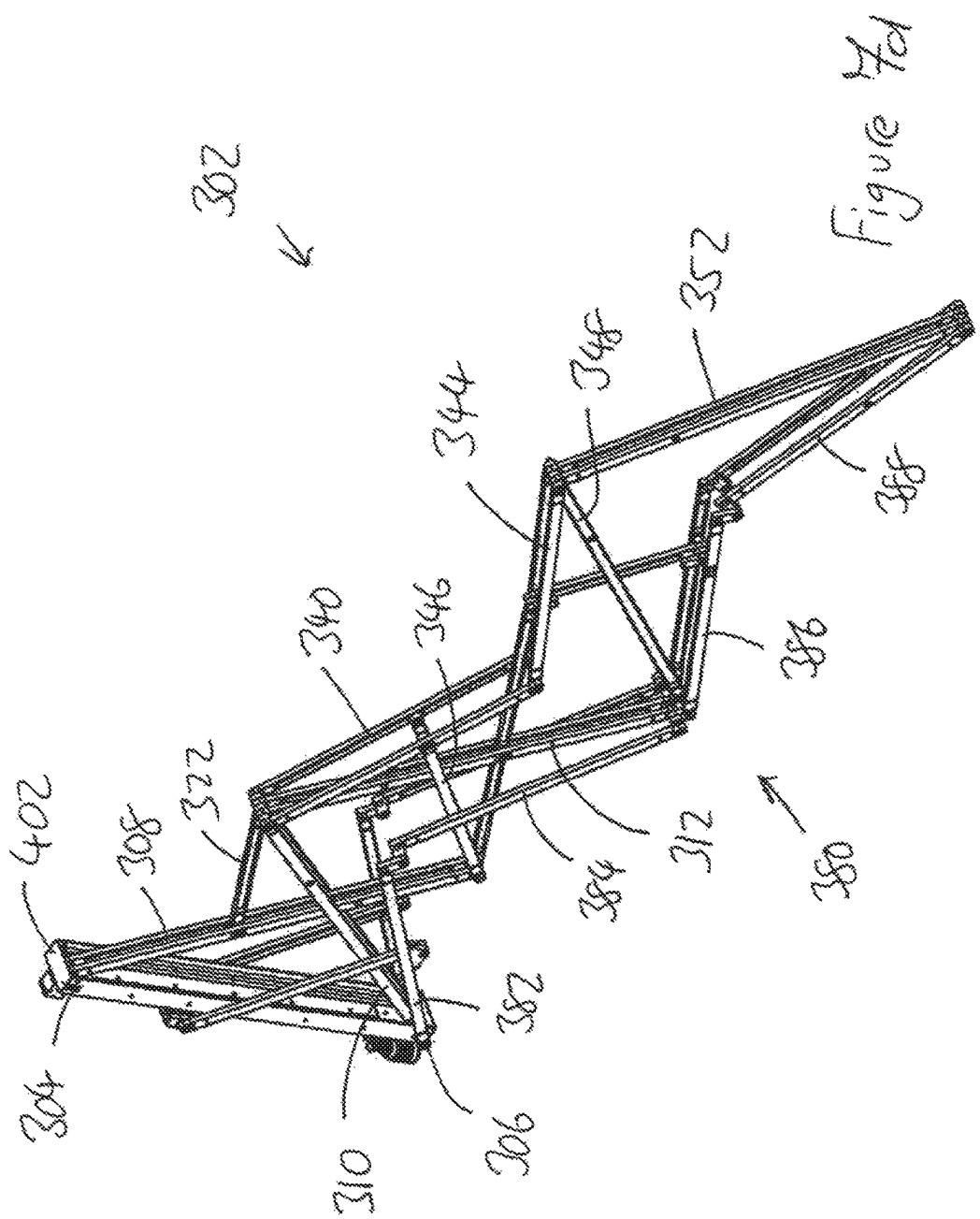

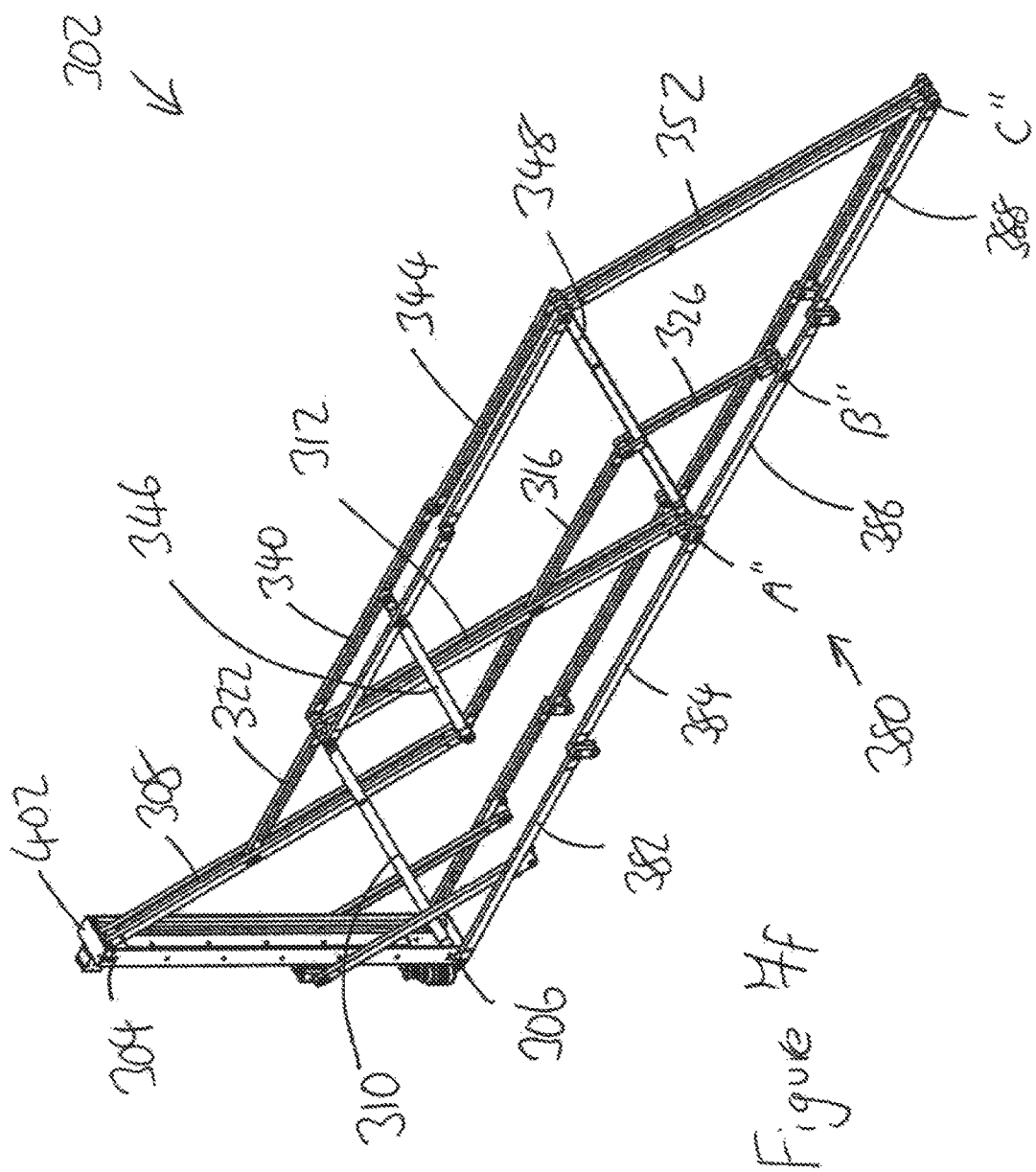

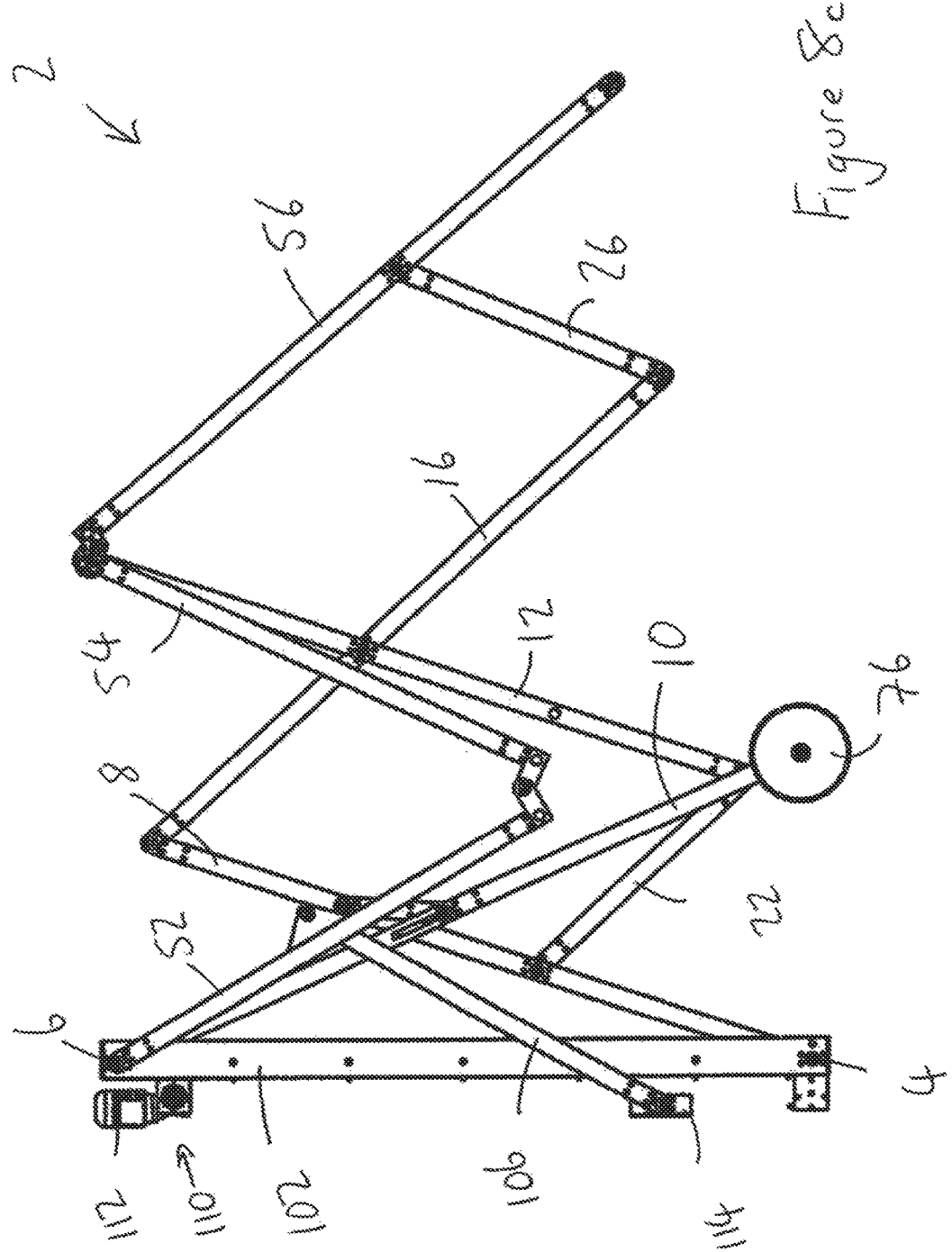

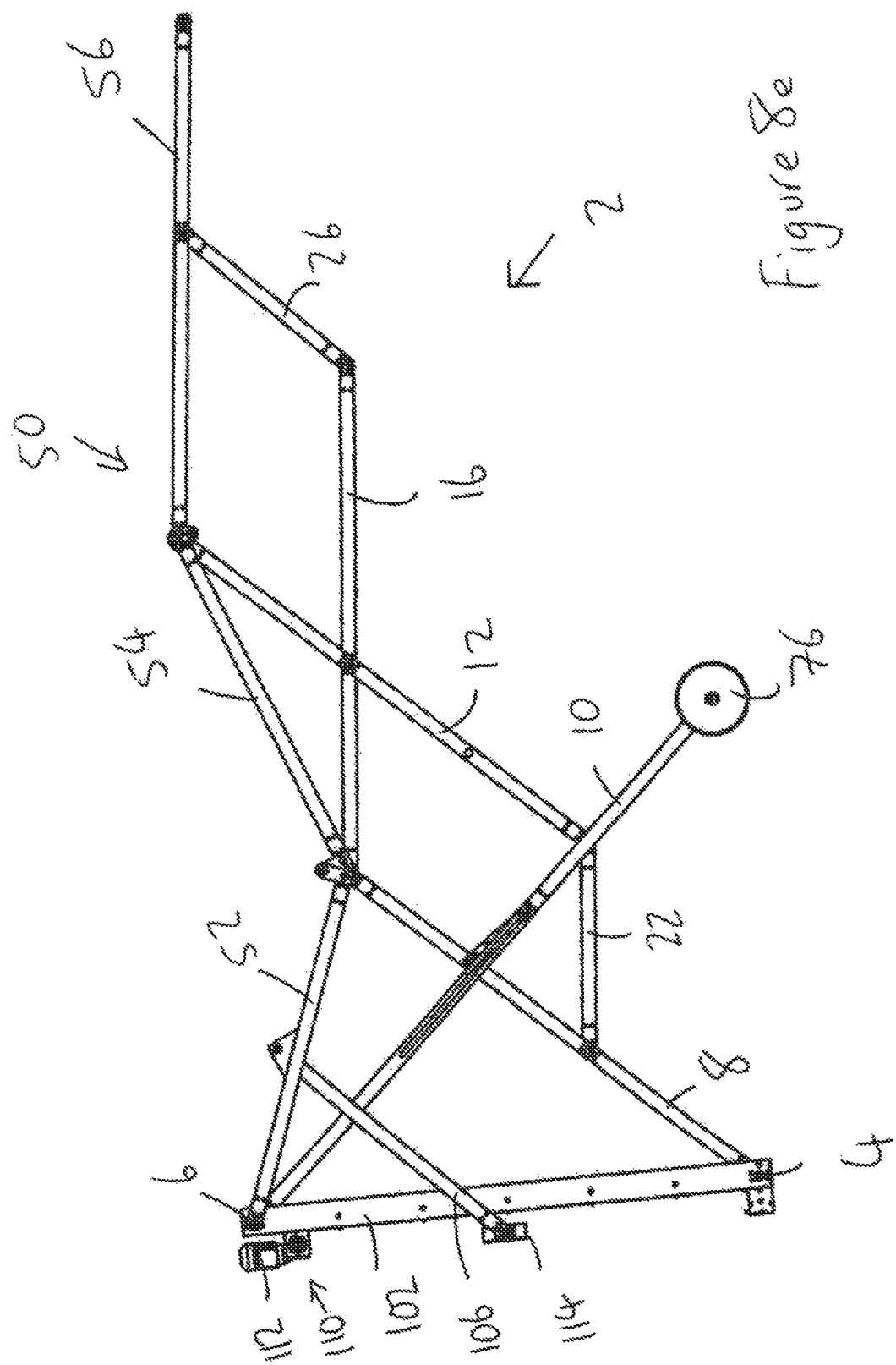

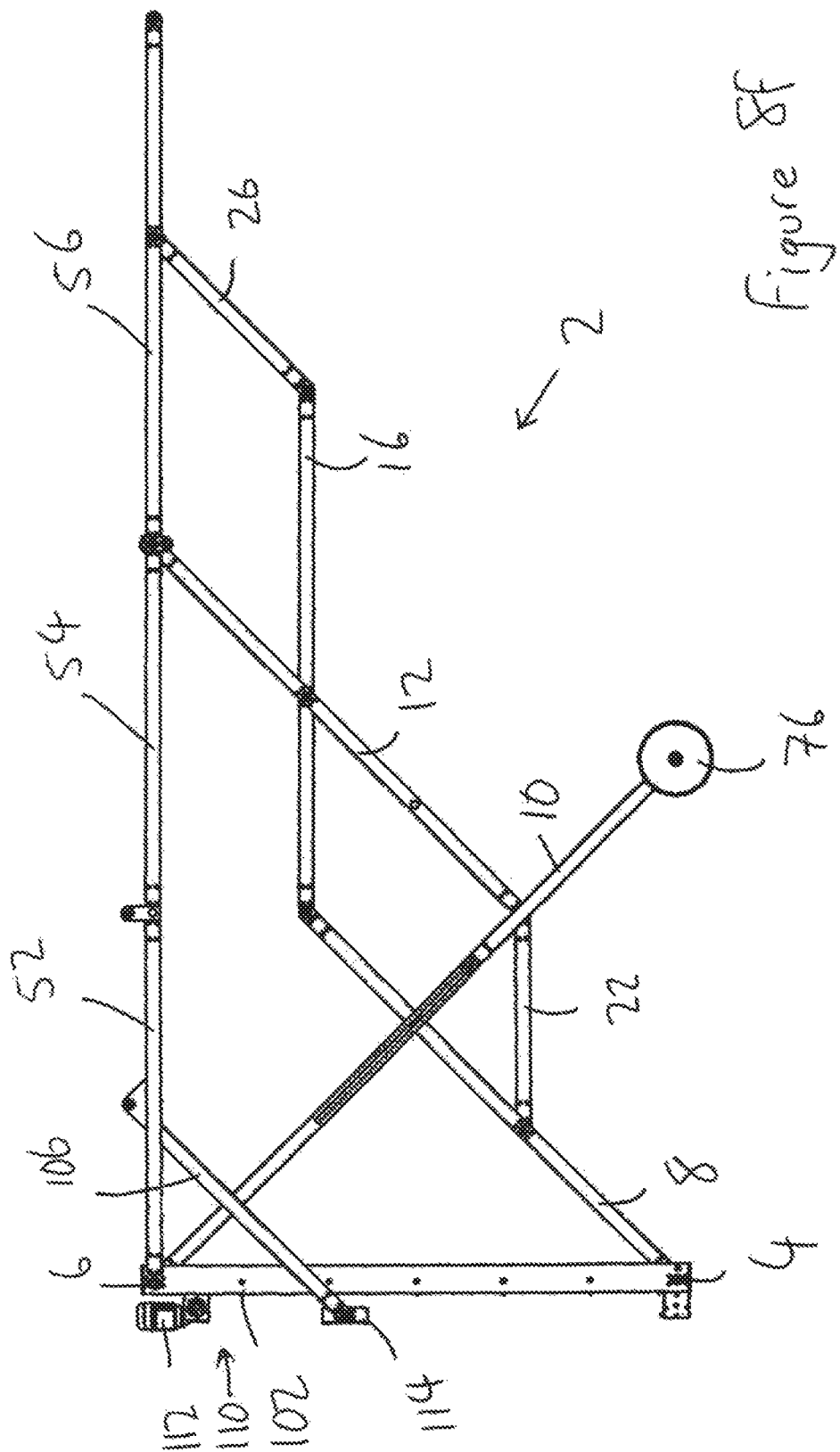

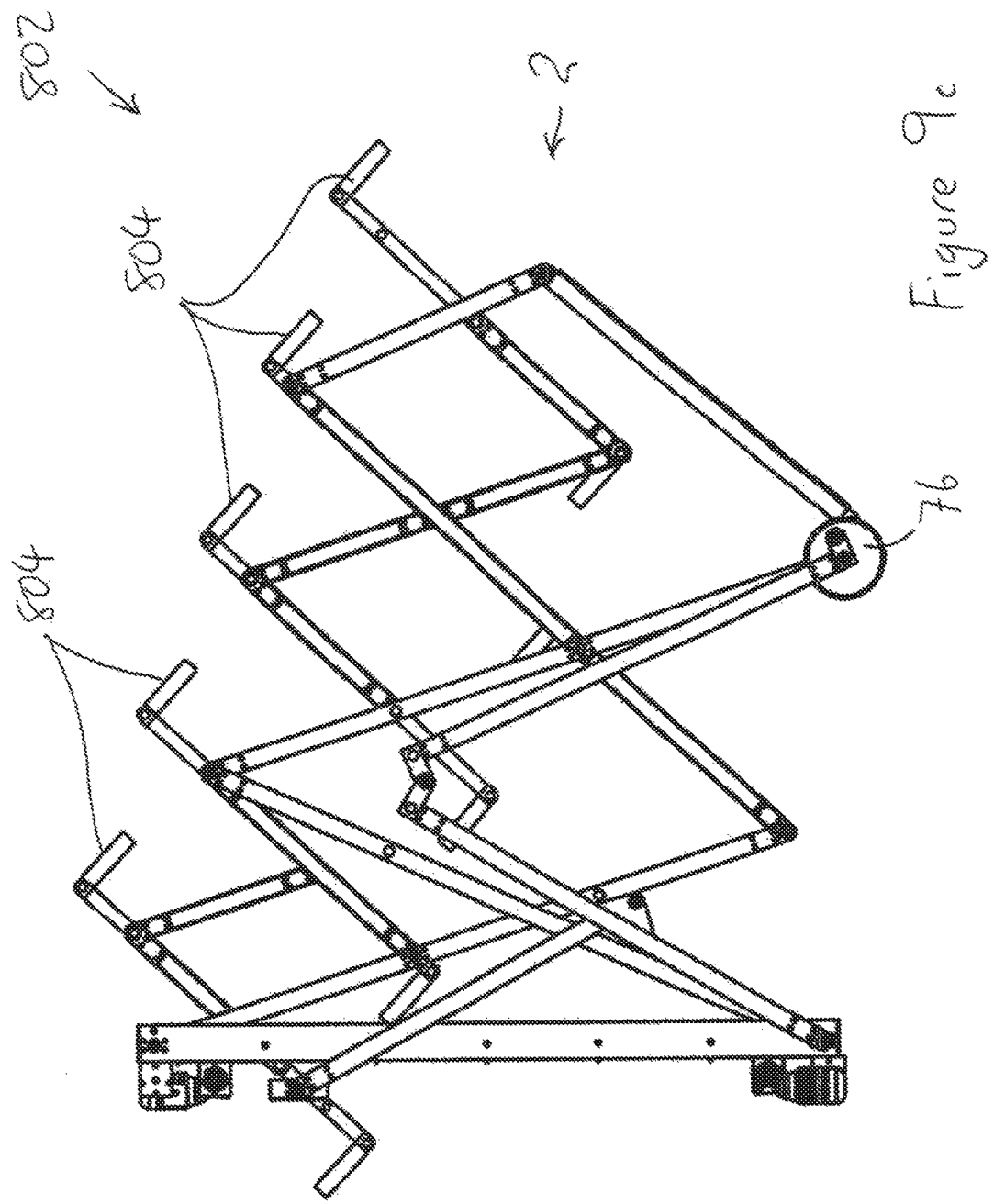

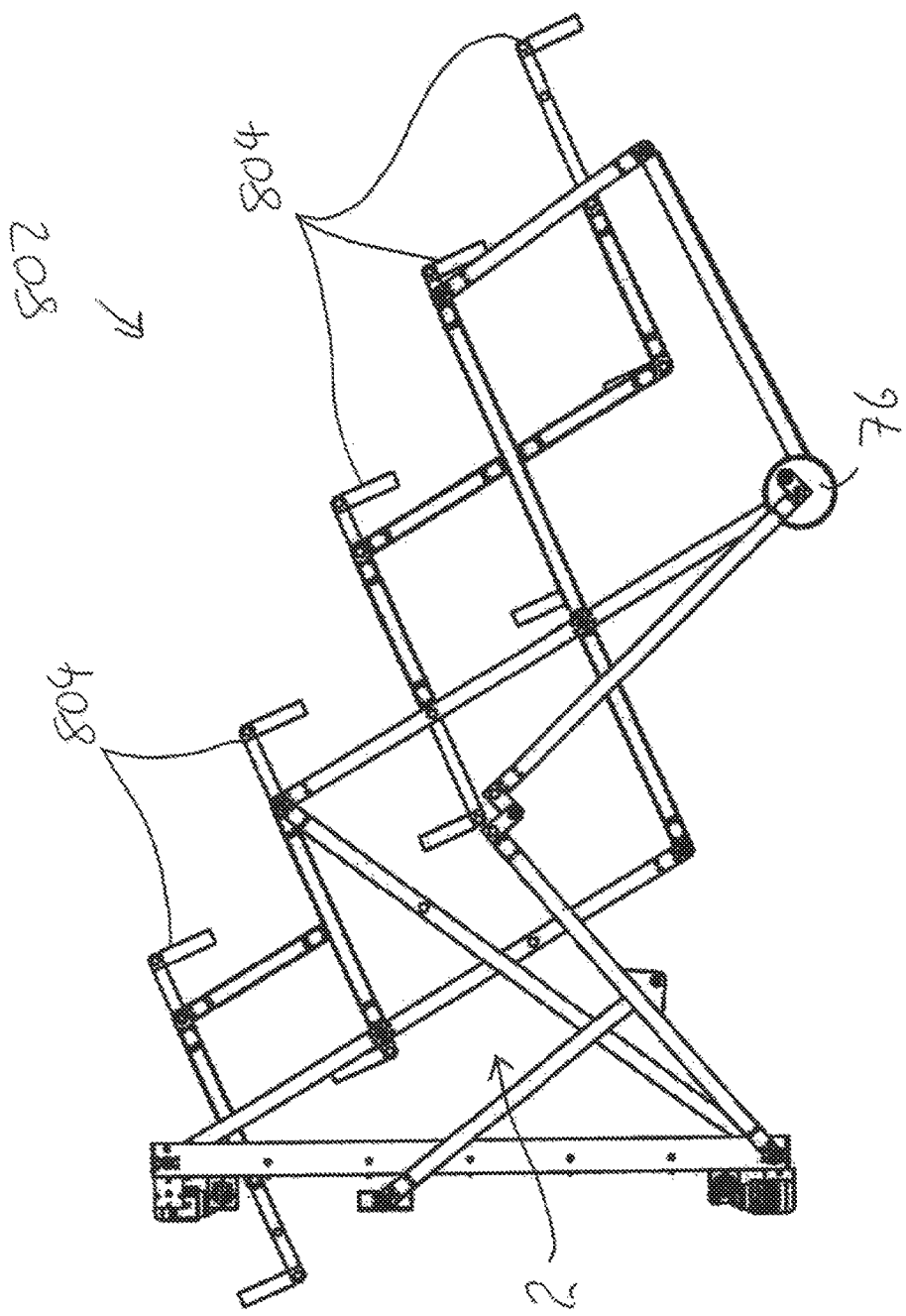

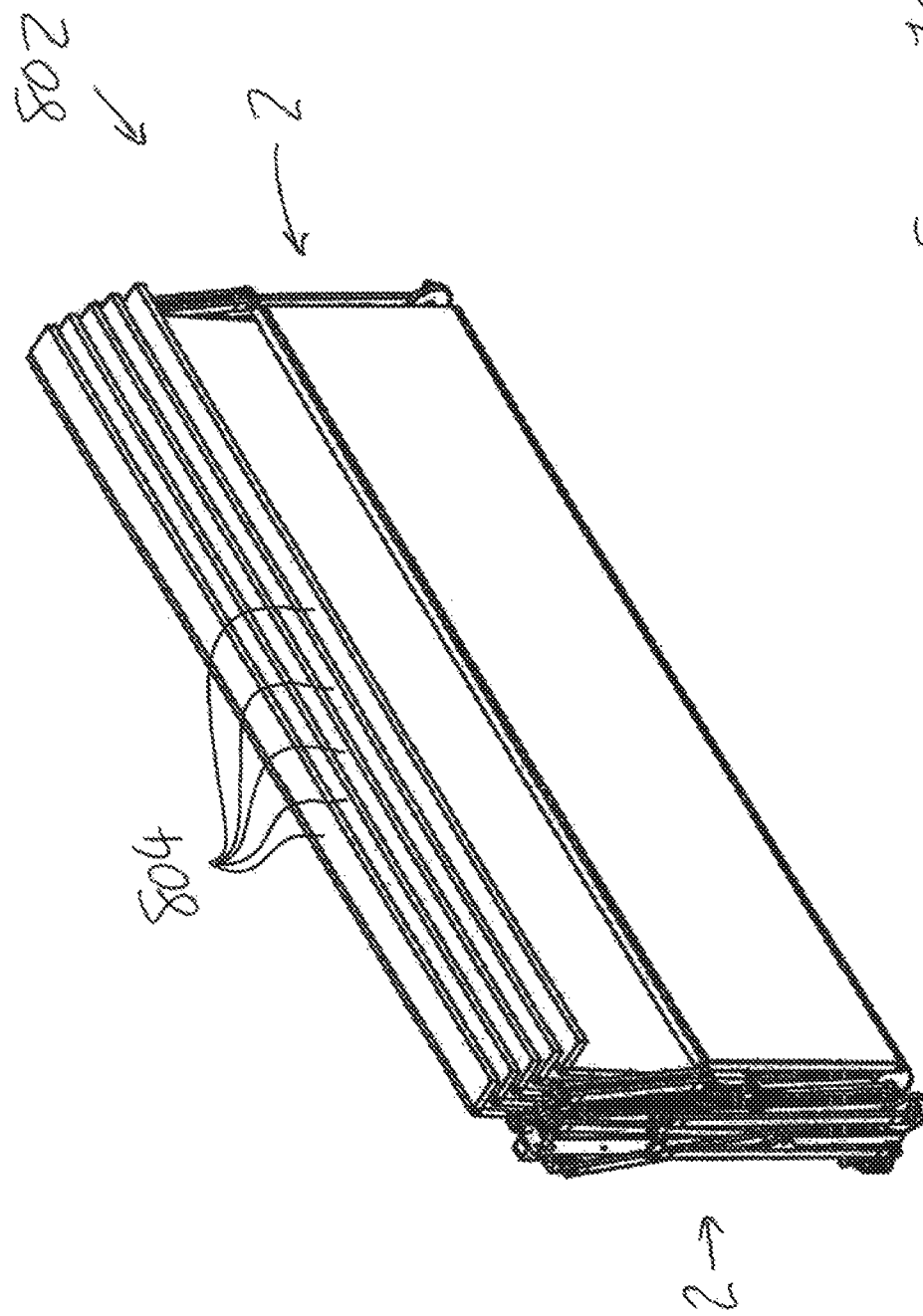

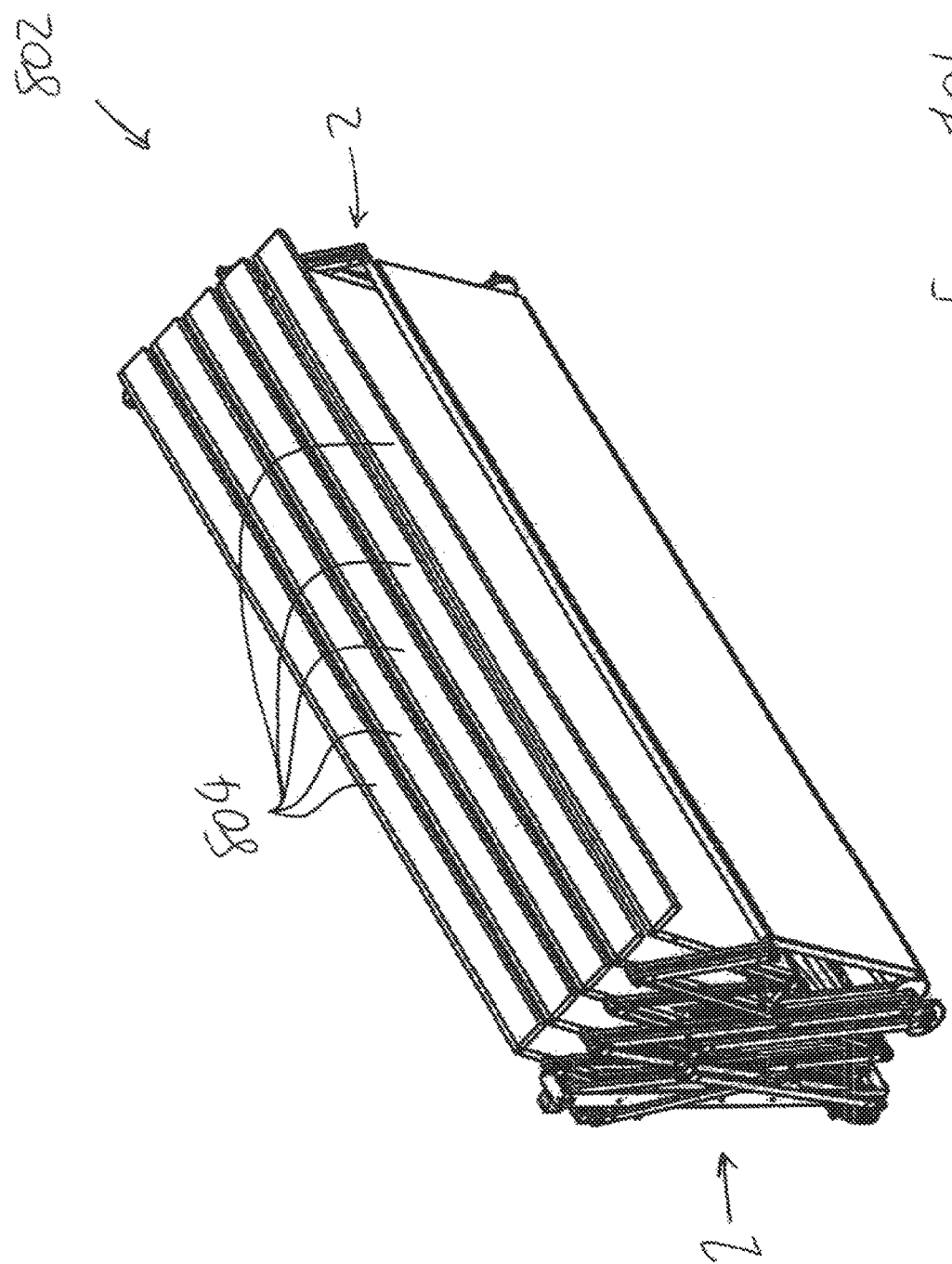

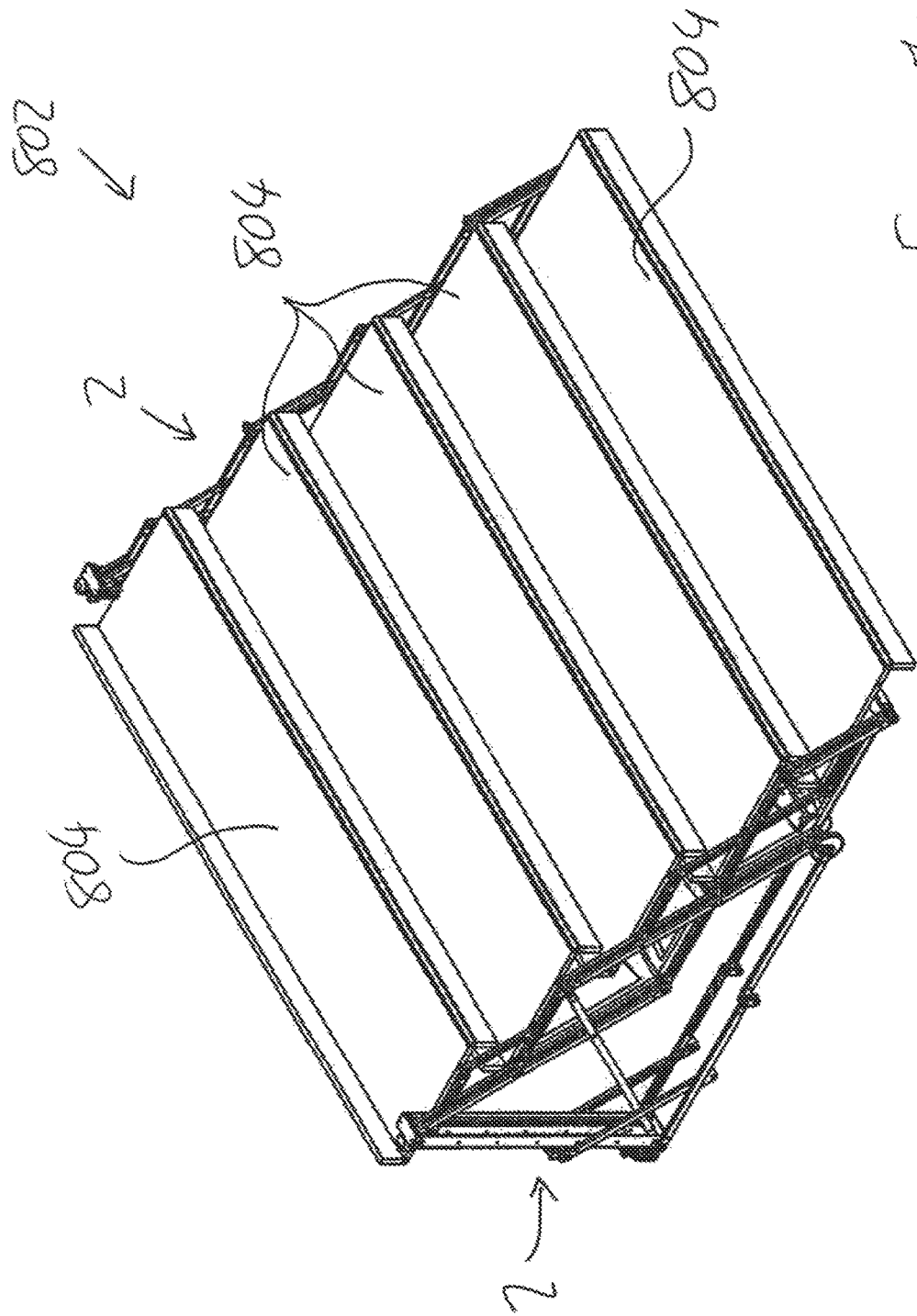

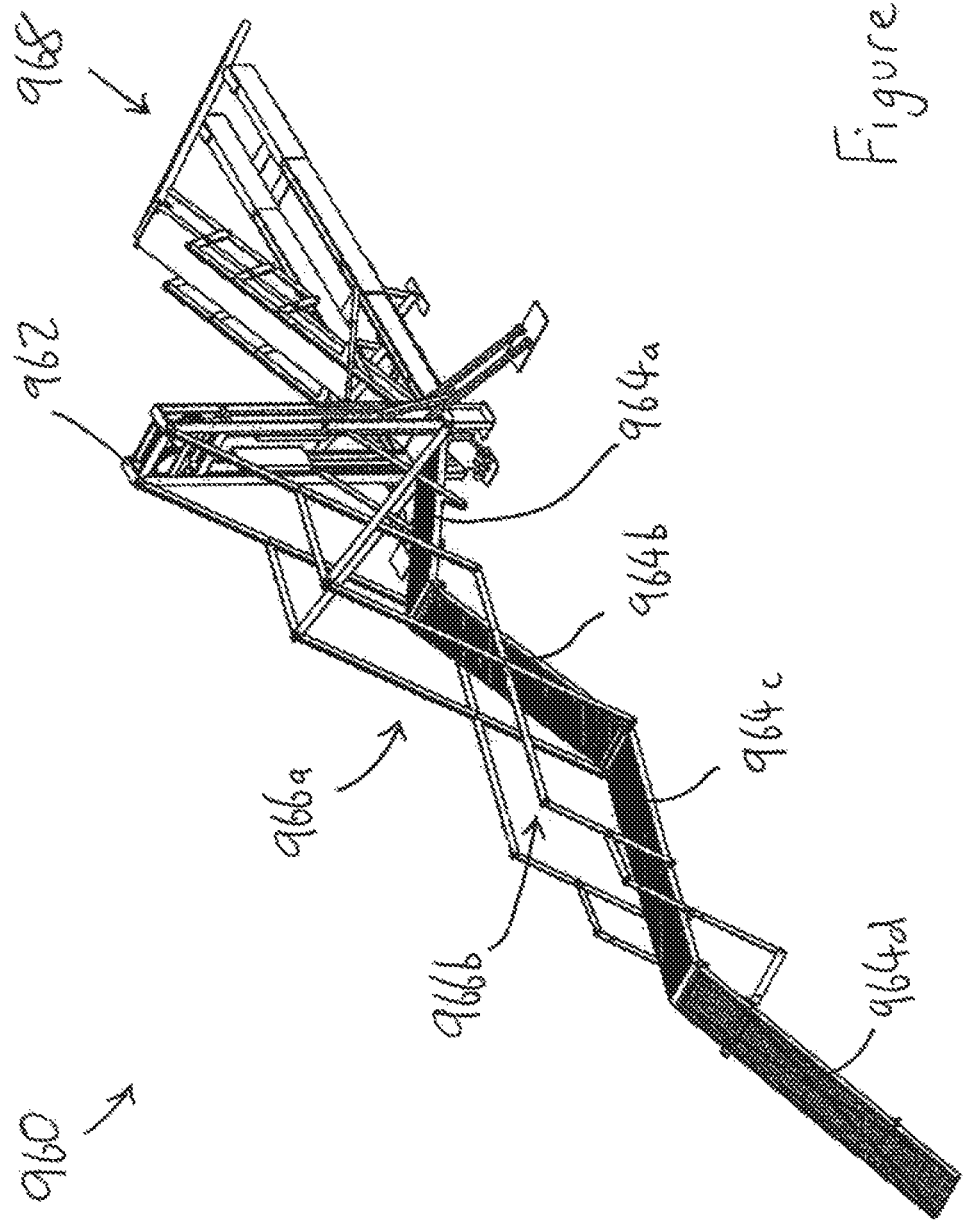

APPARATUS FOR CONVERTING MOTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal way by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of interconnected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for movement of the moveable member in a straight path with respect to the fixed member.

There is a need for an improved assembly for providing a straight line motion, in particular for providing an element moveable in a straight line in response to a rotational motion. It would be most advantageous if the assembly could be arranged in a compact form, thereby occupying only a small volume of space.

Perhaps most recently, WO 2013/182834 discloses an assembly for converting motion. The assembly comprises a plurality of arms, in particular a first arm rotatable at a first position thereon about a first fixed pivot; a second arm rotatable at a first position thereon about a second fixed pivot, the second fixed pivot spaced apart from the first fixed pivot; a third arm pivotably connected at a first position thereon to the second arm at a second position on the second arm, the second position spaced apart from the first position on the second arm; a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm at a third position thereon. The assembly finds use in a range of applications, for example supporting and moving components of a building. In one embodiment described and shown in WO 2013/182834, the assembly is employed in deploying a solar panel array.

A modification to the assembly of WO 2013/182834 has now been found. This new assembly is also for converting a rotary motion into a straight line motion and relies upon an assembly of levers or arms having pivoted connections therebetween. However, the new assembly provides increased displacement of components supported by the assembly when in the fully extended position, thereby significantly increasing the utility of the earlier assembly.

According to the present invention, there is provided in a first aspect an assembly for converting motion, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a fourth arm pivotably connected at a first position thereon to a second position on the first arm spaced apart from the first position and pivotably connected at a second position thereon spaced apart from the first position thereon to the third arm at second position on the third arm spaced apart from the first position;

a connecting arm extending between the first arm and the second arm, the second connecting arm pivotably connected to a third position on the first arm disposed between the first and second positions thereon and pivotably connected to a third position on the second arm; and a support arm pivotably connected at a first position thereon to a third position on the fourth arm, the third position on the fourth arm being spaced from the first and second positions thereon and beyond the second position in the direction from the first position to the second position.

In operation of the assembly, the assembly is moveable between a retracted position, in which the components of the assembly and a component or structure connected thereto may be considered to be in a stowed condition, and an extended position, in which the component or structure may be considered to be in a deployed condition. In operation, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position, moves in a straight line. Thus, rotational motion of the first arm and the second arm about their respective fixed pivots results in a straight line motion of the said point on the third arm. Consequently, a component or structure to be deployed in a straight line can be supported and moved by being connected to the third arm at the said point.

In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The support arm is connected to an extends from the fourth arm, as recited above. In operation, points on the support arm moves through an arc, as the assembly moves between the retracted and extended positions. The component or structure to be moved is also connected to the support arm. It is to be noted that the support may be positioned and of a length, such that a point on the support arm lies on an extension of the straight line followed by the said point in the third arm when in the extended position. In this way, a component or structure may be connected to both the third arm and the support arm and be deployed on a straight line extending from the second pivot.

The assembly of the present invention provides a number of significant advantages, in particular compared with the linkages and mechanisms of the prior art, such as those discussed above. First, in preferred embodiments of the assembly, the said point on the third arm moves in a substantially straight line extending perpendicular to the line joining the first and second fixed pivots. This is a particularly advantageous arrangement, for example when employing the assembly in a building to provide movement of one portion of the building with respect to another, such as moving a portion of the building laterally from a fixed building structure. As noted above, the support arm can be arranged to have a point that lies on an extension of the straight line followed by the said point of the third arm, thereby allowing a component or structure to be deployed to lie on a straight line.

Second, the assembly of the present invention may be arranged such that the arms of the assembly are accommodated one within the other in a very compact configuration, for example all lying between the first and second fixed pivots. This compactness is a significant advantage of the assembly of this invention.

Further, the components of the assembly may be arranged to move only on one side of a line joining the first and second fixed pivot points between the retracted and extended positions. The support arm may be arranged to always be the forwardmost point of the assembly in the direction of motion from the retracted position to the extended position. This arrangement provides significant advantages over known assemblies, where the point moving in a straight line is contained within or otherwise surrounded by other components of the assembly.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first and second positions on the third arm, preferably with the said point being located at the free end of the third arm or in an end portion at the free end of the arm.

Similarly, in one embodiment, the support arm may be arranged to have an end portion distal from the first position thereon, with the end portion lying on the aforementioned extended straight line, when in the deployed condition.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the third arm describes an approximate straight line of 2750 mm in length. In particular, the said point moves between a first or retracted position and a second or extended position. In this respect, references to motion of the said point are with respect to the line joining the first and second fixed pivots, with the retracted position being at or close to the line joining the first and second fixed pivots and the retracted position being distant therefrom. As noted, the said point on the third arm moves between the retracted position and the extended position, with the line joining the retracted and extended positions being a straight line perpendicular to the line extending between the first and second pivots. However, in moving between the retracted and extended positions, the said point follows a sine wave having a maximum deviation from the straight line of 8 mm. This deviation represents a deviation of just 0.25% of the distance traveled by the said point between the retracted and extended positions and is generally insignificant in the context of most if not all practical applications of the assembly.

In another embodiment of the assembly in which the distance between the first fixed pivot and the second fixed pivot is 3250 mm, the said point on the third arm describes an approximate straight line of 3254 mm in length. In this embodiment, the deviation of the said point moves in a sine wave having a maximum deviation from a straight line of just 31.4 mm, that is just 0.96% of the distance traveled by the said point.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the third arm follows a substantially straight line. Other points on the third arm follow a respective arc.

It has been found that the aforementioned assembly provides a number of significant advantages. First, the point of the assembly that traces a straight line moves away from the mechanism. As noted, the assembly may be considered to be movable from a retracted position to an extended position, with a point on the third arm moving in a straight line between the retracted and extended positions. The point on the third arm moves in a straight line away from the retracted position to the extended position. In particular, the assembly is such that, in operation, a point on the third arm traces a straight line that extends away from the first and second fixed pivot points, in particular from the line joining the first and second pivot points.

More particularly, in many embodiments, the straight line path followed by the said point on the third arm extends perpendicular to the line joining the first and second pivot points. Similarly, the support arm may be arranged so that in the extended position it extends from the fourth arm to the extended straight line traced by the said point in the third arm, such that in the extended position, the said point on the third arm and a point on the support arm lie in a straight line extending perpendicular to the line joining the first and second fixed pivots. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

It is particularly advantageous that the assembly has embodiments in which the second fixed pivot, the said point on the third arm and a point on the support arm lie on a straight line when in the extended position.

The arms of the assembly may be constructed such that the arms may be accommodated one within another. The components of the assembly may be arranged such that, when in the retracted position, the third arm and first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted above, the assembly of the present invention provides a motion of the said point on the third arm that follows a straight line over a specific extent of its movement. The close approximation of the movement of the said point on the third arm to a straight line between the retracted and extended positions makes the assembly of the present invention particularly useful as a straight line converter, that is able to convert a rotational movement of the first and/or second arms about the first and second fixed pivots respectively, into a straight line motion of the said point on the third arm.

As noted, operation of the assembly results in motion of the third arm. It is to be understood that the assembly may be used to convert a rotational motion of the first or second arms about the first or second fixed pivots into a motion of the said point on the third arm and motion of the support arm, that is by having drive to the assembly provided at the first or second arms. Alternatively, the assembly may be used to convert a motion of the third arm into a rotational motion of the first and second arms, that is by having drive to the assembly applied at the third arm and/or the support arm.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move. The first position may be in any suitable location on the arm. In one preferred embodiment, the first position is at or adjacent one end of the arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. The assembly of the present invention is particularly advantageous when the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move. The first position may be in any suitable location on the second arm. In one preferred embodiment, the first position is at or adjacent one end of the second arm.

The second arm is moved about the second fixed pivot under the action of either movement of the first arm or the third arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and extended positions. This point on the third arm is spaced apart from the first position on the third arm, that is the position on the third arm at which the second and third arms are pivotably connected together. The third arm may be a driven arm, that is moved under the action of movement of the first and second arms. In this case, rotation of the first arm about the first fixed pivot causes the third arm to move, such that the said point on the third arm follows the straight line path between the retracted and extended positions. Alternatively, the third arm may be a driving arm, that is have a force applied thereto resulting in movement of the third arm, which in turn drives the other components of the assembly to result in movement of the first arm about the first fixed pivot. For example, application of a straight line force to the said point on the third arm between the retracted and extended positions results in rotational movement of the first arm about the first fixed pivot.

The distance between the first and second fixed pivots and the lengths of the first, second and third arms may be selected according to the desired movement of the components to be achieved and the particular application of the assembly.

Generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second position on the second arm moves about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm has a length of about 0.975. In alternative embodiments, the length of the third arm is the same as that of the first arm and/or the second arm. In one particularly preferred arrangement, the first, second and third arms are the same length.

The assembly further comprises a fourth arm. The fourth arm is pivotably connected at a first position thereon to a second position on the first arm. The second position on the first arm is spaced apart from the first position on the first arm. The fourth arm is also pivotably connected at a second position thereon, spaced apart from the first position thereon, to the third arm at second position on the third arm. The second position on the third arm is spaced apart from the first position on the third arm.

A preferred form for the fourth arm is an elongate member, for example a bar or a rod. The fourth arm is pivotably mounted to each of the first and third arms, as already noted. The pivotable connections between the fourth arm and each of the first and third arms may be of any suitable form, preferably a pin, spindle or axle passing through the arms about which one or both of the arms are free to move.

The pivotable connections may be at any suitable location on the fourth arm. In one preferred embodiment, the pivotable connection between the fourth arm and the first arm is at or adjacent one end of the fourth arm. The pivotable connection between the fourth arm and the third arm is at a position on the fourth arm between the connection with the first arm and the distal end of the fourth arm, such that the fourth arm extends beyond the third arm in the direction in which the assembly is deployed when moving from the retracted position to the extended position. In this way, the support arm is connected to the fourth arm distal of the third arm, as described below.

The fourth arm is connected to the first arm at a second position on the first arm. The second position on the first arm is spaced apart from the first position on the first arm. In one preferred embodiment, the second position on the first arm is at or adjacent the second end of the first arm, that is distal of the first fixed pivot.

The fourth arm is further connected to the third arm at a second position on the third arm, which second position is spaced apart from the first position on the third arm. The second position on the third arm is between the first position on the third arm and the said point on the third arm.

The fourth arm may have any suitable length. The length of the fourth arm is determined, for example, by the distance the support arm is to be spaced from the third arm, when in the extended position.

The second position on the third arm, at which the fourth arm is connected, may be selected according to a number of factors. First, the fourth arm acts to provide support for the third arm, in particular to assist in supporting any load applied to the third arm. The requirement for the third arm to be supported in this manner by the fourth arm is a factor in determining the location of the second position on the third arm. Second, the overall strength and stability of the assembly is related to the length of the portion of the fourth arm between the first arm and the third arm, with the strength and stability reducing as the length of the this portion of the fourth arm increases.

The second position on the third arm may be at any suitable position. In particular, the ratio of the distance between the first position and the second position on the third arm and the distance between the first position and the said point on the third arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.41 to about 0.47.

The assembly further comprises a connecting arm. The connecting arm extends between the first arm and the second arm. The connecting arm may have any shape and configuration. A preferred form for the connecting arm is an elongate member, for example a bar or a rod. The connecting arm is pivotably mounted to each of the first and second arms. The pivotable connections between the connecting arm and each of the first and second arms may be of any suitable form, preferably a pin, spindle or axle passing through the arms about which one or both of the arms are free to move.

The pivotable connections may be at any suitable location on the connecting arm. In one preferred embodiment, the pivotable connection between the connecting arm and the first arm is at or adjacent one end of the connecting arm and/or the pivotable connection between the connecting arm and the second arm is at or adjacent the second end of the connecting arm.

The connecting arm is connected to the first arm at a third position on the first arm, which third position is spaced apart from and between both the first and second positions on the first arm.

The third position on the first arm, at which the connecting arm is connected, may be selected according to a number of factors. First, the connecting arm acts to provide support for the first arm, in particular to assist in supporting any load applied to the first arm. The requirement for the first arm to be supported in this manner by the connecting arm is a factor in determining the location of the third position on the first arm. Second, as with the fourth arm, the overall strength and stability of the assembly is related to the length of the connecting arm between the first and second arms, with the strength and stability reducing as the length of the connecting arm between the first and second arms increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The connecting arm is further connected to the second arm at a third position on the second arm. In one embodiment of the assembly, the third position is spaced apart from and between the first and second positions on the second arm. In an alternative, preferred, embodiment, the third position on the second arm coincides with the second position on the second arm, such that the connecting arm is connected to both the second and third arms. This arrangement has the advantage of being particularly compact and easier to construct, while also providing strength and rigidity to the assembly.

The third position on the second arm is at or spaced from the second position on the second arm and may be at any suitable position. In particular, the ratio of the distance between the first position and the third position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the third position on the second arm and the distance between the first position and the second position on the second arm about 0.95 to 1.0.

The connecting arm may have any suitable length. Its length is preferably the distance between the positions on the first and second arms between which the connecting arm extends.

The assembly further comprises a support arm. The support arm is pivotably connected at a first position thereon to a third position on the fourth arm. The third position on the fourth arm is spaced from the first and second positions thereon and beyond the second position in the direction from the first position to the second position, that is the direction the assembly moves from the retracted position to the extended position. The support arm may have any shape and configuration. A preferred form for the support arm is an elongate member, for example a bar or a rod. The support arm is pivotably mounted to the fourth arm. The pivotable connection between the support arm and the fourth arm may be of any suitable form, preferably a pin, spindle or axle passing through the arms about which one or both of the arms are free to move.

The support arm is pivotably connected to the fourth arm at a first position on the support arm. The first position may be at any suitable location on the support arm. In a preferred embodiment, the first position is at or adjacent a first end of the support arm.

The support arm is pivotably connected to the fourth arm at a third position on the fourth arm. The third position on the fourth arm is spaced from both the first position and the second position on the fourth arm and is distal of the second position. The length of the fourth arm between the second and third positions, that is between the third arm and the support arm, may be determined by the duty of the assembly, more particularly by the load to be supported by the support arm. The extension of the fourth arm beyond the third arm and the provision of a support arm pivotally connected to the fourth arm as described above increases both the load bearing capacity and the reach of the assembly, compared with the assembly of WO 2013/182834, while maintaining the many advantages of that assembly.

Increasing the length of the fourth arm between its second and third positions increases the bending moment on the fourth arm, for a given load applied to the support arm. Conversely, decreasing the said length decreases the bending moment applied to the fourth arm for the given load on the support arm.

In use, a component or structure to be moved may be connected to the said point on the third arm, allowing the component or structure to be moved in a straight line from the fixed pivot points. The component or structure is also connected to the support arm at a second position on the support arm. This arrangement is particularly advantageous, as both the third arm and the support arm are connected to the component or structure during movement and the in the extended position, thereby both providing support to the component or structure. As noted above, it is particularly advantageous that the said point on the third arm and the second position on the support arm can be arranged on a single straight line, in particular extending from the second fixed pivot, when the assembly is in the extended position. In this way, a component or structure can be deployed by the third arm and the support arm of the assembly along a straight line.

The third arm and/or the support arm, most preferably both the third arm and the support arm, may be pivotably connected to the component or structure to be deployed by the assembly.

The support arm may be of a length that extends from the first position on the support arm to the point on the aforementioned straight line when the assembly is in the extended position. This point is referred to herein as the second position on the support arm.

As noted, the component to be moved and supported is connected to the third arm and the support arm, in particular at the said point on the third arm and the second position on the support arm. As also noted, the component is preferably pivotably connected to the third arm and the support arm. It is particularly preferred that the component is formed from a plurality of members hingedly attached to one another. Alternatively, hingedly attached connecting members are preferably provided between the third arm and the structure providing the first and second fixed pivots.

The basic components of the assembly of the present invention have been described above. However, it has been found that one or more of the arms may be extended beyond the positions indicated above, for example to provide support or movement of other components. Alternatively or in addition, further arms may be added to the assembly, in order to extend the reach of the assembly and/or to provide support or movement for components.

In one embodiment, the assembly further comprises a second support arm pivotably connected to the support arm at a third position spaced from both the first and second positions on the support arm and located distally of the second position. In the extended position, the support arm extends from its first position beyond the aforementioned straight line and the third position on the support arm lies on the opposite side of the aforementioned straight line to the first position of the support arm.

The third position on the support arm may be at any suitable position on the arm. Preferably, in this embodiment, the third position on the support arm is at or adjacent the second end of the arm.

The second support arm may have any shape and configuration. A preferred form for the second support arm is an elongate member, for example a bar or a rod. The second support arm is pivotably mounted to the support arm. The pivotable connection between the second support arm and the support arm may be of any suitable form, preferably a pin, spindle or axle passing through the arms about which one or both of the arms are free to move.

The second support arm is pivotably connected to the support arm at a first position on the second support arm. The first position may be at any suitable location on the second support arm. In a preferred embodiment, the first position is at or adjacent a first end of the second support arm.

The second support arm is pivotably connected to the support arm at a third position on the support arm. The third position on the support arm is spaced from both the first position and the second position on the support arm and is distal of the second position. That is, the second position on the support arm lies between the first and third positions thereon. The length of the support arm between the second and third positions may be determined by the duty of the assembly, more particularly by the load to be supported by the second support arm.

The second support arm extends from the third position on the support arm and has a point that can be arranged to lie on the extended straight line in the extended position described above, the said point being distal of both the said point on the third arm and the second position on the support arm. This point on the second support arm is referred to herein as the second position on the second support arm.

A component to be moved and supported by the assembly may also be connected to the second support arm, in particular the second position on the second support arm.

The extension of the support arm beyond its second position and the provision of a second support arm pivotally connected to the support arm as described above still further increases both the load bearing capacity and the reach of the assembly, compared with the assembly of WO 2013/182834, while maintaining the many advantages of that assembly.

Increasing the length of the support arm between its second and third positions increases the bending moment on the support arm, for a given load applied to the second support arm. Conversely, decreasing the said length decreases the bending moment applied to the support arm for the given load on the second support arm.

In use of this embodiment, a component or structure to be moved may be connected to the said point on the third arm, allowing the component or structure to be moved in a straight line from the fixed pivot points. The component or structure is also connected to both the support arm and the second support arm, in particular the second position on each of the support arm and the second support arm. This arrangement is particularly advantageous, as all of the third arm, the support arm and the second support arm are connected to the component or structure during movement and the in the extended position, thereby both providing support to the component or structure. Further, it is particularly advantageous, as the said point on the third arm, the second position on the support arm and a point on the second support arm can be arranged on a single straight line, in particular extending from the second fixed pivot, when the assembly is in the extended position. In this way, a component or structure can be deployed by the third arm, the support arm and the second support arm of the assembly along a straight line.

As with the third arm and/or the support arm, the second support arm is preferably pivotally connected to the component or structure to be deployed by the assembly.

As noted, the component to be moved and supported is connected to the third arm, the support arm and the second support arm, in particular at the said point on the third arm, the second position on the support arm, and the second position on the second support arm. As also noted, the component is preferably pivotally connected to the third arm, the support arm and the second support arm. It is particularly preferred that the component is formed from a plurality of members hingedly attached to one another. Alternatively, hingedly attached connecting members are preferably provided between the third arm and the structure providing the first and second fixed pivots, and/or between the support arm and the second support arm.

The second support arm may be of a length that extends from the third position on the support arm to the second position on the second support arm, such that the second position is at or adjacent the second end of the second support arm.

In an alternative embodiment, the assembly further comprises the second support arm pivotally connected to the support arm at a third position spaced between the first and second positions on the support arm. In the extended position, the support arm extends in the distal direction from the support arm.

The second support arm may have any shape and configuration. A preferred form for the second support arm is an elongate member, for example a bar or a rod. The second support arm is pivotally mounted to the support arm. The pivotable connection between the second support arm and the support arm may be of any suitable form, preferably a pin, spindle or axle passing through the arms about which one or both of the arms are free to move.

The second support arm is pivotably connected to the support arm at a first position on the second support arm. The first position may be at any suitable location on the second support arm. In a preferred embodiment, the first position is at or adjacent a first end of the second support arm.

The second support arm is pivotably connected to the support arm at a third position on the support arm. The third position on the support arm is between the first position and the second position on the support arm. The length of the support arm between the first and third positions, and the second and third positions may be determined by the duty of the assembly, more particularly by the load to be supported by the second support arm.

In this embodiment, a third support arm is pivotally connected at a first position thereon to a second position on the second support arm. The second position on the second support arm is spaced from the first position thereon. The second position on the second support arm may be at an end of the second support arm.

The third support arm may have any shape and configuration. A preferred form for the third support arm is an elongate member, for example a bar or a rod. The third support arm is pivotally mounted to the second support arm. The pivotable connection between the support arm and the fourth arm may be of any suitable form, preferably a pin, spindle or axle passing through the arms about which one or both of the arms are free to move.

The third support arm is pivotably connected to the second support arm at a first position on the third support arm. The first position may be at any suitable location on the third support arm. In a preferred embodiment, the first position is at or adjacent a first end of the third support arm.

The third support arm is pivotably connected to the second support arm at a second position on the second support arm. The second position on the second support arm is spaced from the first position and is distal of the first position, in an extended position. The length of the second support arm between the first and second positions, that is between the support arm and the third support arm, may be determined by the duty of the assembly, more particularly by the load to be supported by the third support arm and/or the distance from the fixed pivots. The second support arm and the provision of a third support arm pivotally connected to the second support arm as described above further increases both the load bearing capacity and the reach of the assembly, compared with the assembly of WO 2013/182834, while maintaining the many advantages of that assembly.

In this embodiment, the third support arm extends from the second position on the second support arm and has a point that can be arranged to lie on the extended straight line in the extended position described above, the said point being distal of both the said point on the third arm and the second position on the support arm. This point on the third support arm is referred to herein as the second position on the third support arm.

The third support arm may extend beyond its second position. Preferably, a fourth support arm is pivotally connected to the third support arm at a third position spaced from both the first and second positions on the support arm and located distally of the second position. In the extended position, the third support arm extends from its first position beyond the aforementioned straight line and the third position on the third support arm lies on the opposite side of the aforementioned straight line to the first position of the support arm.

The third position on the third support arm may be at any suitable position on the arm. Preferably, in this embodiment, the third position on the third support arm is at or adjacent the second end of the arm.

The fourth support arm may have any shape and configuration. A preferred form for the fourth support arm is an elongate member, for example a bar or a rod. The fourth support arm is pivotably mounted to the third support arm. The pivotable connection between the arms may be of any suitable form, preferably a pin, spindle or axle passing through the arms about which one or both of the arms are free to move.

The fourth support arm is pivotably connected to the third support arm at a first position on the fourth support arm. The first position may be at any suitable location on the fourth support arm. In a preferred embodiment, the first position is at or adjacent a first end of the fourth support arm.

The fourth support arm is pivotably connected to the third support arm at a third position on the third support arm. The third position on the third support arm is spaced from both the first position and the second position on the third support arm and is distal of the second position. The length of the third support arm between the second and third positions may be determined by the duty of the assembly, more particularly by the load to be supported by the third support arm.

The fourth support arm extends from the third position on the third support arm and has a point that can be arranged to lie on the extended straight line in the extended position described above, the said point being distal of the said point on the third arm, the second position on the support arm and the second position on the third support arm. This point on the fourth support arm is referred to herein as the second position on the fourth support arm.

The extension of the third support arm beyond its second position and the provision of a fourth support arm pivotably connected to the third support arm as described above still further increases both the load bearing capacity and the reach of the assembly, compared with the assembly of WO 2013/182834, while maintaining the many advantages of that assembly.

Increasing the length of the third support arm between its second and third positions increases the bending moment on the arm, for a given load applied to the fourth support arm. Conversely, decreasing the said length decreases the bending moment applied to the third support arm for the given load on the fourth support arm.

In use of this embodiment, a component or structure to be moved may be connected to the said point on the third arm, allowing the component or structure to be moved in a straight line from the fixed pivot points. The component or structure may also be connected to the support arm, the third support arm and/or the fourth support arm. This arrangement is particularly advantageous, as all of the third arm, the support arm, the third support arm and the fourth support arm are connected to the component or structure during movement and the in the extended position, thereby providing support to the component or structure. Further, it is particularly advantageous, as the said point on the third arm, the second position on the support arm, the second position on the third support arm and the second position on the third arm can be arranged on a single straight line, in particular extending from the second fixed pivot, when the assembly is in the extended position. In this way, a component or structure can be deployed by the third arm, the support arm, the third support arm and the fourth support arm of the assembly along a straight line.

The fourth support arm is preferably pivotably connected to the component or structure to be deployed by the assembly.

The fourth support arm may be of a length that extends from the third position on the third support arm to the second position on the fourth support arm, such that the second position is at or adjacent the second end of the fourth support arm.

As noted, the component to be moved and supported is connected to the third arm, the third support arm and the fourth support arm, in particular at the said point on the third arm, the second position on the third support arm, and the second position on the fourth support arm. As also noted, the component is preferably pivotably connected to the third arm, the third support arm and the fourth support arm. It is particularly preferred that the component is formed from a plurality of members hingedly attached to one another. Alternatively, hingedly attached connecting members are preferably provided between the third arm and the structure providing the first and second fixed pivots, and/or between the third support arm and the fourth support arm.

In a further embodiment, the assembly comprises a fifth arm. The fifth arm is pivotably connected at a first position thereon to a fourth position on the second arm spaced apart from the first position on the second arm. In a preferred embodiment, the fifth arm is pivotably connected to the second arm at the same position as the connecting arm, such that the fifth arm is also pivotably connected to the connecting arm.

A preferred form for the fifth arm is an elongate member, for example a bar or a rod. The fifth arm is pivotably mounted to the second arm and, preferably, the connecting arm, as already noted. The pivotable connections may be of any suitable form, preferably a pin, spindle or axle passing through the arms about which one or both of the arms are free to move.

The pivotable connections may be at any suitable location on the fifth arm. In one preferred embodiment, the pivotable connection between the fifth arm and the second arm is at or adjacent one end of the fifth arm.

The fifth arm may have any suitable length. The length of the fifth arm is determined, for example, by the load to be moved and supported when the assembly in the extended position.

The assembly of this embodiment further comprises a sixth arm. The sixth arm is pivotably connected at a first position thereon to a second position on the fifth arm. The second position on the fifth arm is spaced apart from the first position on the fifth arm.

A preferred form for the sixth arm is an elongate member, for example a bar or a rod. The pivotable connection between the sixth arm and the fifth arm may be of any suitable form, preferably a pin, spindle or axle passing through the arms about which one or both of the arms are free to move.

The pivotable connections may be at any suitable location on the sixth arm. In one preferred embodiment, the pivotable connection between the sixth arm and the fifth arm is at or adjacent one end of the sixth arm.

The sixth arm may have any suitable length. The length of the sixth arm is determined, for example, by the position and load to be supported, when in the extended position.

In the extended position, the fifth and sixth arms preferably extend along a straight line, more preferably a straight line extending substantially parallel to the straight line followed by the said point on the third arm.

The assembly of this embodiment further comprises a second connecting arm. The second connecting arm is pivotally connected at a first position thereon to the first arm, at a fourth position on the first arm, and at a second position thereon to the third position on the fifth arm. The pivotal connection between the second connecting arm and the first arm is preferably at the same position on the first arm as the connection between the first and fourth arms, such that the second connecting arm is also pivotally connected to the fourth arm. The pivotal connection between the second connecting arm and the fifth arm at the third position on the fifth arm is between the first and second positions on the fifth arm.

A preferred form for the second connecting arm is an elongate member, for example a bar or a rod. The second connecting arm is pivotably mounted to the first and fifth arms, as already noted. The pivotable connections may be of any suitable form, preferably a pin, spindle or axle passing through the arms about which one or both of the arms are free to move.

The pivotable connections may be at any suitable location on the second connecting arm. In one preferred embodiment, the pivotable connection between the first arm and the second connecting arm is at or adjacent one end of the second connecting arm. The connection between the second connecting arm and the fifth is preferably at or adjacent one end of the second connecting arm.

The second connecting arm may have any suitable length. The length of the second connecting arm is preferably the distance between the first and second positions thereon.

The assembly of this embodiment further comprises a third connecting arm. The third connecting arm is pivotally connected at a first position thereon to the third arm and at a second position thereon to the sixth arm. The pivotal connection between the third connecting arm and the third arm is preferably at the said position on the third arm. The pivotal connection between the third connecting arm and the sixth arm is at a second position on the sixth arm. In one embodiment the second position on the sixth arm is at or adjacent the distal end of the sixth arm.

A preferred form for the third connecting arm is an elongate member, for example a bar or a rod. The third connecting arm is pivotably mounted to the third and sixth arms, as already noted. The pivotable connections may be of any suitable form, preferably a pin, spindle or axle passing through the arms about which one or both of the arms are free to move.

The pivotable connections may be at any suitable location on the third connecting arm. In one preferred embodiment, the pivotable connection between the third arm and the third connecting arm is at or adjacent one end of the third connecting arm. The connection between the third connecting arm and the sixth arm is preferably at or adjacent one end of the third connecting arm.

The third connecting arm may have any suitable length. The length of the third connecting arm is preferably the distance between the first and second positions thereon.

The assembly of this embodiment further comprises a supporting arm. The supporting arm is pivotally connected at a first position thereon to the sixth arm, at a third position on the sixth arm, and at a second position thereon to a component to be moved and supported in the extended position. The pivotal connection between the supporting arm and the sixth arm is preferably at the same position on the sixth arm as the connection between the third connecting arm and the sixth arm, such that the supporting arm is also pivotally connected to the third connecting arm.

A preferred form for the supporting arm is an elongate member, for example a bar or a rod. The supporting arm is pivotably mounted to the sixth arm and a component to be moved and supported, as already noted. The pivotable connections may be of any suitable form, preferably a pin, spindle or axle passing through the arms about which one or both of the arms are free to move.

The pivotable connections may be at any suitable location on the supporting arm. In one preferred embodiment, the pivotable connection between the sixth arm and the supporting arm is at or adjacent one end of the third support arm. The connection between the supporting arm and the component is preferably at or adjacent one end of the supporting arm.

The supporting arm may have any suitable length. The length of the supporting arm is preferably the distance between the first and second positions thereon.

The supporting arm extends from the third position on the sixth arm and has a point that can be arranged to lie on the extended straight line in the extended position described above, the said point being distal of both the said point on the third arm and the second position on the support arm. This point on the supporting arm is referred to herein as the second position on the supporting arm.

In use of this embodiment, a component or structure to be moved may be connected to the said point on the third arm, allowing the component or structure to be moved in a straight line from the fixed pivot points. The component or structure is also connected to both the support arm and the supporting arm, in particular the second position on each of the support arm and the supporting arm. This arrangement is particularly advantageous, as all of the third arm, the support arm and the supporting arm are connected to the component or structure during movement and the in the extended position, thereby both providing support to the component or structure. Further, it is particularly advantageous, as the said point on the third arm, the second position on the support arm and a point on the supporting arm can be arranged on a single straight line, in particular extending from the second fixed pivot, when the assembly is in the extended position. In this way, a component or structure can be deployed by the third arm, the support arm and the supporting arm of the assembly along a straight line.

As with the third arm and/or the support arm, the supporting arm is preferably pivotably connected to the component or structure to be deployed by the assembly.

As noted, the component to be moved and supported is connected to the third arm, the support arm and the supporting arm, in particular at the said point on the third arm, the second position on the support arm, and the second position on the supporting arm. As also noted, the component is preferably pivotably connected to the third arm, the support arm and the supporting arm. It is particularly preferred that the component is formed from a plurality of members hingedly attached to one another. Alternatively, hingedly attached connecting members are preferably provided between the third arm and the structure providing the first and second fixed pivots, and/or between the support arm and the supporting arm.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between two of the arms and connecting arms. In one preferred embodiment, the movement of the third arm is limited by the components being moved and supported, such that in the extended position the components themselves limit further movement of the third arm, in particular movement of the said point away from the first and second fixed pivots.

In a particularly preferred embodiment of the assembly of the present invention, the lengths of the arms are selected in accordance with the above criteria and to fold up when in the retracted position to lie between the first and second fixed pivots. It is a particular advantage that the assembly can be arranged to be in such a compact form when in the retracted position. In a preferred embodiment, the arms are formed with portions having 'I' and 'L' shapes in cross-section, with the portions being arranged to allow the arms to be accommodated within one another when in the retracted position.

It is a further advantage of the assembly of present invention that it is highly scaleable and may be constructed and applied at a wide range of scales to convert motion, as described hereinbefore.

The assembly finds wide applications and uses, in particular by allowing relative movement between a first component and a second component.

Accordingly, in a further aspect, the present invention provides an assembly comprising a first component and a second component, the first component being arranged for movement with respect to the second component, wherein an assembly as hereinbefore described is provided between the first component and second component, operation of the assembly providing movement of the first component with respect to the second component.

One of the first and second components is connected to the third arm of the assembly. The other of the first and second components provides the first and second fixed pivot points to which the first and second arms are pivotally connected. In this way, movement of the first component with respect to the second component is effected. As noted above, such relative movement may be effected by applying a force to one or more of the arms of the assembly.

The assembly comprising the first and second components finds extensive use in providing relative movement between two components. For example, the assembly finds use in moving a first component connected to either of the first or second arms and rotating about the respective first or second fixed pivot and a second component connected to the said point on the third arm and moveable in a linear motion between the retracted and extended positions. Further, the assembly finds use in displacing and rotating a first component connected to the third arm relative to the first or second fixed pivots or the line extending therebetween.

In many applications, a plurality of the aforementioned assemblies is employed. In particular, a plurality of assemblies may be employed in a spaced apart relationship on opposing sides of an object to be moved. For example, a first and second assembly may be provided on opposing sides of an object to be moved with the third arms of two assemblies connected to opposing sides of the object.

Applications of the assembly of the present invention to convert rotational motion to linear motion include the support and movement of building structures relative to one another.

Accordingly, the present invention further provides a building comprising:

a first building portion and a second building portion, the first building portion being moveable relative to the second building portion between a retracted position and an extended position;

wherein relative movement between the first and the second building portions and support of one of the first and second building portions with respect to the other of the first and second building portions are provided by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include balconies, floor extensions, roof extensions, canopies and the like.

Any components may be moved and supported in this manner using the assembly of the present invention. Examples include temporary installations, such as walls, partitions, and signs, such as road signs. In one embodiment, the component to be moved is the deck of a bridge.

Accordingly, in a further aspect, the present invention provides a bridge assembly, comprising:

a support assembly;

a deck assembly;

wherein the deck assembly is connected to the support assembly and moved relative thereto by an assembly as hereinbefore described.

In one preferred embodiment of the bridge assembly, the deck assembly comprises a plurality of deck portions, preferably with adjacent deck portions being hingedly attached to each other, whereby the deck assembly is unfolded from a stowed condition to an extended position by the assembly of the present invention moving into the extended position.

It is particularly preferred that the assemblies used to move the bridge deck have the connecting arm and the fourth arm parallel to one another in the extended or deployed position, more preferably with both the connecting arm and the fourth arm extending parallel to the deck assembly, for example substantially horizontally.

In another embodiment, the component to be moved is a seating array of a seating assembly for a stand or stadium.

Accordingly, in a further aspect, the present invention provides a seating assembly, comprising:

a support assembly;

a seating array having a plurality of seats;

wherein the seating array is connected to the support assembly and moved relative thereto by an assembly as hereinbefore described.

The principles and operation of the assembly of the present invention will be further explained by reference to the accompanying drawings, in which:

FIG. 1 is a simplified diagrammatical representation of an assembly according to the present invention in the extended position;

FIG. 2c is a side view of the assembly of FIG. 2a in a second partially extended position;

FIG. 2d is a side view of the assembly of FIG. 2a in a third partially extended position;

FIG. 2e is a side view of the assembly of FIG. 2a in a fourth partially extended position;

FIG. 2f is a side view of the assembly of FIG. 2a in an extended position;

FIGS. 3a to 3f are perspective views of the assembly in the positions from the retracted position to the extended position and corresponding to FIGS. 2a to 2f;

FIG. 5 is a simplified diagrammatical representation of an assembly according to a still further embodiment of the present invention in the extended position;

FIG. 6e is a side view of the assembly of FIG. 6a in a fourth partially extended position;

FIGS. 7a to 7f are perspective views of the assembly in the positions from the retracted position to the extended position and corresponding to FIGS. 6a to 6f;

FIGS. 8a to 8f are side views of the assembly of FIGS. 2a to 2f in an inverted orientation in positions from the retracted position to the extended position;

FIGS. 9a to 9f are side views of the assembly of FIGS. 2a to 2f employed in an expandable seating assembly in positions from the retracted position to the extended position;

FIGS. 10a to 10f are perspective views of the seating assembly of FIGS. 9a to 9f in the positions from the retracted position to the extended position and corresponding to FIGS. 9a to 9f;

FIGS. 12a and 12b are perspective views of a bridge assembly comprising the assembly of FIG. 11.

Figure 2A:
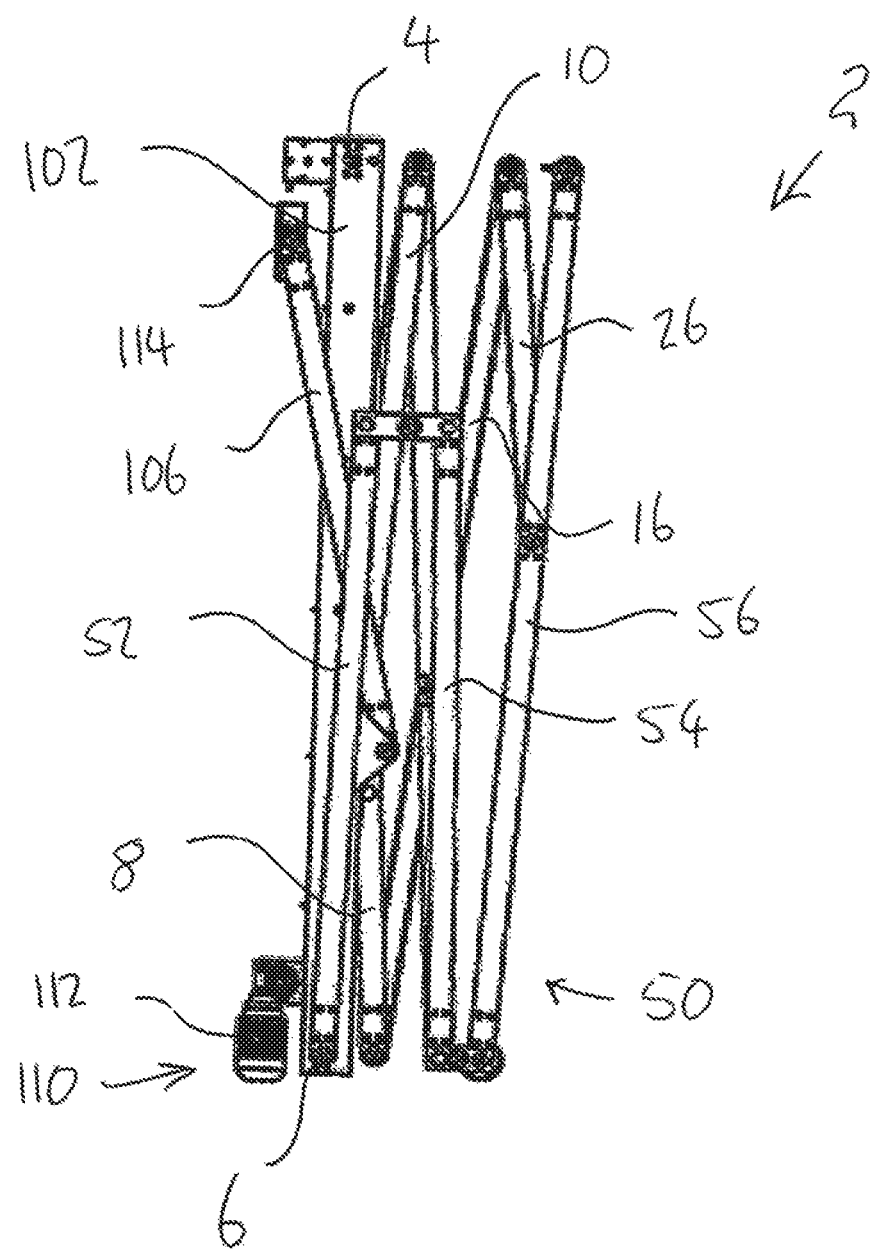
FIG. 2a is a side view of the assembly of one embodiment of the present invention in a retracted position.

Turning to FIG. 1, there is shown a diagrammatical representation of an assembly of one embodiment of the present invention, generally indicated as 2. The assembly 2 is shown mounted to a fixed structure at a first fixed pivot 4 and a second fixed pivot 6. The fixed pivots 4, 6 are spaced apart and are fixed in relation to one another. In the embodiment shown in FIG. 1, the first and second fixed pivots are arranged on a vertical line.

A first arm 8 is pivotally connected at a first position at one end to the first fixed pivot 4. A second arm 10 is pivotally connected at a first position at one end to the second fixed pivot 6. A third arm 12 is mounted at one end by a pivot connection 14 at the second end of the second arm 10.

A fourth arm 16 is mounted at one end by a pivot connection 18 at the second end of the first arm 8. The fourth arm 16 is mounted at a second position thereon by a pivot connection 20 to the third arm at a second position on the third arm 12.

A connecting arm 22 is mounted at one end by a pivot connection 24 to the first arm 8 at a third position on the first arm spaced from both the first and second positions thereon. The second end of the connecting arm 22 is mounted by a pivot connection to the second arm 10. In the embodiment shown in FIG. 1, the pivot connection between the connecting arm 22 and the second arm 10 is at the first end of the second arm and coincides with the pivot connection 14, such that the connecting arm is pivotally connected to both the second arm 10 and the third arm 12.

As shown in FIG. 1, the fourth arm 16 extends in the distal direction (that is to the right in FIG. 1) beyond the third arm 12. The assembly of FIG. 1 further comprises a support arm 26. The support arm 26 is connected by a pivot connection 28 at one end thereof to the distal end of the fourth arm 16.

The pivot connections between the arms may be formed by any suitable means, for example by pins extending through holes in the arms being pivotally joined.

Movement of the first arm 8 about the first fixed pivot 4 and the second arm 10 about the second fixed pivot 6 causes the third arm 12 to move such that a point A on the third arm moves between a retracted position and an extended position. In moving between the retracted and extended positions, the point A describes a substantially straight line.

A component to be moved can be connected to either or both the third arm 12 and the support arm 26. In particular, the point A on the third arm 12 and a point B on the support arm 26 may be connected, for example by a component to be moved, with the result that the points A and B lie on a straight line extending from the second fixed pivot 6. In the embodiment shown in FIG. 1, the line joining points A and B extends perpendicular to the line joining the first and second fixed pivots 4, 6.

Turning now to FIGS. 2a to 2f, there is shown a sequence of drawings of a side view of an assembly of the embodiment of FIG. 1 in positions between a retracted position, shown in FIG. 2a, and an extended position shown in FIG. 2f. The components of the assembly of FIGS. 2a to 2g have been identified using the same reference numerals as used in relation to FIG. 1 and discussed above.

The assembly in FIGS. 2a to 2f is supporting and moving a component 50 comprising three hingedly connected members 52, 54 and 56. The component 50 may be a support structure for providing support to one or more items to be moved and supported, with the items being connected to the component 50. Alternatively, the component 50 may itself be formed by the item to be moved and supported.

The sequence of views of FIGS. 2a to 2f are shown in perspective view in FIGS. 3a to 3f.

Referring to FIG. 2a, the assembly 2 is shown in a retracted position held within a frame 102, providing the mounting for the fixed pivots 4 and 6. The arms of the assembly are formed to lie within one another when in the retracted position of FIG. 2a. The form of the arms is shown in FIGS. 3a to 3f. In particular, it can be seen that the first, second and third arms and the support arm are each formed of a plurality of parallel arm members, allowing the arms to lie within one another in the retracted position. In this way, the assembly 2 occupies the minimum amount of space when in the retracted position.

Figure 2B:
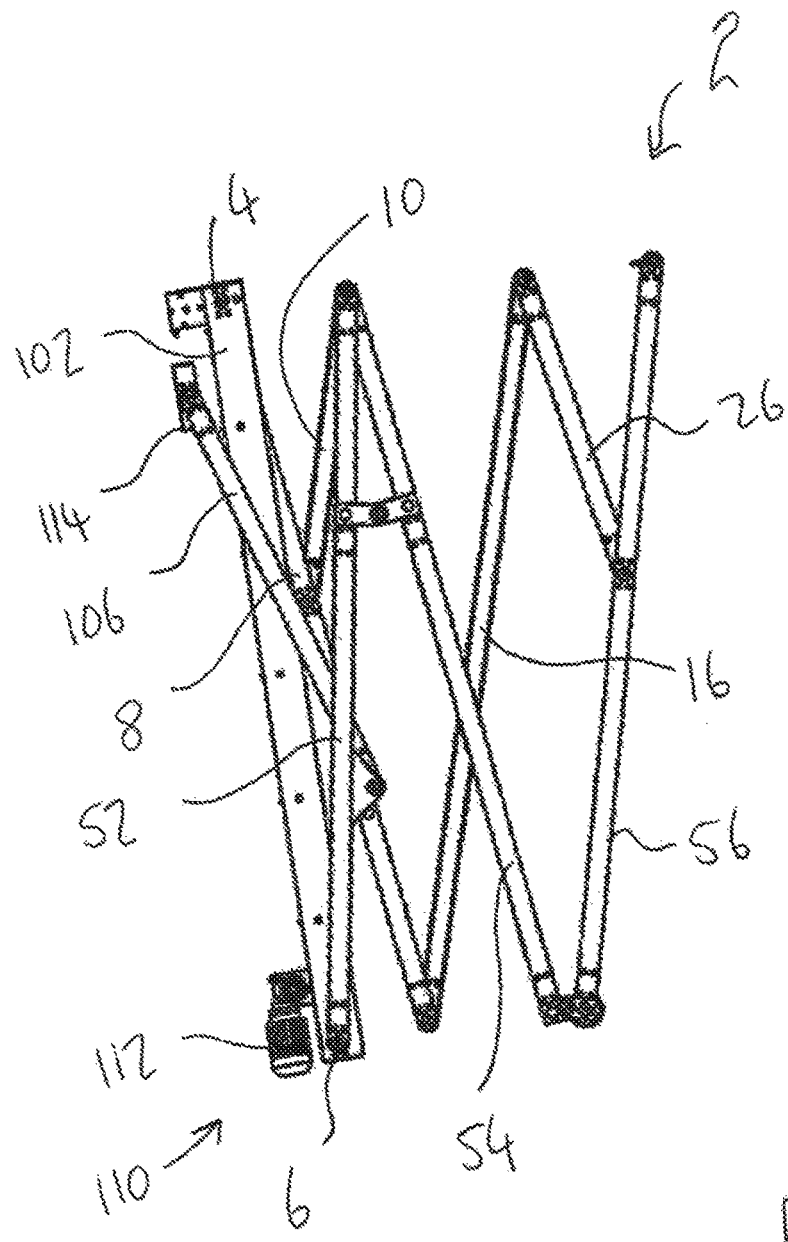
FIG. 2b is a side view of the assembly of FIG. 2a in a first partially extended position.
Figure 3A:
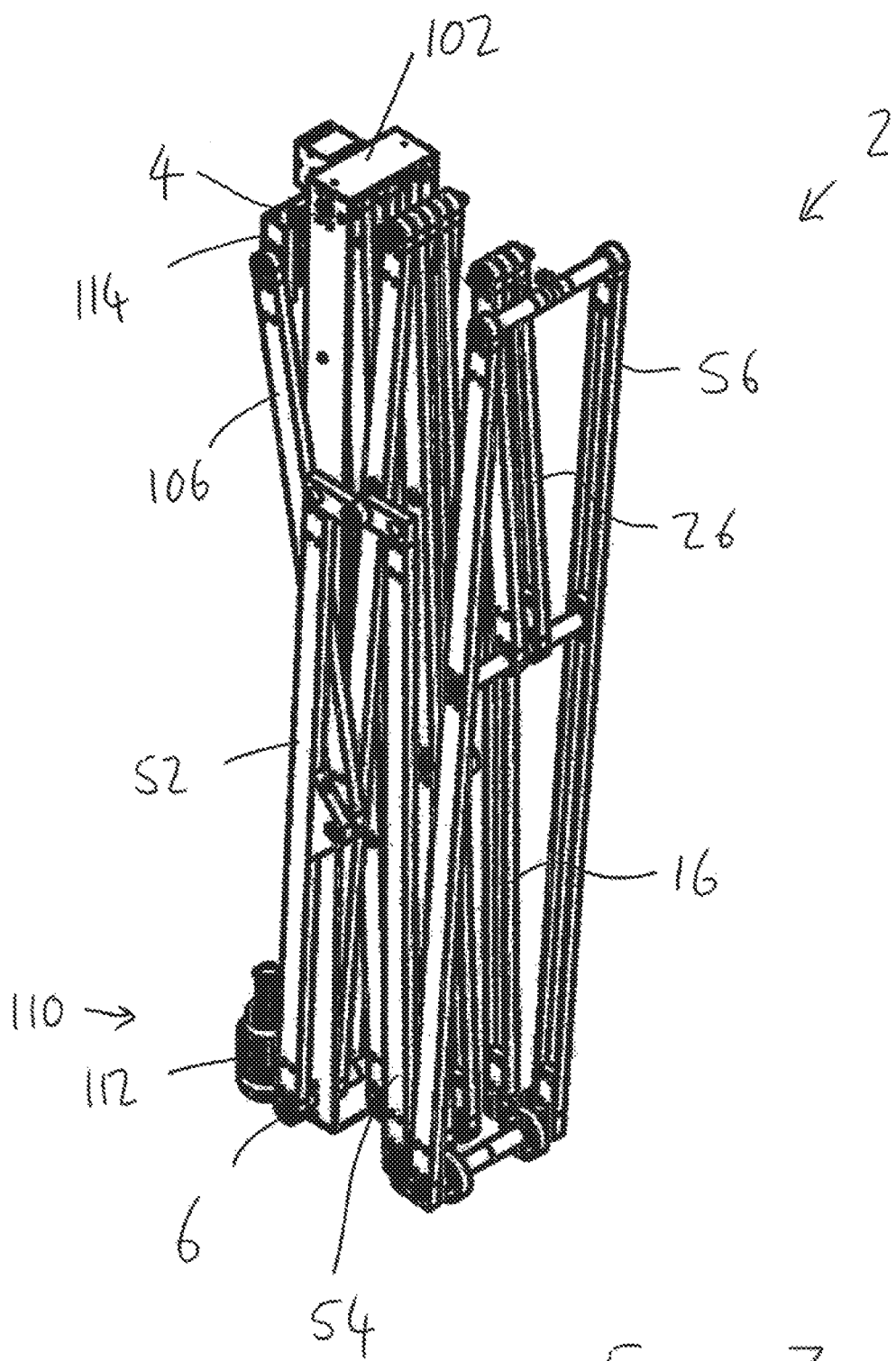
Figure 3B:
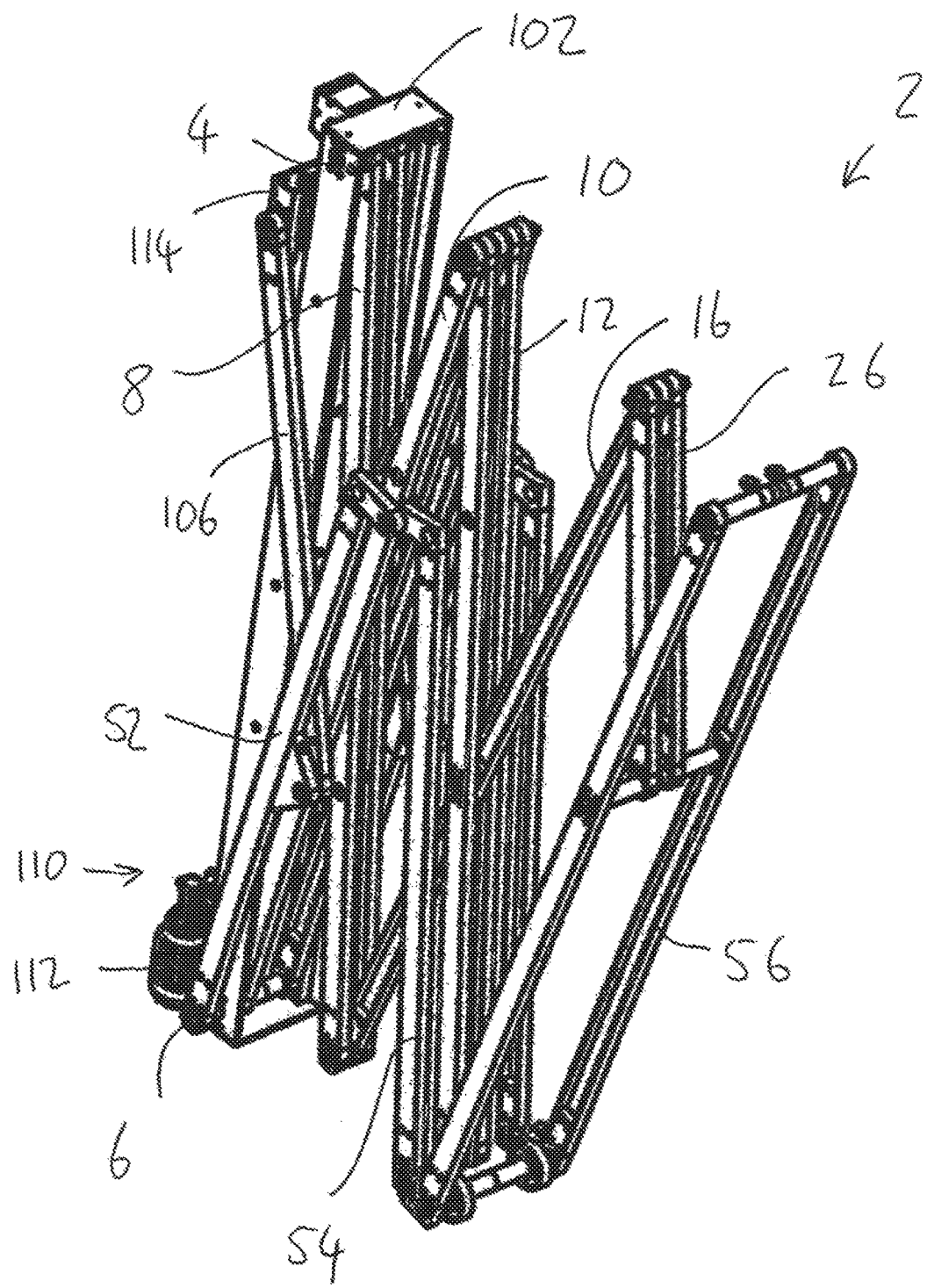
Figure 3C:
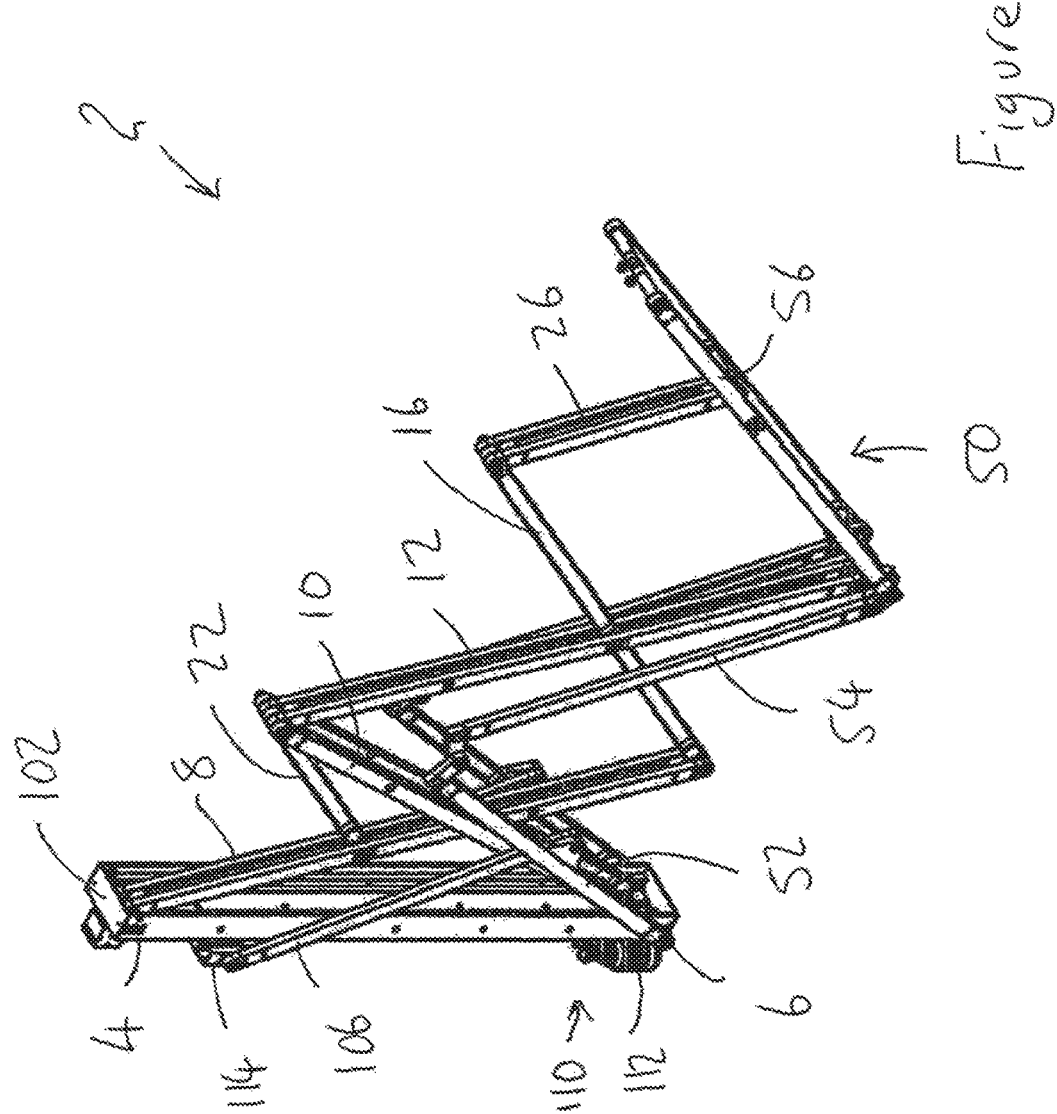

The assembly 2 is shown in FIG. 2b in a first partially extended position, with the third arm 12 having moved away from the fixed pivots 4, 6 and the frame 102, that is to the left as viewed in the figure. In the movement from the position of FIG. 2a to the position of FIG. 2b, the point A at the end of the third arm 12 is following a substantially straight line.

FIG. 2c shows the assembly 2 in a second partially extended position, with the third arm 12 moved further away from the fixed pivots 4, 6. Again, point A on the third arm 12 is tracing a substantially straight line from its position in the retracted position of FIG. 2a.

Similarly, FIGS. 2d and 2e shows the assembly 2 in third and fourth partially extended positions, with the third arm 12 still further from the fixed pivots 4, 6 and the point A on the third arm 12 still following a straight line path.

FIG. 2f shows the assembly 2 in its extended position, that is with the third arm 12 at a position where the point A is at the end of the straight line path followed from the retracted position. The extended position is shown in perspective in FIG. 3f. As can be seen, the component 50 extends in a straight line from the second fixed pivot 6.

FIGS. 2a to 2f and 3a to 3f show one example of a drive system to operate the assembly. In the embodiment shown in FIGS. 2a to 2f and 3a to 3f, the movement of the arms is driven by a drive mechanism, generally indicated as 110. The drive mechanism 110 comprises a motor 112 rotating a screw (not visible in the figures) extending within the frame 102. A slider 114 is moveable on the frame 102 and is connected to the screw, such that rotation of the screw by the motor moves the slider 114 up or down the frame 102. Drive arms 106 are pivotably connected at one end to the slider 114 and pivotably connected at the other end to the member 52. In the retracted position, shown in FIGS. 2a and 3a, the slider is positioned in the upper portion of the frame 102. Operation of the motor 112 draws the slider 114 downwards, as viewed in the figures, causing the drive arms 106 to urge the member 52 outwards, away from the frame 102. Reversing the direction of rotation of the motor 112 and the screw raised the slider 114 and draws the assembly into the retracted position.

Figure 4:
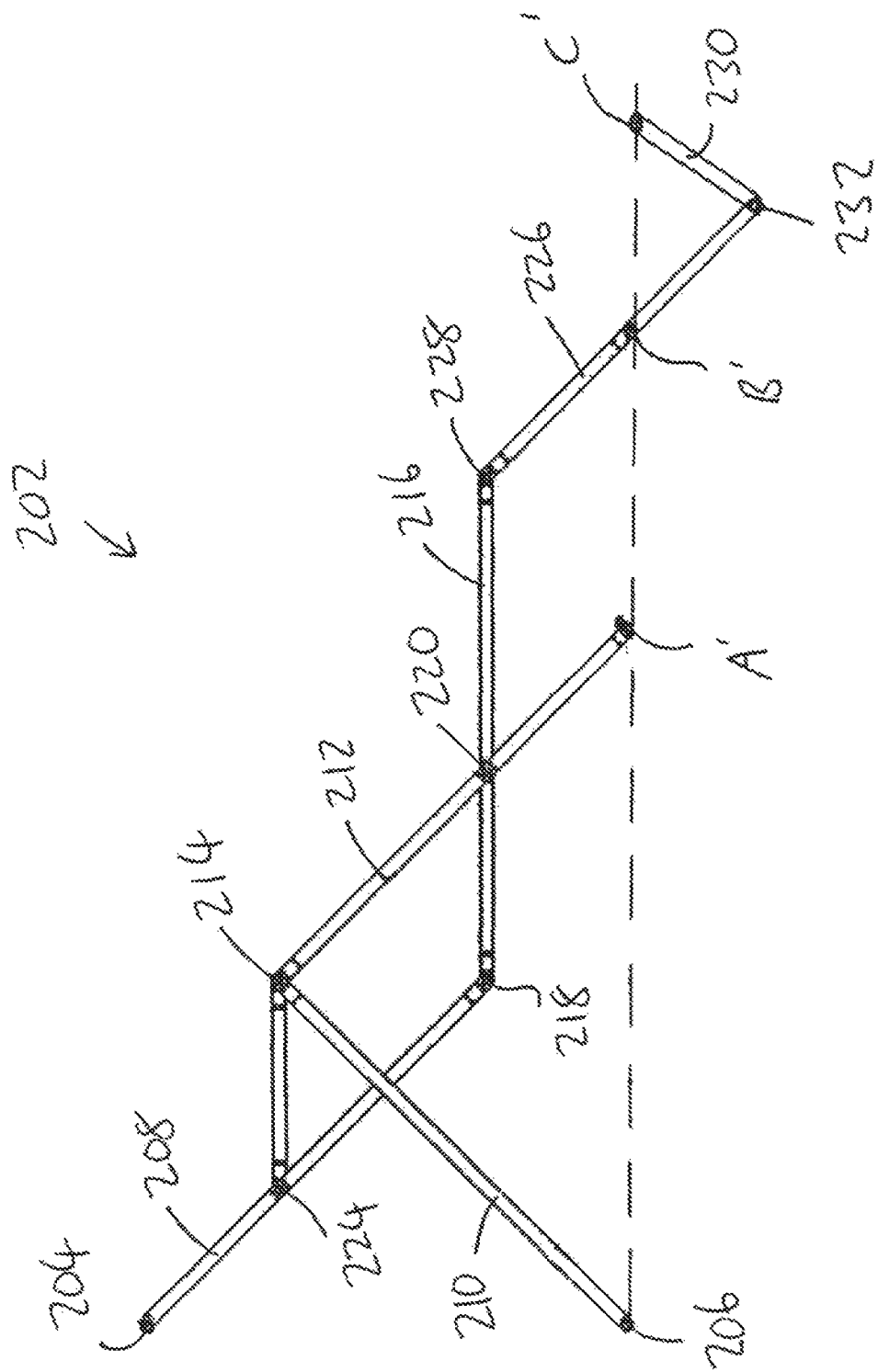
FIG. 4 is a simplified diagrammatical representation of an assembly according to a further embodiment of the present invention in the extended position.

Referring to FIG. 4, there is shown a further embodiment of an assembly according to the present invention. The assembly 202 is shown mounted to a fixed structure at a first fixed pivot 204 and a second fixed pivot 206. The fixed pivots 204, 206 are spaced apart and are fixed in relation to one another. In the embodiment shown in FIG. 4, the first and second fixed pivots are arranged on a vertical line.

A first arm 208 is pivotally connected at a first position at one end to the first fixed pivot 204. A second arm 210 is pivotally connected at a first position at one end to the second fixed pivot 206. A third arm 212 is mounted at one end by a pivot connection 214 at the second end of the second arm 210.

A fourth arm 216 is mounted at one end by a pivot connection 218 at the second end of the first arm 208. The fourth arm 216 is mounted at a second position thereon by a pivot connection 220 to the third arm at a second position on the third arm 212.

A connecting arm 222 is mounted at one end by a pivot connection 224 to the first arm 208 at a third position on the first arm spaced from both the first and second positions thereon. The second end of the connecting arm 222 is mounted by a pivot connection to the second arm 210. In the embodiment shown in FIG. 4, the pivot connection between the connecting arm 222 and the second arm 210 is at the first end of the second arm and coincides with the pivot connection 214, such that the connecting arm is pivotally connected to both the second arm 210 and the third arm 212.

As shown in FIG. 4, the fourth arm 216 extends in the distal direction (that is to the right in FIG. 4) beyond the third arm 212. The assembly further comprises a first support arm 226. The first support arm 226 is connected by a pivot connection 228 at one end thereof to the distal end of the fourth arm 216. A second support arm 230 is connected at one end by a pivot connection 232 to the second end of the first support arm 226.

The pivot connections between the arms may be formed by any suitable means, for example by pins extending through holes in the arms being pivotally joined.

Movement of the first arm 208 about the first fixed pivot 204 and the second arm 210 about the second fixed pivot 206 causes the third arm 212 to move such that a point A' on the third arm moves between a retracted position and an extended position. In moving between the retracted and extended positions, the point A' describes a substantially straight line.

A component to be moved can be connected to one or more of the third arm 212, the first support arm 226 and the second support arm 230. In particular, the point A' on the third arm 212, a point B' on the first support arm 226 and a point C' on the second support arm 230 may be connected, for example by a component to be moved, with the result that the points A', B' and C' lie on a straight line extending from the second fixed pivot 206. In the embodiment shown in FIG. 4, the line joining points A', B' and C' extends perpendicular to the line joining the first and second fixed pivots 204, 206.

Turning to FIG. 5, there is shown a diagrammatical representation of an assembly of a still further embodiment of the present invention, generally indicated as 302. The assembly 302 is shown mounted to a fixed structure at a first fixed pivot 304 and a second fixed pivot 306. The fixed pivots 304, 306 are spaced apart and are fixed in relation to one another. In the embodiment shown in FIG. 5, the first and second fixed pivots are arranged on a vertical line.

A first arm 308 is pivotally connected at a first position at one end to the first fixed pivot 304. A second arm 310 is pivotally connected at a first position at one end to the second fixed pivot 306. A third arm 312 is mounted at one end by a pivot connection 314 at the second end of the second arm 310.

A fourth arm 316 is mounted at one end by a pivot connection 318 at the second end of the first arm 308. The fourth arm 316 is mounted at a second position thereon by a pivot connection 320 to the third arm at a second position on the third arm 312.

A first connecting arm 322 is mounted at one end by a pivot connection 324 to the first arm 308 at a third position on the first arm spaced from both the first and second positions thereon. The second end of the first connecting arm 322 is mounted by a pivot connection to the second arm 310. In the embodiment shown in FIG. 5, the pivot connection between the first connecting arm 322 and the second arm 310 is at the first end of the second arm and coincides with the pivot connection 314, such that the first connecting arm is pivotally connected to both the second arm 310 and the third arm 312.

The fourth arm 316 extends in the distal direction (that is to the right in FIG. 5) beyond the third arm 312. The assembly further comprises a first support arm 326. The first support arm 326 is connected by a pivot connection 328 at one end thereof to the distal end of the fourth arm 316.

A fifth arm 340 is connected at one end to the pivot connection 314 and extends in a distal direction from the first connecting arm 322. The second end of the fifth arm 340 is connected by a pivot connection 342 to a sixth arm 344 that extends further in the distal direction.

A second connecting arm 346 extends from the pivot connection 318 on the first arm 308 to a pivot connection 347 on the fifth arm 340.

Movement of the first arm 308 about the first fixed pivot 304 and the second arm 310 about the second fixed pivot 306 causes the third arm 312 to move such that a point A" on the third arm moves between a retracted position and an extended position. In moving between the retracted and extended positions, the point A" describes a substantially straight line.

A third connecting arm 348 is pivotally connected to and extends from the point A" on the third arm 312. The third connecting arm 348 is connected to a pivot connection 350 on the distal end of the sixth arm 344.

Finally, a supporting arm 352 extends from the pivot connection 350 on the sixth arm 344.

The pivot connections between the arms may be formed by any suitable means, for example by pins extending through holes in the arms being pivotally joined.

A component to be moved can be connected to one or more of the third arm 312, the first support arm 326 and the supporting arm 352. In particular, the point A" on the third arm 312, a point B" on the first support arm 326 and a point C" on the supporting arm 352 may be connected, for example by a component to be moved, with the result that the points A", B" and C" lie on a straight line extending from the second fixed pivot 306. In the embodiment shown in FIG. 5, the line joining points A", B" and C" extends perpendicular to the line joining the first and second fixed pivots 304, 306.

Figure 6A:
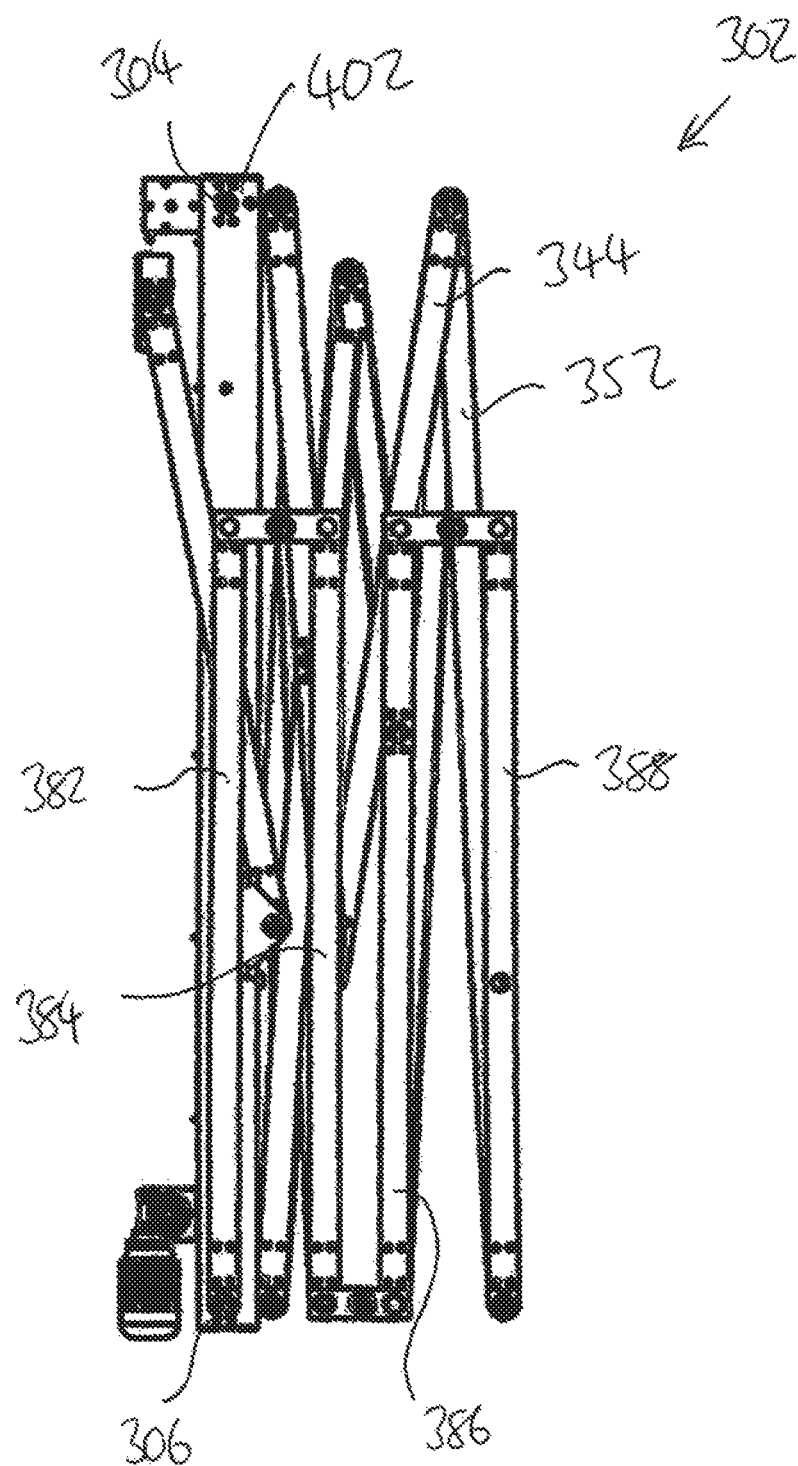
FIG. 6a is a side view of the assembly of the assembly of FIG. 5 in a retracted position.
Figure 6B:
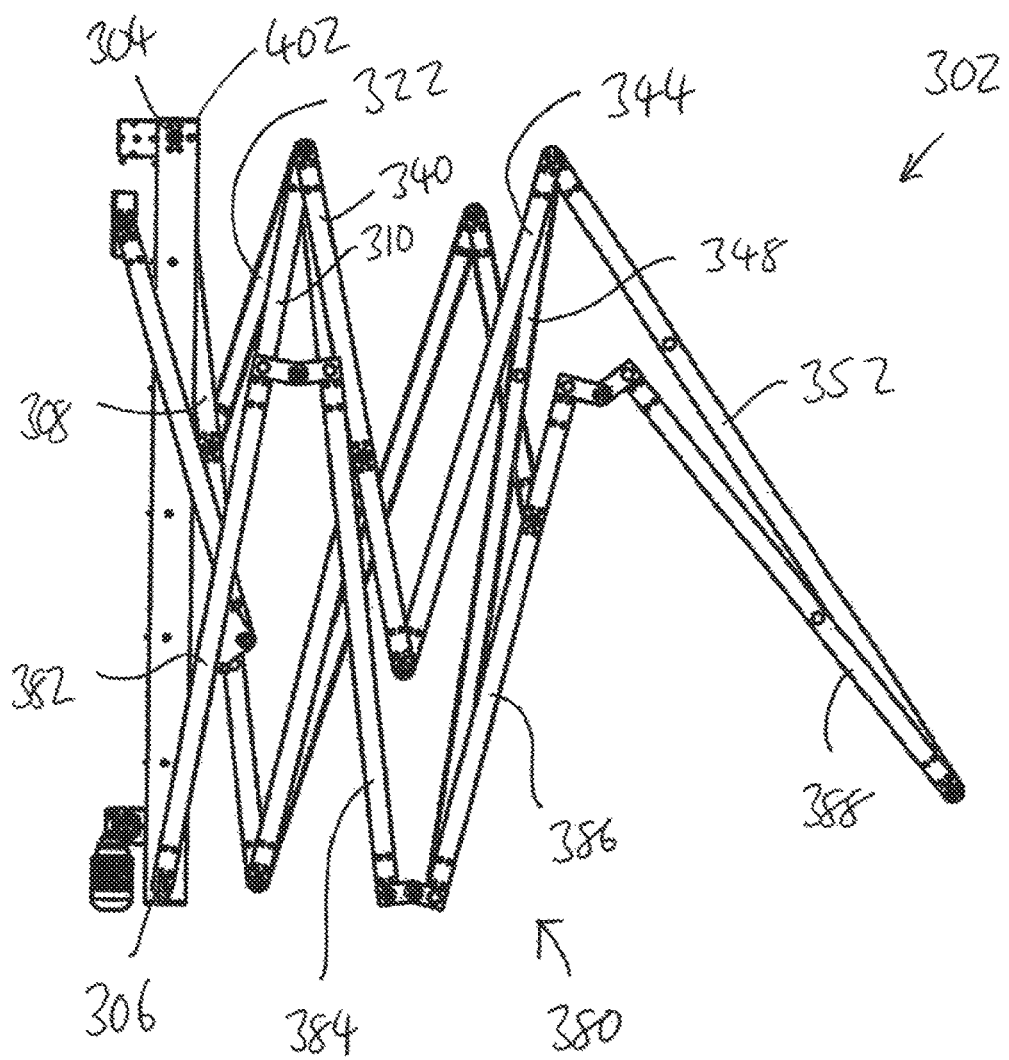
FIG. 6b is a side view of the assembly of FIG. 6a in a first partially extended position.
Figure 6C:
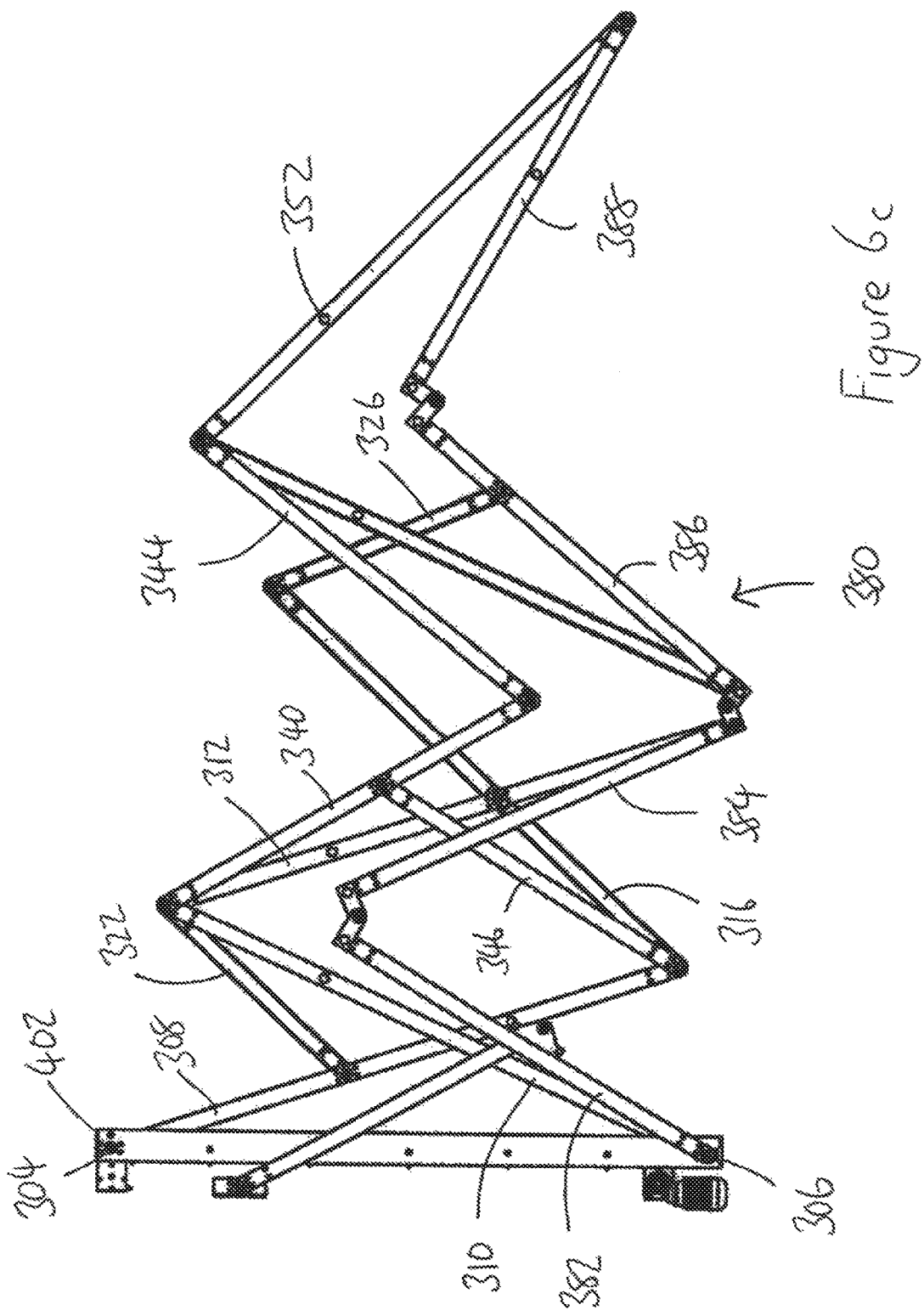
FIG. 6c is a side view of the assembly of FIG. 6a in a second partially extended position.
Figure 6D:
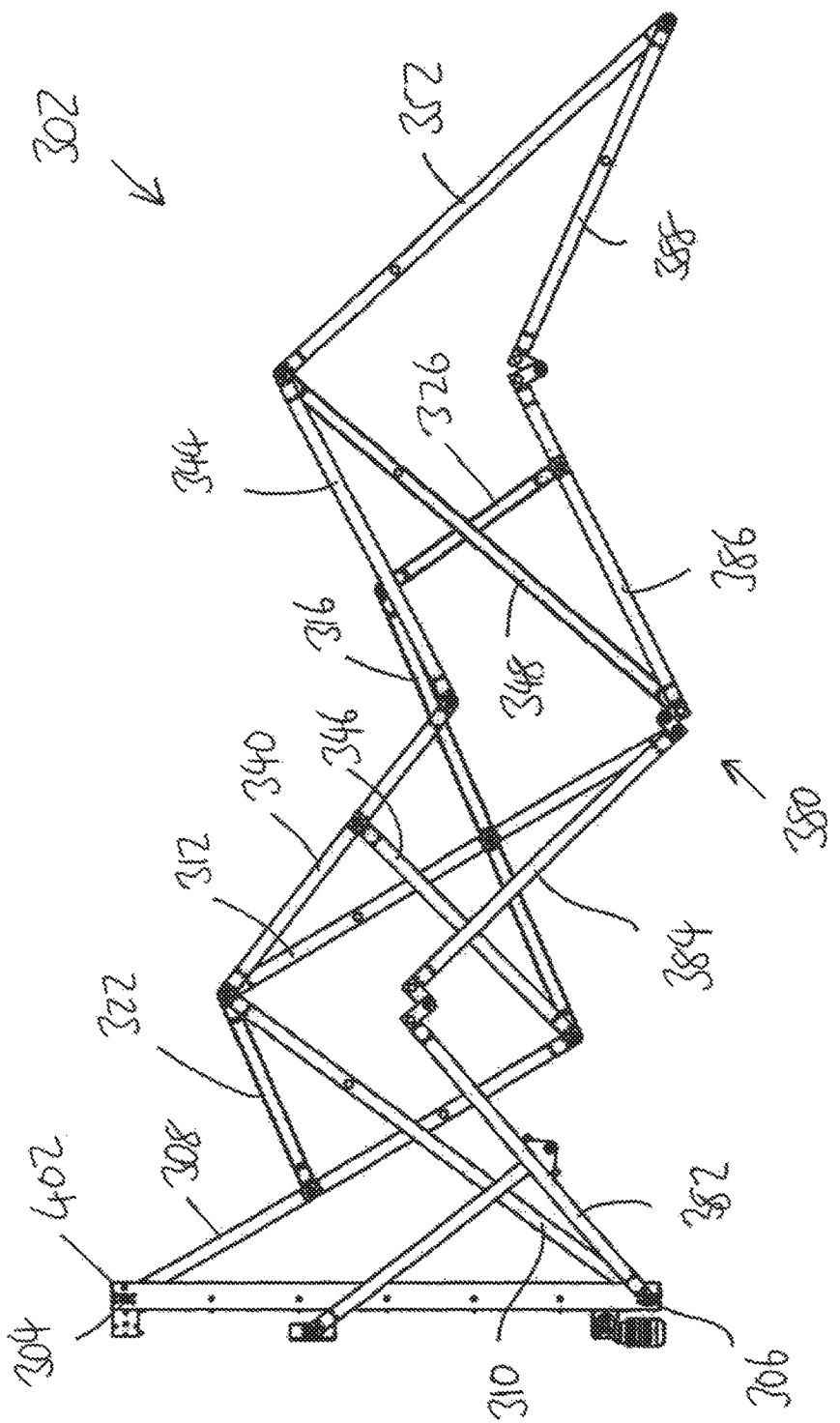
FIG. 6d is a side view of the assembly of FIG. 6a in a third partially extended position.
Figure 6F:
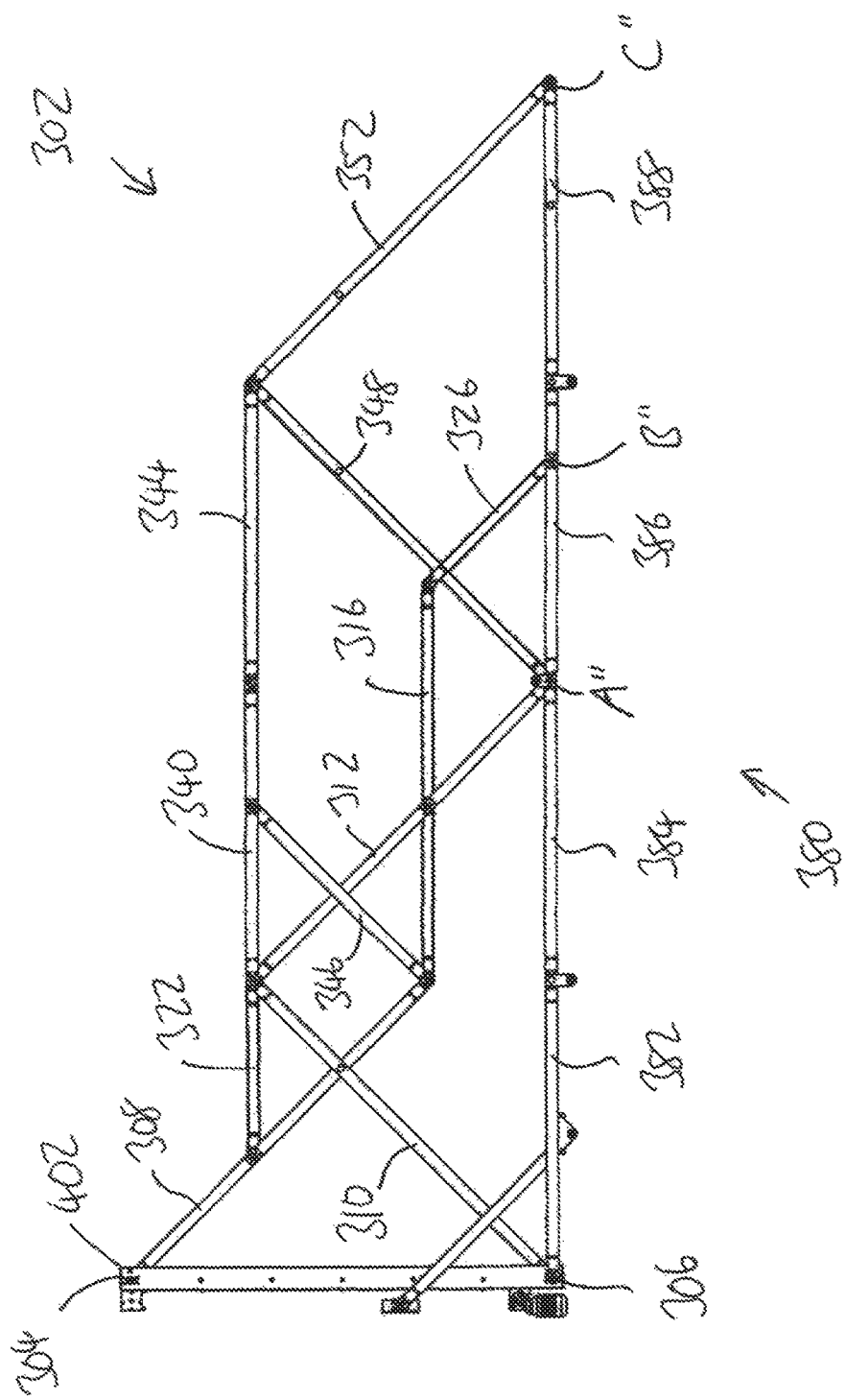
FIG. 6f is a side view of the assembly of FIG. 6a in an extended position.
Figure 49:
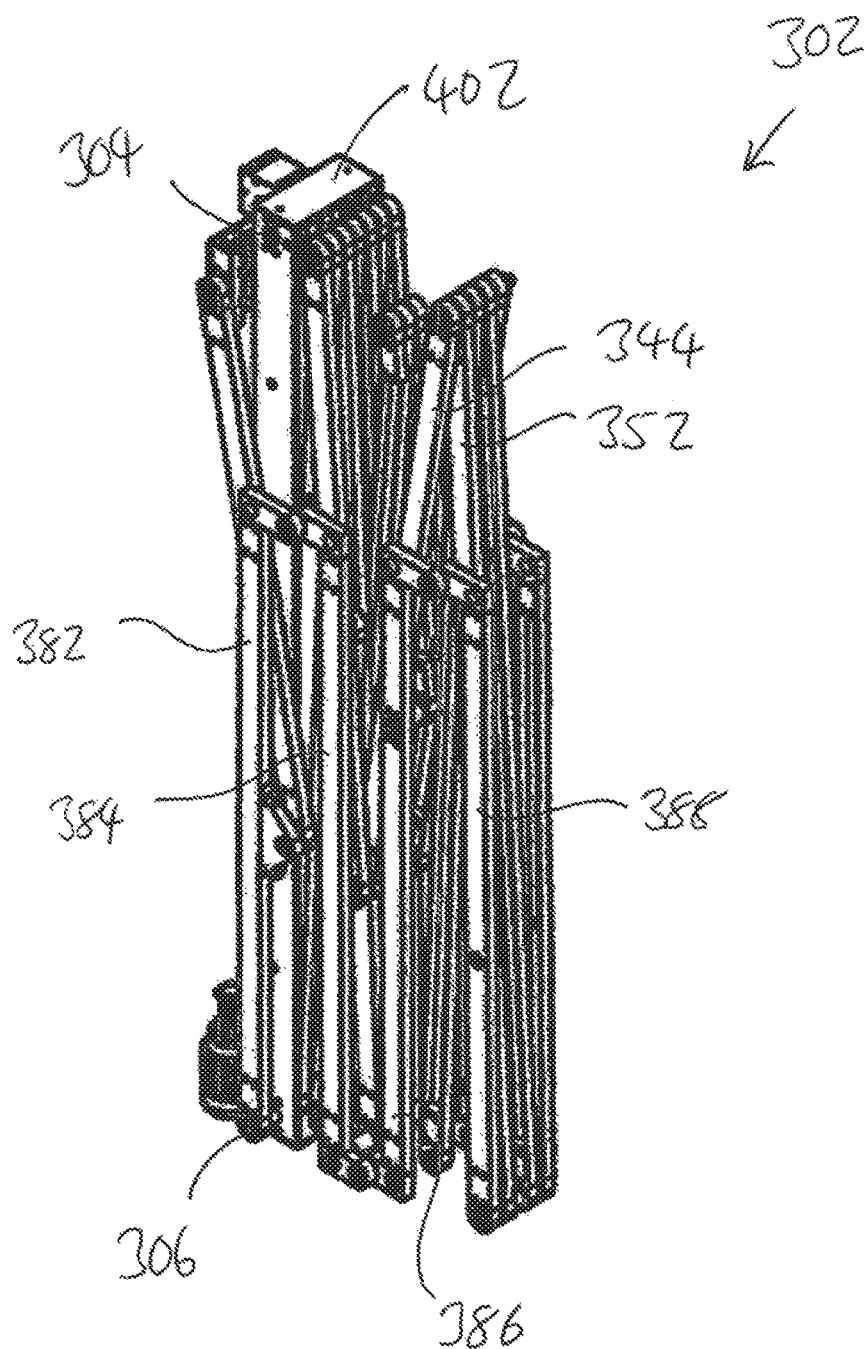
Figure 7B:
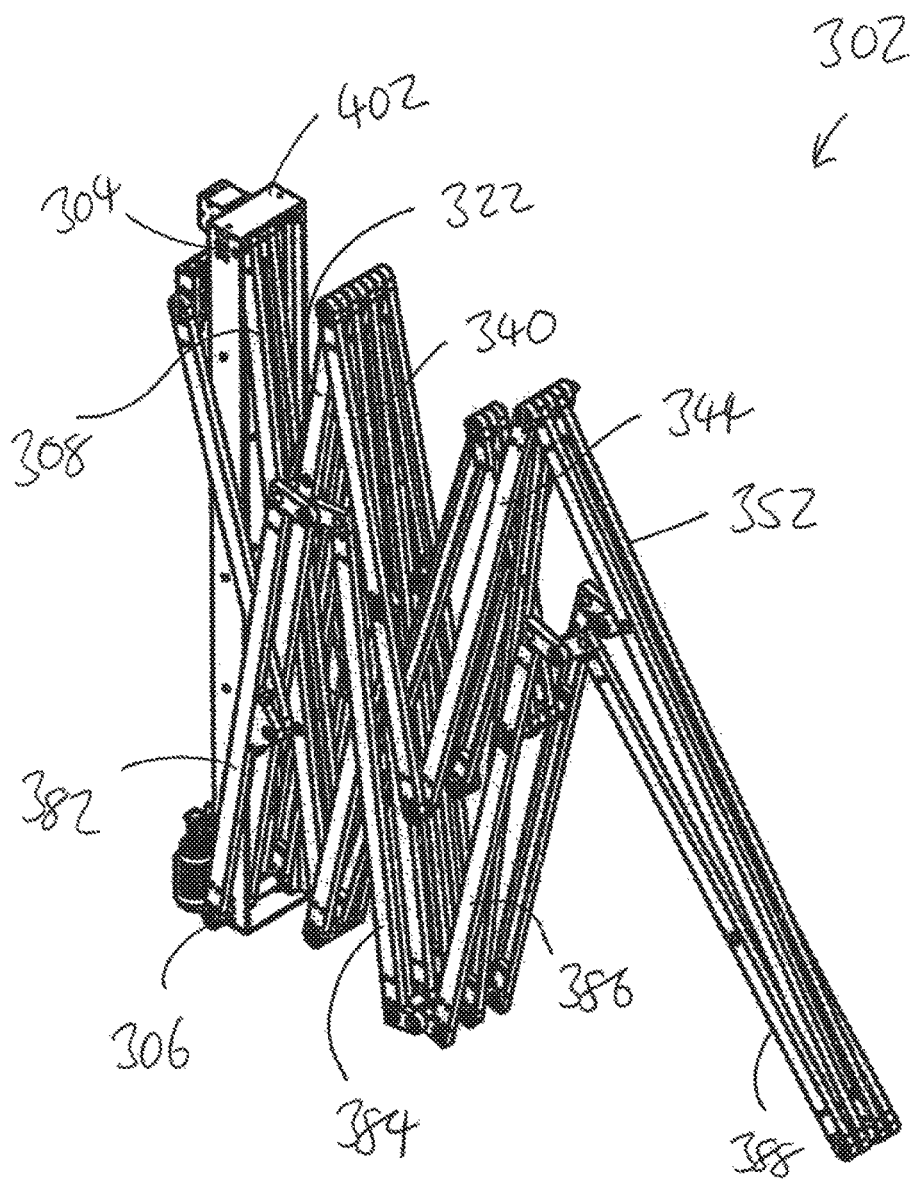
Figure 4E:
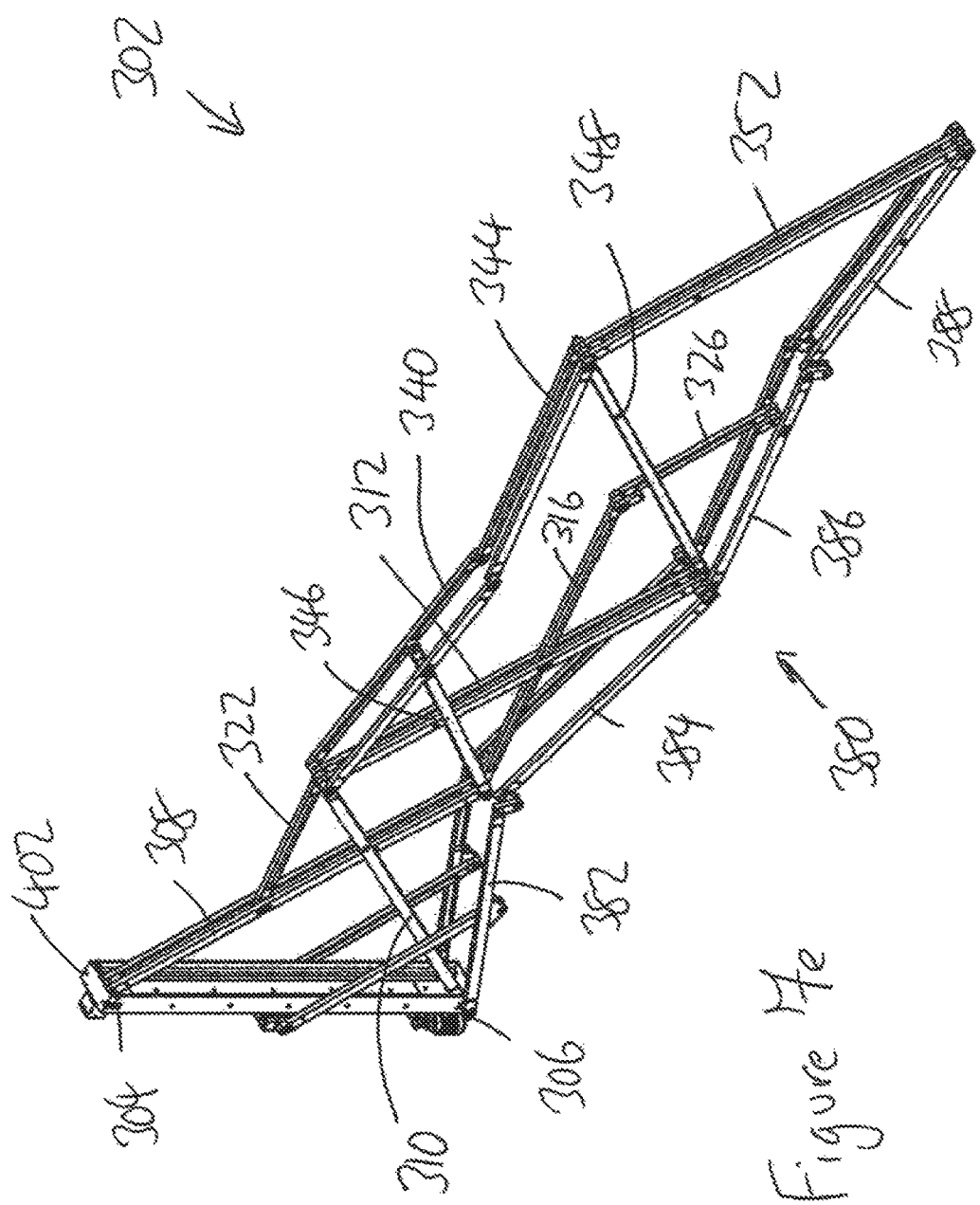
Figure 6A:
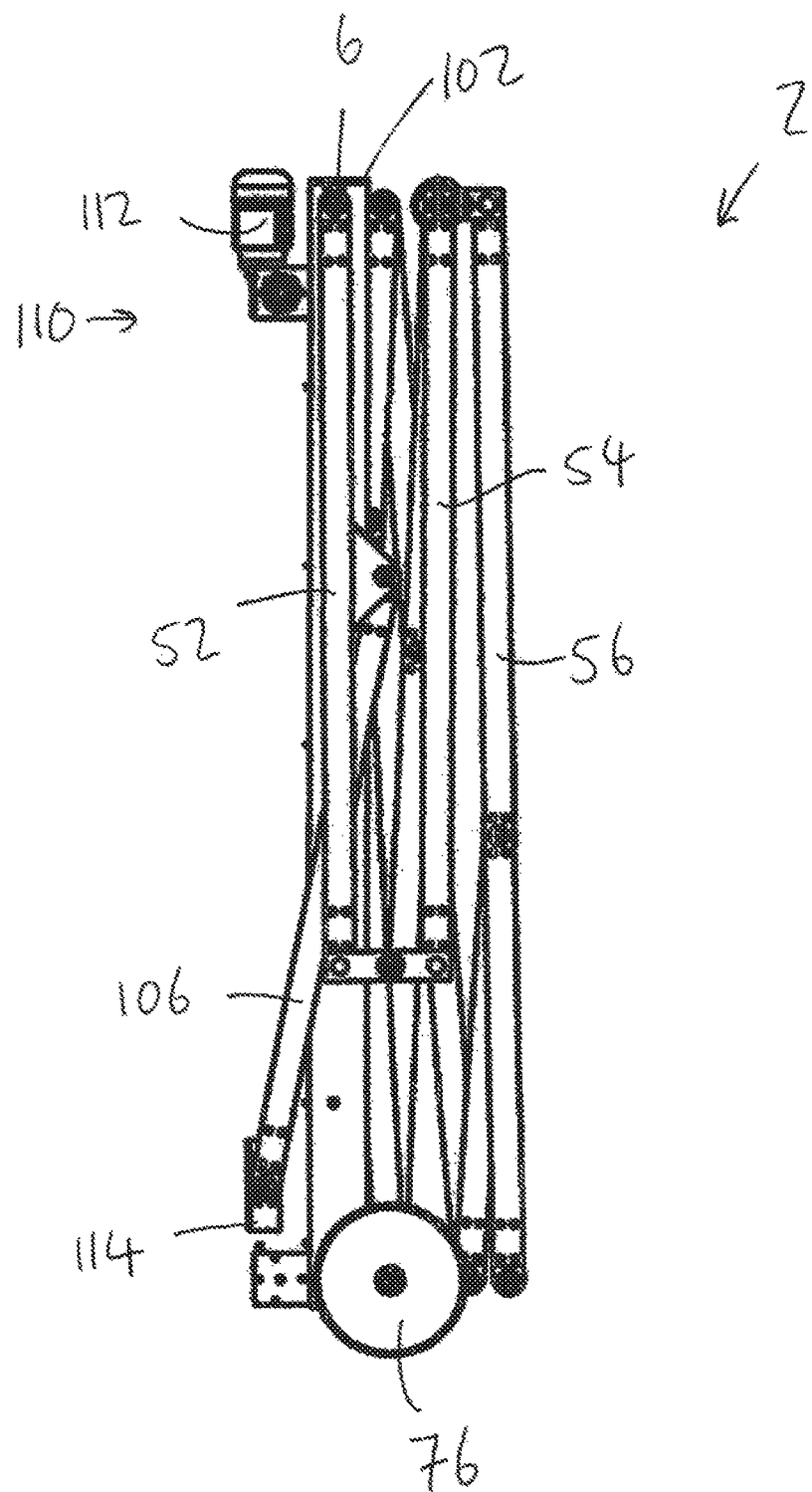
Figure 8B:
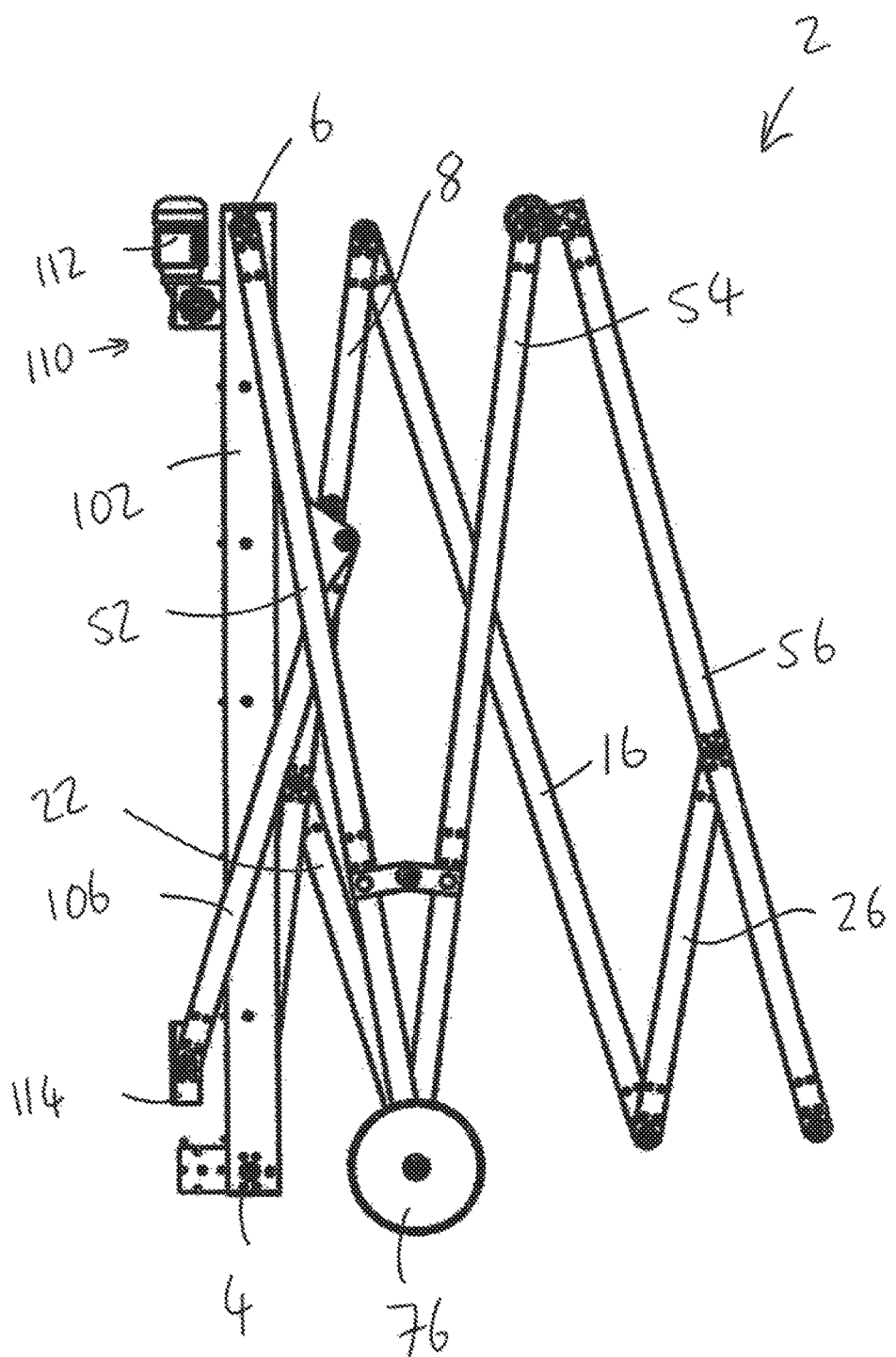
Figure 8D:
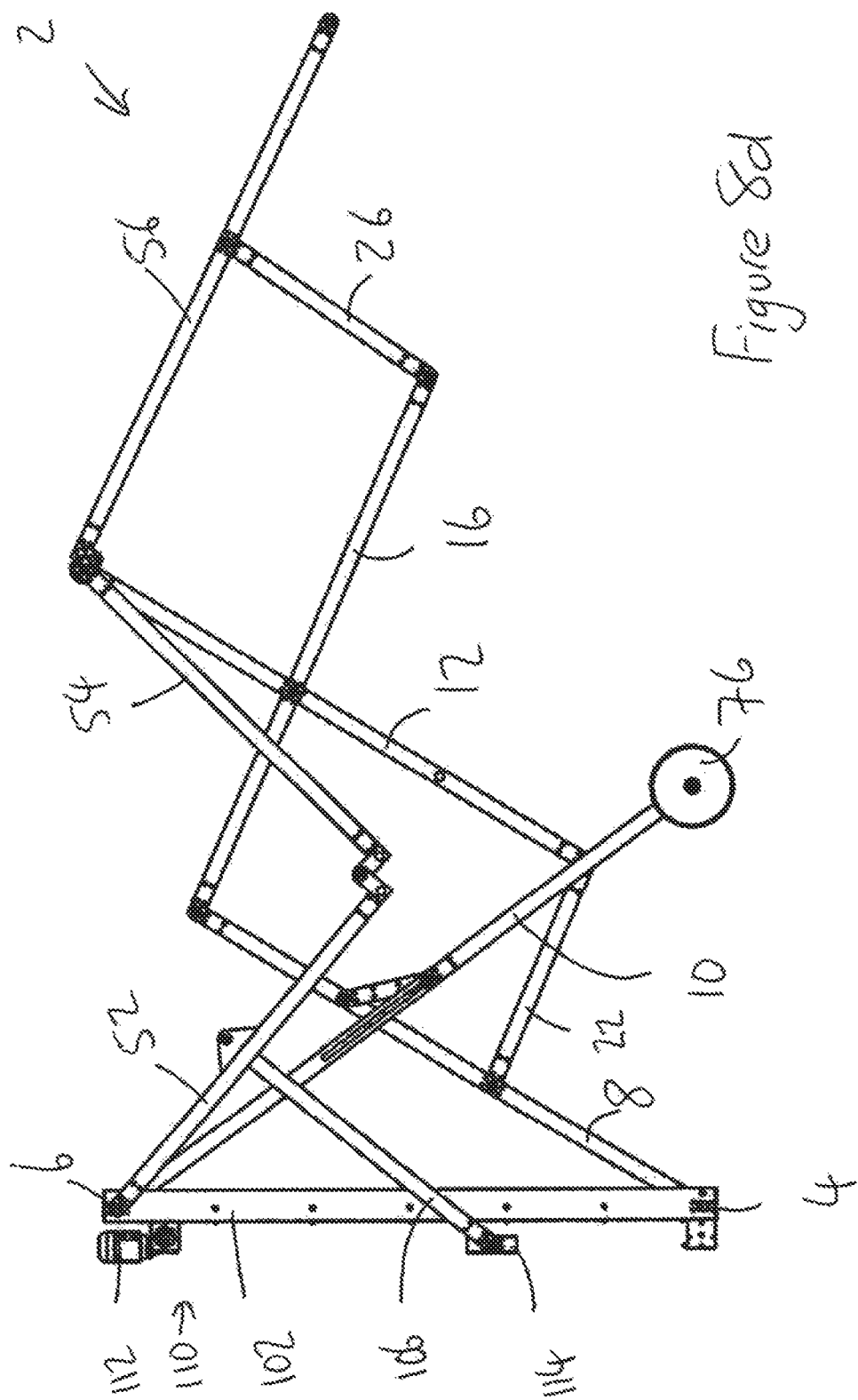
Figure 9A:
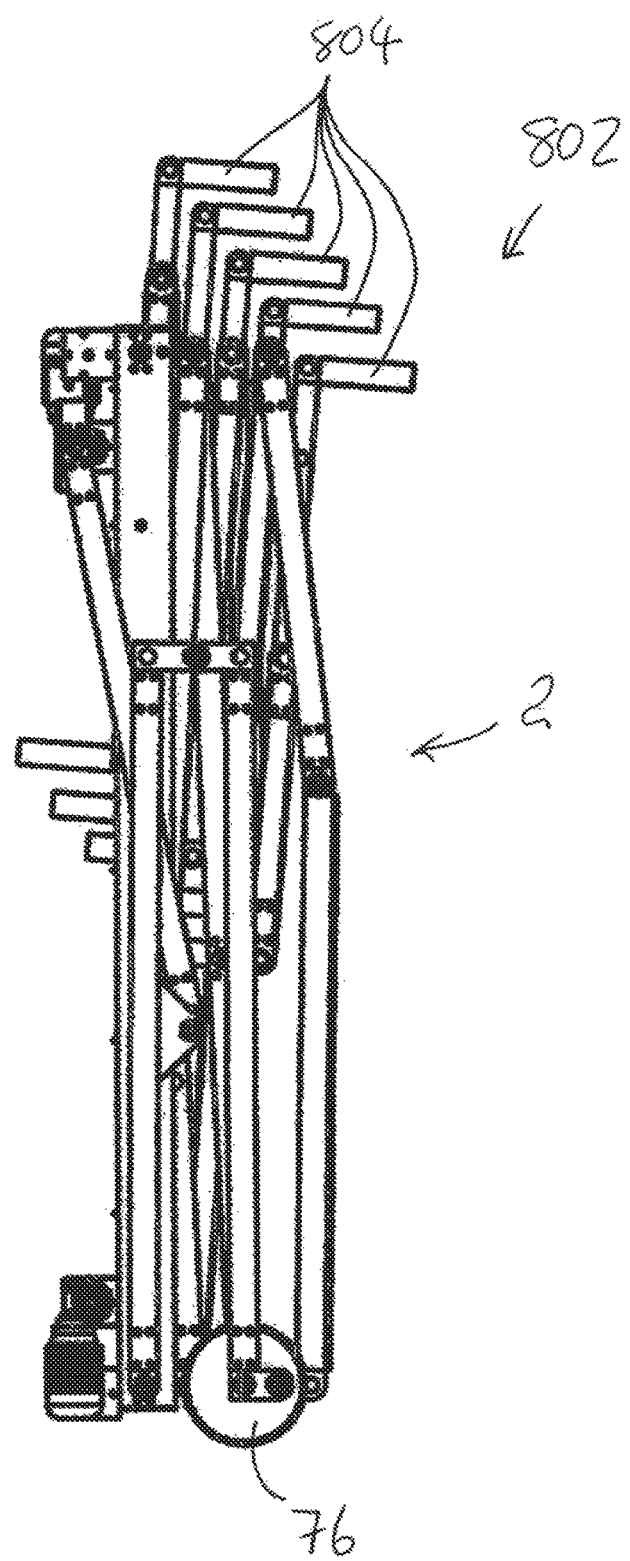
Figure 9B:
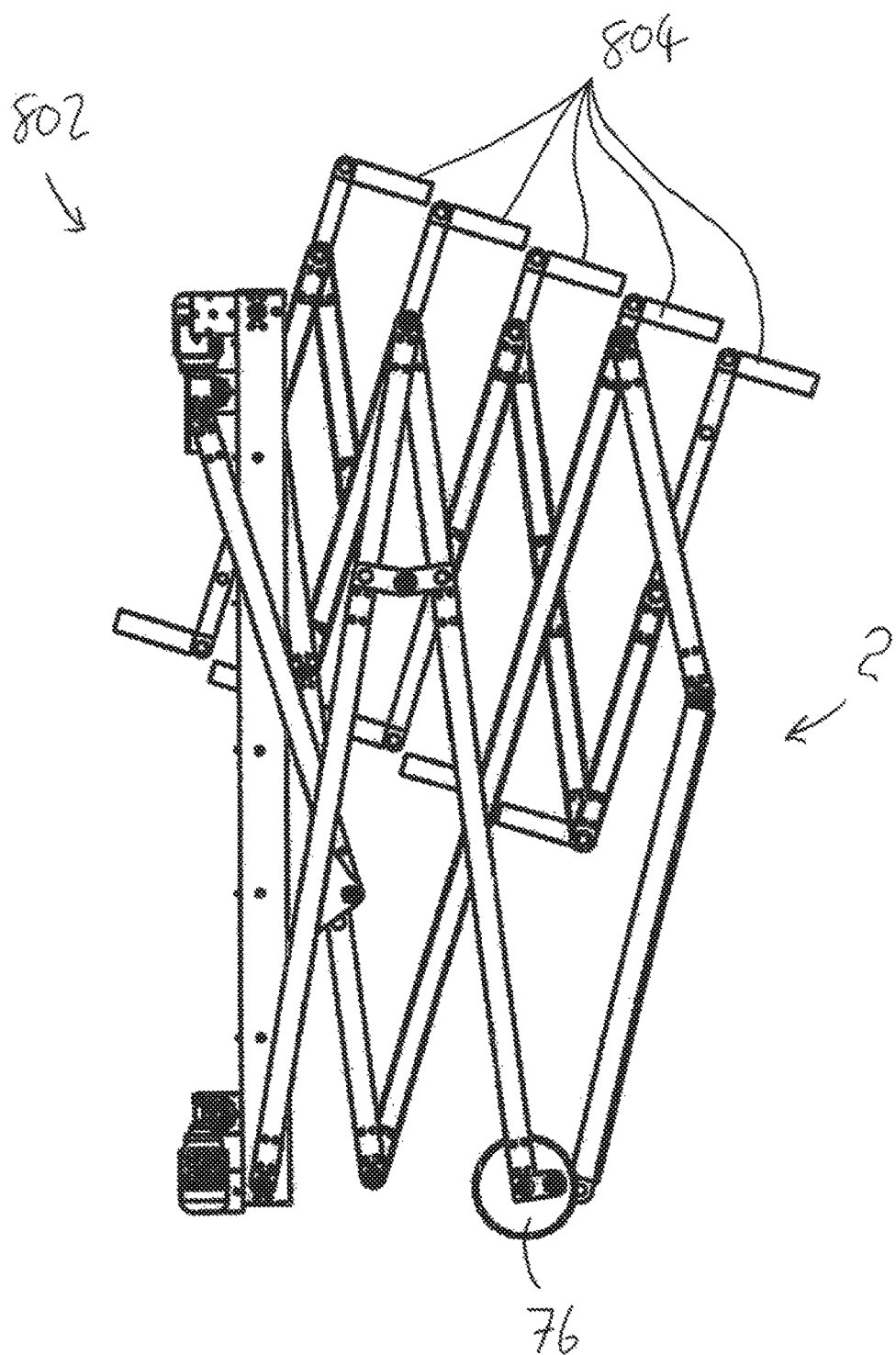
Figure 9E:
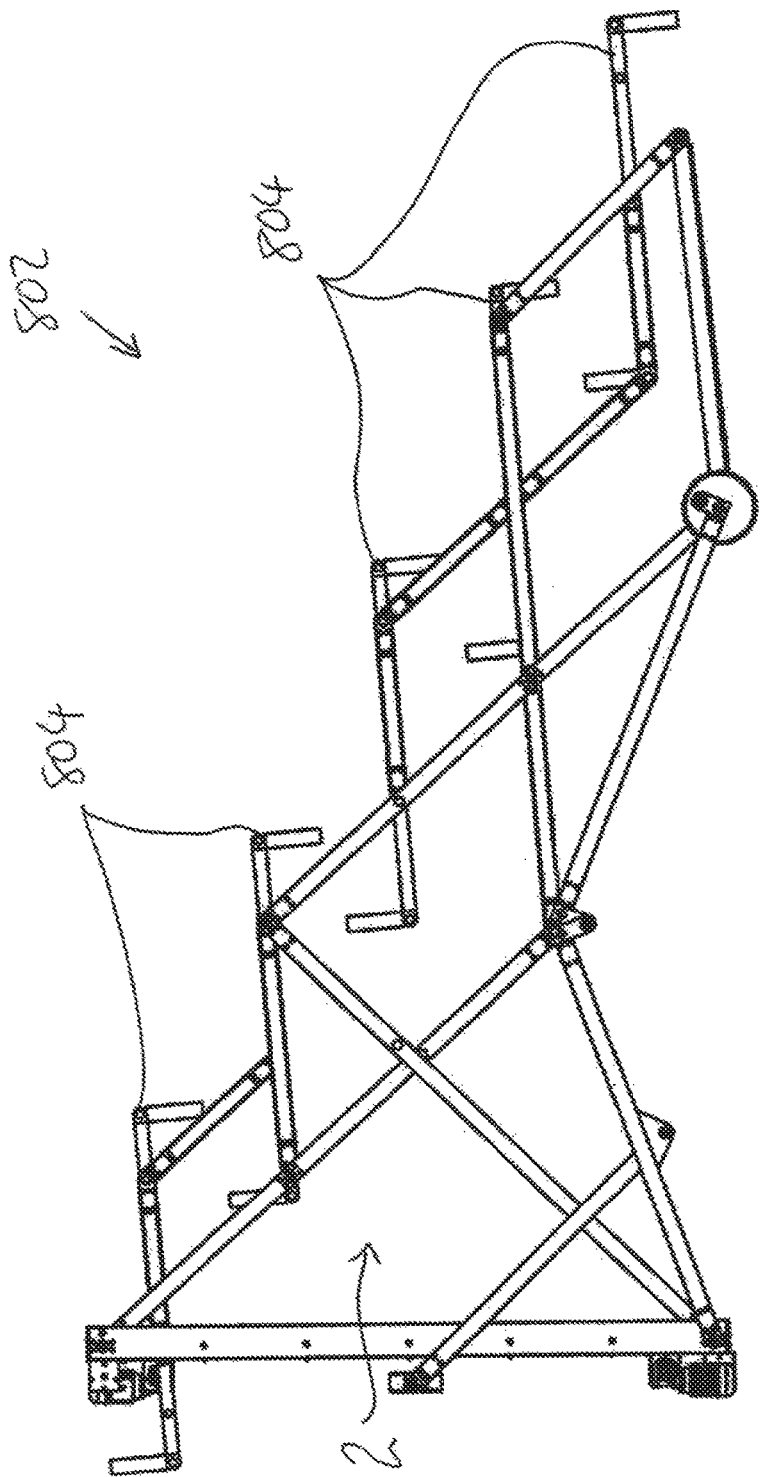
Figure 9F:
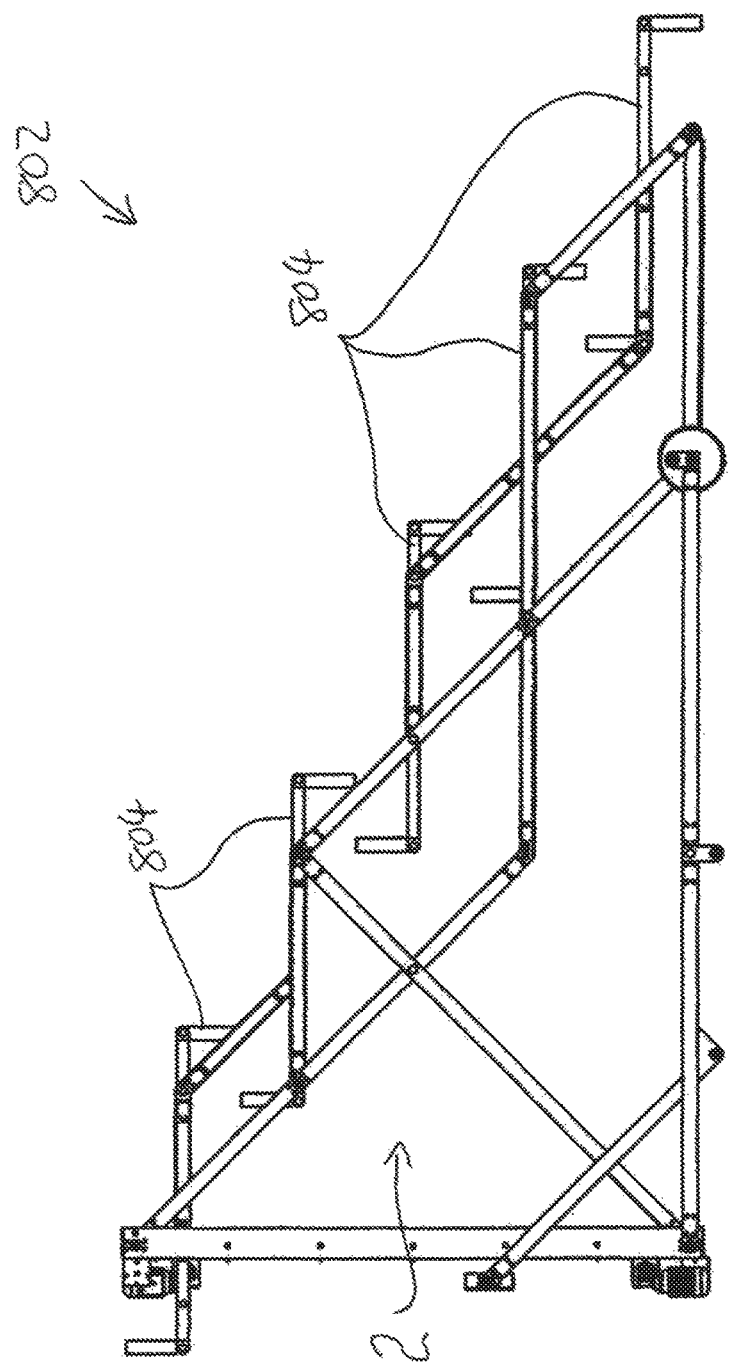
Figure 10C:
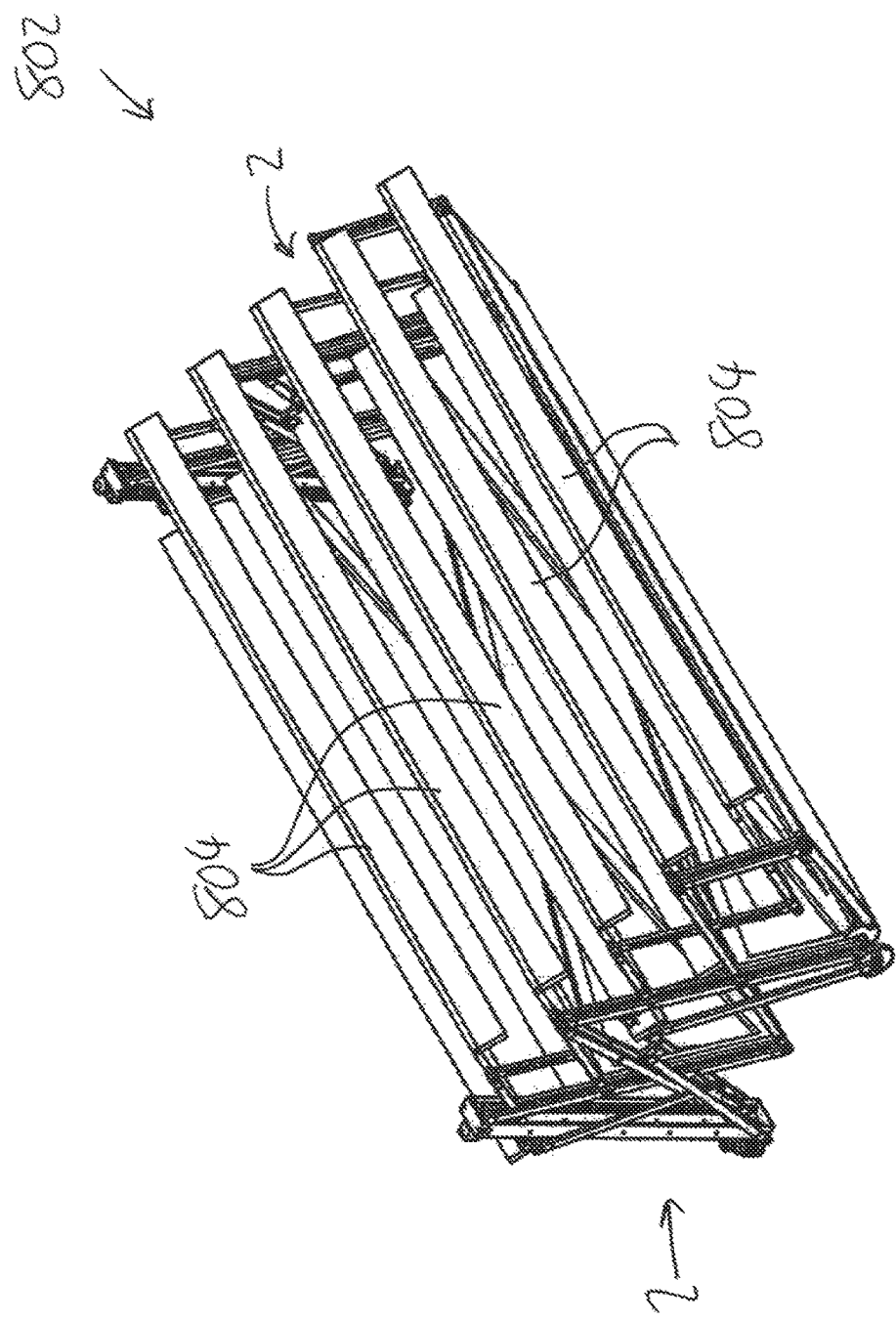
Figure 10D:
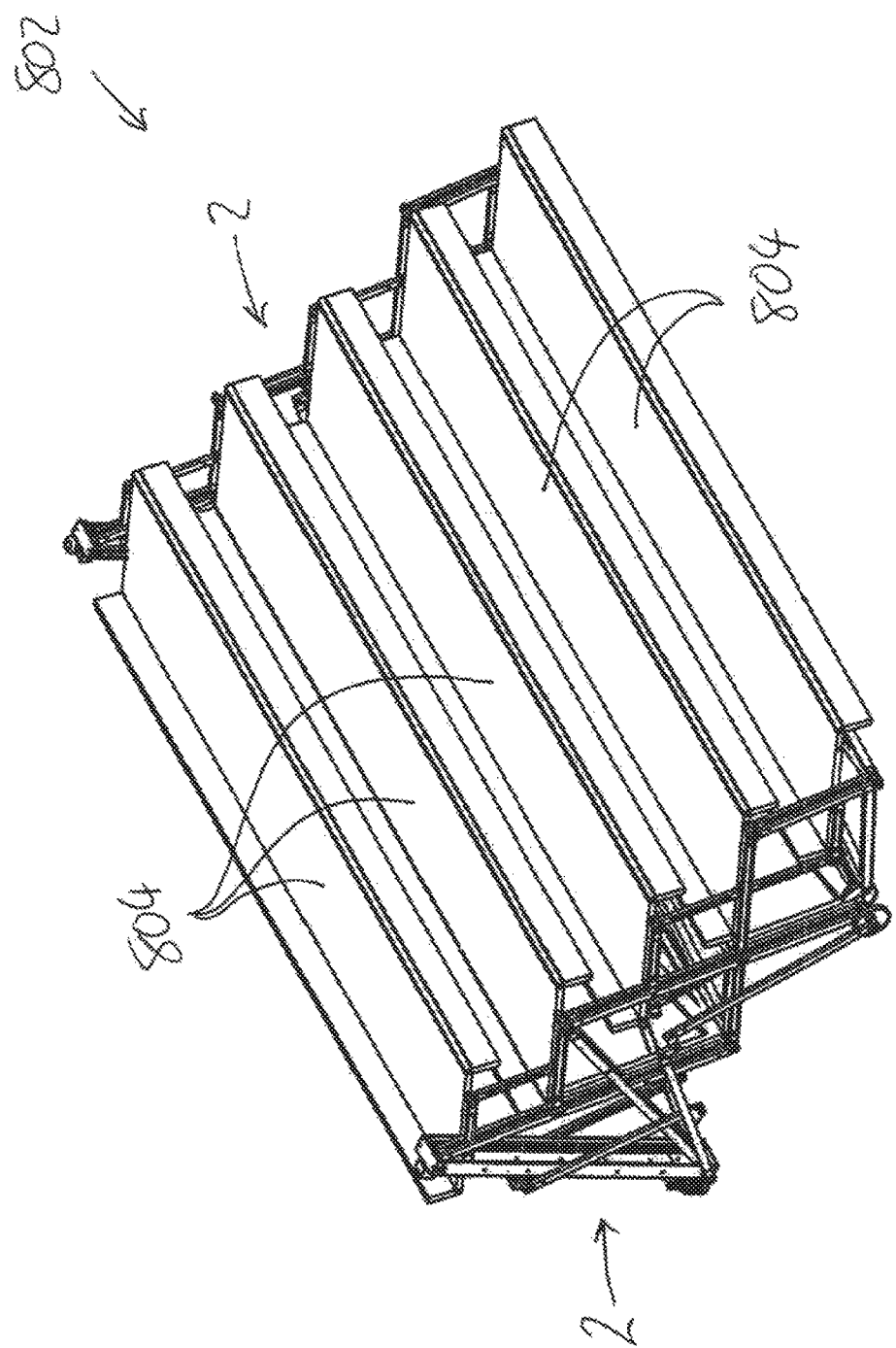
Figure 10E:
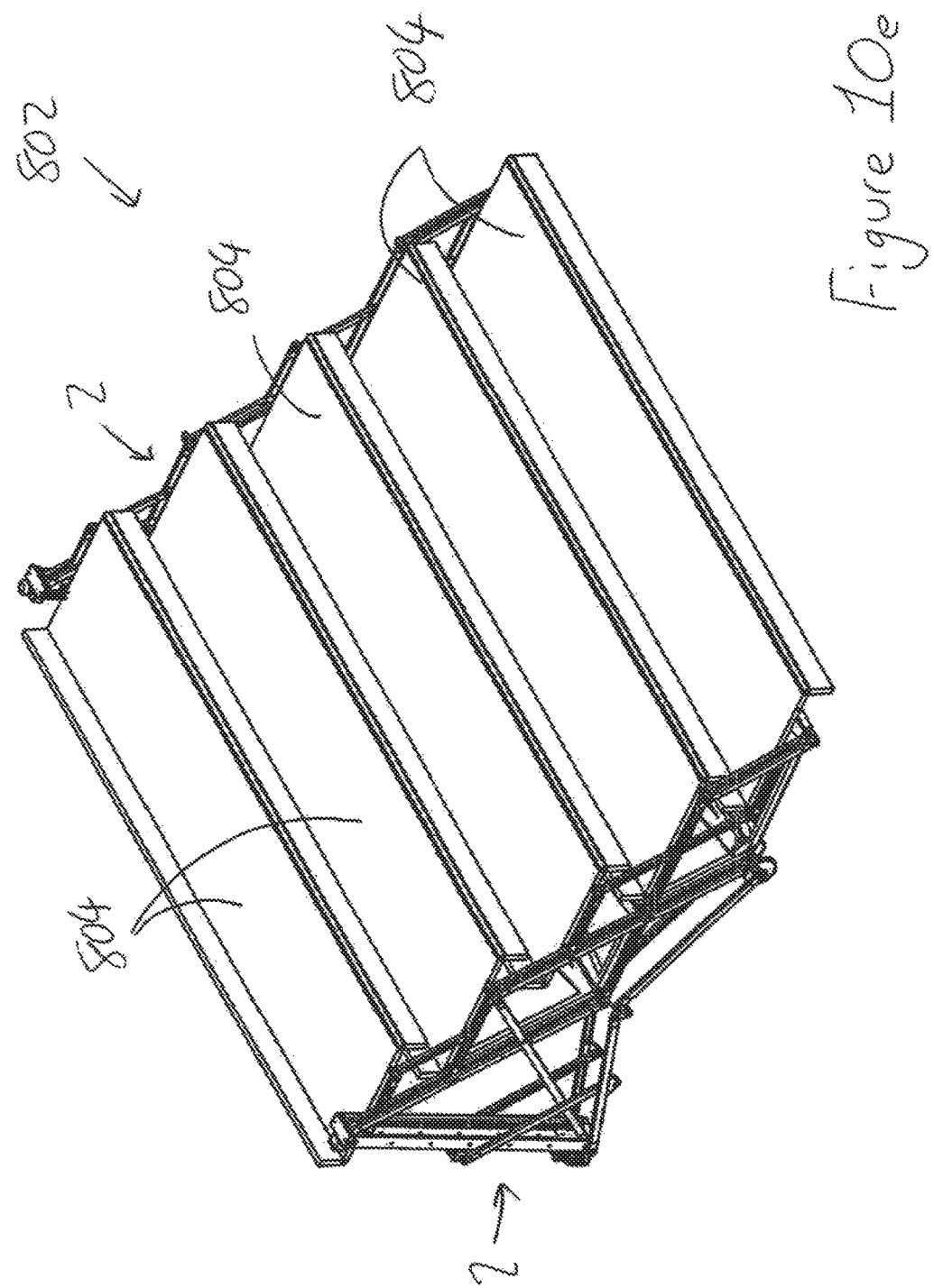

Turning now to FIGS. 6a to 6f, there is shown a sequence of drawings of a side view of an assembly of the embodiment of FIG. 5 in positions between a retracted position, shown in FIG. 6a, and an extended position shown in FIG. 6f. The components of the assembly of FIGS. 6a to 6g have been identified using the same reference numerals as used in relation to FIG. 5 and discussed above.

The assembly in FIGS. 6a to 6f is supporting and moving a component 380 comprising four hingedly connected members 382, 384, 386 and 388. The component 380 may be a support structure for providing support to one or more items to be moved and supported, with the items being connected to the component 380. Alternatively, the component 380 may itself be formed by the item to be moved and supported.

The sequence of views of FIGS. 6a to 6f are shown in perspective view in FIGS. 7a to 7f.

Referring to FIG. 6a, the assembly 302 is shown in a retracted position held within a frame 402, providing the mounting for the fixed pivots 304 and 306. The arms of the assembly are formed to lie within one another when in the retracted position of FIG. 6a. The form of the arms is shown in FIGS. 7a to 7f. In particular, it can be seen that the first, second, third, fifth and sixth arms and the support arms are each formed of a plurality of parallel arm members, allowing the arms to lie within one another in the retracted position. In this way, the assembly 302 occupies the minimum amount of space when in the retracted position.

The assembly 302 is shown in FIG. 6b in a first partially extended position, with the third arm 312 having moved away from the fixed pivots 304, 306 and the frame 402, that is to the left as viewed in the figure. In the movement from the position of FIG. 6a to the position of FIG. 6b, the point A" at the end of the third arm 312 is following a substantially straight line.

FIG. 6c shows the assembly 302 in a second partially extended position, with the third arm 312 moved further away from the fixed pivots 304, 306. Again, the point A" on the third arm 312 is tracing a substantially straight line from its position in the retracted position of FIG. 6a.

Similarly, FIGS. 6d and 6e shows the assembly 302 in third and fourth partially extended positions, with the third arm 312 still further from the fixed pivots 304, 306 and the point A" on the third arm 312 still following a straight line path.

FIG. 6f shows the assembly 302 in its extended position, that is with the third arm 312 at a position where the point A" is at the end of the straight line path followed from the retracted position. The extended position is shown in perspective in FIG. 7f. As can be seen, the component 380 extends in a straight line from the second fixed pivot 306, with the members 382, 384, 386 and 388 unfolded.

The assembly of FIGS. 6a to 6f and 7a to 7f employs a drive mechanism having the same general configuration and mode of operation as described above with respect to FIGS. 2a to 2f and 3a to 3f.

FIGS. 8a to 8f show the sequence of positions of the assembly of FIGS. 2a to 2f in an inverted orientation. The components of the assembly common to the embodiment of FIGS. 2a to 2f have been identified using the same reference numerals and are as described above.

In this arrangement, the assembly is being used to extend and raise a component. The assembly arranged in this manner may be used to support a range of components, for example an expandable roof assembly or an expandable terrace. In the embodiment shown, the second arm 10 has been extended beyond the pivot connection 14 to provide additional support for the assembly and component. A wheel 76 is provided on the distal end of the extended second arm 10 and contacts the ground to provide additional support for the assembly and the component being moved.

The assembly of the present invention may be used to deploy and support a wide range of components and structures. By way of example, FIGS. 9a to 9f show a side view of the assembly of FIG. 2a in an expandable seating assembly for use in a stadium, theatre, hall or the like.

The expandable seating assembly, generally indicated as 802, comprises a plurality of seating units 804 supported on a pair of spaced apart, parallel assemblies 2 of the configuration of FIGS. 2a to 2f, as described hereinbefore. To provide additional support and facilitate moving the assembly, a wheel 86 is provided at the point A on the third arm 12.

As can be seen in FIGS. 9a to 9f, the seating units 804 are mounted on the arms of the assemblies 2 so as to pivot and be foldable.

Perspective views of the expandable seating assembly 802 corresponding to those of FIGS. 9a to 9f are shown in FIGS. 10a to 10f.

Figure 11:
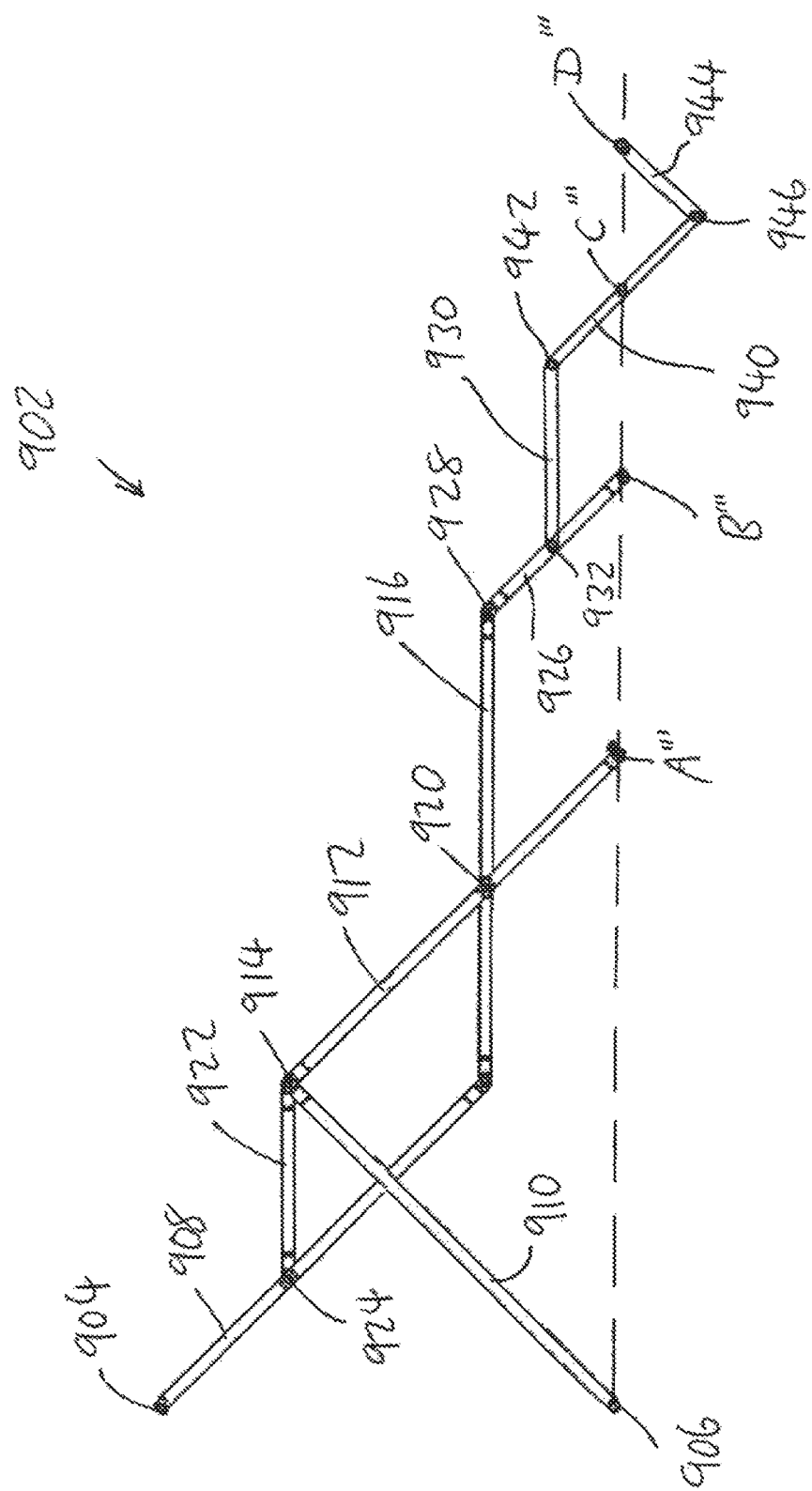
FIG. 11 is simplified diagrammatical representation of an assembly according to a further embodiment of the present invention in the extended position.

Referring to FIG. 11, there is shown a further embodiment of an assembly according to the present invention. The assembly 902 is shown mounted to a fixed structure at a first fixed pivot 904 and a second fixed pivot 906. The fixed pivots 904, 906 are spaced apart and are fixed in relation to one another. In the embodiment shown in FIG. 11, the first and second fixed pivots are arranged on a vertical line.

A first arm 908 is pivotally connected at a first position at one end to the first fixed pivot 904. A second arm 910 is pivotally connected at a first position at one end to the second fixed pivot 906. A third arm 912 is mounted at one end by a pivot connection 914 at the second end of the second arm 910.

A fourth arm 916 is mounted at one end by a pivot connection 918 at the second end of the first arm 908. The fourth arm 916 is mounted at a second position thereon by a pivot connection 920 to the third arm at a second position on the third arm 912.

A connecting arm 922 is mounted at one end by a pivot connection 924 to the first arm 908 at a third position on the first arm spaced from both the first and second positions thereon. The second end of the connecting arm 922 is mounted by a pivot connection to the second arm 910. In the embodiment shown in FIG. 11, the pivot connection between the connecting arm 922 and the second arm 910 is at the first end of the second arm and coincides with the pivot connection 914, such that the connecting arm is pivotally connected to both the second arm 910 and the third arm 912.

As shown in FIG. 11, the fourth arm 916 extends in the distal direction (that is to the right in FIG. 10) beyond the third arm 912. The assembly further comprises a first support arm 926. The first support arm 926 is connected by a pivot connection 928 at one end thereof to the distal end of the fourth arm 916. A second support arm 930 is connected at one end by a pivot connection 932 to the first support arm 926, the pivot connection 932 spaced from the pivot connection 928. A third support arm 940 is connected by a pivot connect 942 at one thereof to the distal end of the second support arm 930. A fourth support arm 944 is connected at one end by a pivot connection 946 to the distal end of the third support arm 940.

The pivot connections between the arms may be formed by any suitable means, for example by pins extending through holes in the arms being pivotally joined.

Movement of the first arm 908 about the first fixed pivot 904 and the second arm 910 about the second fixed pivot 906 causes the third arm 912 to move such that a point A''' on the third arm moves between a retracted position and an extended position. In moving between the retracted and extended positions, the point A''' describes a substantially straight line.

A component to be moved can be connected to one or more of the third arm 912, the first support arm 926, the third support arm 940, and/or the fourth support arm 944. In particular, the point A''' on the third arm 912, a point B''' on the first support arm 926, a point C''' on the third support arm 940 and a point D''' on the fourth support arm 944 may be connected, for example by a component to be moved, with the result that the points A''', B''', C''' and D''' lie on a straight line extending from the second fixed pivot 906. In the embodiment shown in FIG. 11, the line joining the points A''', B''', C''' and D''' extends perpendicular to the line joining the first and second fixed pivots 904, 906.

Figure 12B:
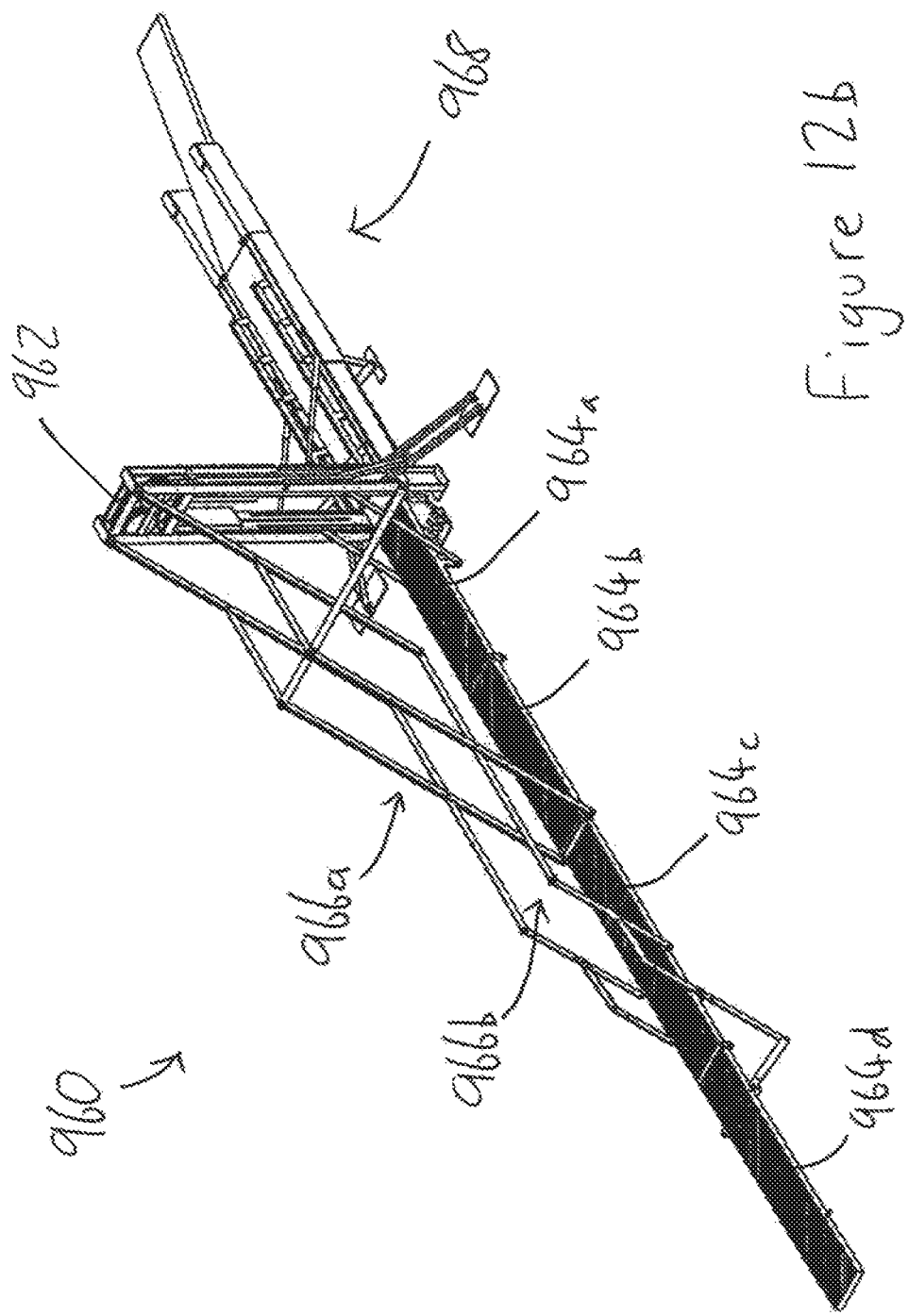

Finally, turning to FIGS. 12a and 12b, there is shown a folding bridge assembly, generally indicated as 960. The bridge assembly 960 is shown in FIG. 12a in a partially extended position and in FIG. 12b in a fully extended position.

The bridge assembly 960 comprises a generally vertical support assembly 962 in the form of a frame with an opening therethrough to allow access to and from the bridge. The bridge assembly 960 further comprises a plurality of bridge deck components 964a to 964d. The deck components are hingedly attached to the or each adjacent deck component, with the deck component 964a adjacent the support assembly 962 also being hingedly attached to the support assembly.

The deck components 964a to 964d are supported and moved by a pair of support assemblies 966a, 966b each of the general configuration shown in FIG. 11 and described in detail above. The support assemblies 966a, 966b are mounted on opposing sides of the deck components 964a to 964d, as shown in FIGS. 12a and 12b. The deck components 964a to 964d are pivotally connected to the points A''', B''', C''' and D''' on the assembly shown in FIG. 11 and described above.

A foldable counterbalance assembly 968 is mounted to the support assembly 962 and extends from the side opposite to that of the deck components 964a to 964d.

The bridge assembly 960 is portable and may be transported to a required location, for example by a suitably sized lorry. In operation, the bridge assembly 960 is placed at the required location. The deck components 964a to 964d are deployed by operation of the support assemblies 966a, 966a and being unfolded from a retracted position to the extended position shown in FIG. 12b, to form the bridge.

The invention claimed is:

1. An assembly for converting motion, the assembly moveable between a retracted position and an extended position, the assembly comprising:
   a first arm rotatable at a first position on the first arm about a first fixed pivot;
   a second arm rotatable at a first position on the second arm about a second fixed pivot, the second fixed pivot spaced apart from the first fixed pivot;
   wherein the first and second fixed pivots are fixed in relation to one another;
   a third arm pivotably connected by a direct pivot connection comprising a pivot pin or axle at a first position on the third arm to the second arm at a second position on the second arm, the second position on the second arm spaced apart a fixed distance from the first position on the second arm;
   a fourth arm pivotably connected by a direct pivot connection comprising a pivot pin or axle at a first position on the fourth arm to a second position on the first arm spaced apart a fixed distance from the first position on the first arm and pivotably connected at a second position on the fourth arm spaced apart from the first position on the fourth arm to the third arm at a second position on the third arm spaced apart from the first position on the third arm;
   a connecting arm extending between the first arm and the second arm, the connecting arm pivotably connected by a direct pivot connection comprising a pivot pin or axle to a third position on the first arm disposed between the first and second positions on the first arm and pivotably connected by a direct pivot connection comprising a pivot pin or axle to a third position on the second arm; and
   a support arm pivotably connected by a direct pivot connection comprising a pivot pin or axle at a first position on the support arm to a third position on the fourth arm, the third position on the fourth arm being spaced from the first and second positions on the fourth arm and beyond the second position in a direction from the first position on the fourth arm to the second position on the fourth arm.

2. The assembly according to claim 1, wherein the length of the first arm is no greater than the distance between the first and second fixed pivots.

3. The assembly according to claim 1, wherein the length of the second arm is no greater than the distance between the first and second fixed pivots.

4. The assembly according to claim 1, wherein the length of the first and second arms is substantially the same.

5. The assembly according to claim 1, wherein the lengths of the first, second and third arms are substantially the same.

6. The assembly according to claim 1, wherein the third position on the second arm coincides with the second position on the second atm, such that the connecting arm is connected to both the second and third arms.

7. The assembly according to claim 1, further comprising a second support arm, the second support arm being pivotably connected at a first position on the second support arm to the support arm at a second position on the support arm, the second position on the support arm being spaced from the first position on the support arm.

8. The assembly according to claim 7, further comprising a third support arm, the third support arm pivotably connected at a first position on the third support atm to a second position on the second support arm.

9. The assembly according to claim 8, further comprising a fourth support arm, the fourth support arm pivotably connected at a first position on the fourth support arm to a second position on the third support arm.

10. The assembly according to claim 1, further comprising a fifth arm, the fifth arm pivotably connected at a first position on the fifth arm to the second arm at a fourth position on the second arm.

11. The assembly according to claim 10, further comprising a sixth arm, the sixth arm pivotably connected at a first position on the sixth arm to a second position on the fifth arm.

12. The assembly according to claim 11, wherein in the extended position the fifth and sixth arms extend in a substantially straight line.

13. The assembly according to claim 11, further comprising a supporting arm, the supporting arm pivotably connected at a first position on the supporting arm to the sixth arm at a third position on the sixth arm.

14. The assembly according to claim 10, further comprising a second connecting arm, the second connecting arm pivotably connected at a first position on the second connecting arm to the first arm at a fourth position on the first arm, and at a second position on the second connecting arm to the fifth arm at a third position on the fifth arm.

15. The assembly according to claim 14, further comprising a third connecting arm, the third connecting arm pivotably connected at a first position on the third connecting arm to the third arm at a third position on the third arm, and at a second position on the third connecting arm to the sixth arm at a second position on the sixth arm.

16. The assembly according to claim 1, wherein the movement of the third arm is limited to confine a point on the third arm to move in a straight line.

* * * * *